(12) United States Patent
Morrell et al.

(10) Patent No.: US 10,490,035 B2
(45) Date of Patent: Nov. 26, 2019

(54) HAPTIC NOTIFICATIONS

(71) Applicant: Apple Inc., Cupertino, CA (US)

(72) Inventors: John B. Morrell, Los Gatos, CA (US); Jonah A. Harley, Los Gatos, CA (US); Storrs T. Hoen, Brisbane, CA (US); Brett W. Degner, Menlo Park, CA (US); Camille Moussette, Los Gatos, CA (US); Anthony Guetta, Palo Alto, CA (US); Samuel B. Weiss, Los Altos, CA (US); Douglas A. Scott, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/800,630

(22) Filed: Nov. 1, 2017

(65) Prior Publication Data

US 2018/0075715 A1   Mar. 15, 2018

Related U.S. Application Data

(63) Continuation of application No. 14/841,582, filed on Aug. 31, 2015, now Pat. No. 9,830,782.

(60) Provisional application No. 62/129,693, filed on Mar. 6, 2015, provisional application No. 62/044,964, filed on Sep. 2, 2014.

(51) Int. Cl.
| | |
|---|---|
| *H04B 3/36* | (2006.01) |
| *G08B 6/00* | (2006.01) |
| *G06F 3/01* | (2006.01) |
| *H04L 12/18* | (2006.01) |
| *H04M 19/04* | (2006.01) |
| *H01H 3/00* | (2006.01) |

(52) U.S. Cl.
CPC ............... *G08B 6/00* (2013.01); *G06F 3/016* (2013.01); *H04L 12/1895* (2013.01); *H04M 19/047* (2013.01); *H01H 2003/008* (2013.01)

(58) Field of Classification Search
CPC ....... G08B 6/00; G08F 3/016; H04L 12/1895; H04B 3/36
See application file for complete search history.

(56) References Cited

U.S. PATENT DOCUMENTS

| | | |
|---|---|---|
| 3,001,049 A | 9/1961 | Didier |
| 3,390,287 A | 6/1968 | Sonderegger |
| 3,419,739 A | 12/1968 | Clements |
| 4,236,132 A | 11/1980 | Zissimopoulos |

(Continued)

FOREIGN PATENT DOCUMENTS

| | | |
|---|---|---|
| AU | 2015100710 | 7/2015 |
| AU | 2016100399 | 5/2016 |

(Continued)

OTHER PUBLICATIONS

Astronomer's Toolbox, "The Electromagnetic Spectrum," http://imagine.gsfc.nasa.gov/science/toolbox/emspectrum1.html, updated Mar. 2013, 4 pages.

(Continued)

*Primary Examiner* — Phung Nguyen
(74) *Attorney, Agent, or Firm* — Brownstein Hyatt Farber Schreck, LLP

(57) ABSTRACT

Embodiments of the present disclosure are directed to a haptic actuator or a device having a haptic actuator that is capable of producing short, sharp and crisp pulses in a short amount of time.

35 Claims, 27 Drawing Sheets

(56) References Cited

U.S. PATENT DOCUMENTS

| | | |
|---|---|---|
| 4,412,148 A | 10/1983 | Klicker et al. |
| 4,414,984 A | 11/1983 | Zarudiansky |
| 4,490,815 A | 12/1984 | Umehara et al. |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,069,433 A | 5/2000 | Lazarus et al. |
| 6,078,308 A | 6/2000 | Rosenberg et al. |
| 6,104,947 A | 8/2000 | Heikkila et al. |
| 6,127,756 A | 10/2000 | Iwaki |
| 6,135,886 A | 10/2000 | Armstrong |
| 6,218,966 B1 | 4/2001 | Goodwin |
| 6,219,033 B1 | 4/2001 | Rosenberg |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,747,400 B2 | 6/2004 | Maichl et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Node et al. |
| 7,647,196 B2 | 1/2010 | Kahn et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,886,631 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |
| 8,044,940 B2 | 10/2011 | Narusawa |
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |

(56) References Cited

U.S. PATENT DOCUMENTS

| | | |
|---|---|---|
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yakima et al. |
| 8,174,372 B2 | 5/2012 | da Costa |
| 8,179,027 B2 | 5/2012 | Barta et al. |
| 8,179,202 B2 | 5/2012 | Cruz-Hernandez et al. |
| 8,188,623 B2 | 5/2012 | Park et al. |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,344,834 B2 | 1/2013 | Niiyama |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,411,058 B2 | 4/2013 | Wong et al. |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Pope et al. |
| 8,710,966 B2 | 4/2014 | Hill |
| 8,717,309 B2 | 5/2014 | Almalki |
| 8,723,813 B2 | 5/2014 | Park et al. |
| 8,735,755 B2 | 5/2014 | Peterson et al. |
| 8,760,273 B2 | 6/2014 | Casparian et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,836,502 B2 | 9/2014 | Culbert et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 * | 7/2016 | Weinberg ............... G08B 6/00 |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,430,042 B2 | 8/2016 | Levin |
| 9,448,713 B2 | 9/2016 | Cruz-Hernandez et al. |
| 9,449,476 B2 | 9/2016 | Lynn |
| 9,452,268 B2 | 9/2016 | Badaye et al. |
| 9,454,239 B2 | 9/2016 | Elias et al. |
| 9,467,033 B2 | 10/2016 | Jun et al. |
| 9,468,846 B2 | 10/2016 | Terrell et al. |
| 9,471,172 B2 | 10/2016 | Sirois |
| 9,477,342 B2 | 10/2016 | Daverman et al. |
| 9,480,947 B2 | 11/2016 | Jiang et al. |
| 9,501,912 B1 | 11/2016 | Havskjold et al. |
| 9,542,028 B2 | 1/2017 | Filiz et al. |
| 9,544,694 B2 | 1/2017 | Abe et al. |
| 9,564,029 B2 | 2/2017 | Morrell et al. |
| 9,576,445 B2 | 2/2017 | Cruz-Hernandez |
| 9,608,506 B2 | 3/2017 | Degner et al. |
| 9,622,214 B2 | 4/2017 | Ryu |
| 9,640,048 B2 | 5/2017 | Hill |
| 9,652,040 B2 | 5/2017 | Martinez et al. |

(56) References Cited

U.S. PATENT DOCUMENTS

| | | |
|---|---|---|
| 9,659,482 B2 | 5/2017 | Yang et al. |
| 9,665,198 B2* | 5/2017 | Kies .................... G06F 3/0414 |
| 9,692,286 B2 | 6/2017 | Endo et al. |
| 9,594,450 B2 | 7/2017 | Lynn et al. |
| 9,727,157 B2 | 8/2017 | Ham et al. |
| 9,778,743 B2 | 10/2017 | Grant et al. |
| 9,779,592 B1 | 10/2017 | Hoen |
| 9,823,833 B2 | 11/2017 | Grant et al. |
| 9,904,393 B2 | 2/2018 | Frey et al. |
| 9,934,661 B2 | 4/2018 | Hill |
| 9,990,099 B2 | 6/2018 | Ham et al. |
| 10,067,585 B2 | 9/2018 | Kim |
| 10,139,959 B2 | 11/2018 | Butler et al. |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0043725 A1 | 2/2007 | Hotelling et al. |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0167704 A1 | 7/2009 | Terlizzi et al. |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0243997 A1* | 10/2009 | Tierling ................. G01H 13/00 345/156 |
| 2009/0267892 A1 | 10/2009 | Faubert |
| 2009/0291670 A1 | 11/2009 | Sennett et al. |
| 2009/0313542 A1 | 12/2009 | Cruz-Hernandez |
| 2010/0020036 A1 | 1/2010 | Hui et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0007023 A1 | 1/2011 | Abrahamsson et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0157052 A1 | 6/2011 | Lee et al. |
| 2011/0163985 A1 | 7/2011 | Bae et al. |
| 2011/0193824 A1 | 8/2011 | Modarres et al. |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0127088 A1 | 5/2012 | Pance et al. |
| 2012/0133494 A1 | 5/2012 | Cruz-Hernandez et al. |
| 2012/0139844 A1 | 6/2012 | Ramstein et al. |
| 2012/0206248 A1 | 8/2012 | Biggs |
| 2012/0256848 A1 | 10/2012 | Madabusi Srinivasan |
| 2012/0274578 A1 | 11/2012 | Snow et al. |
| 2012/0280927 A1 | 11/2012 | Ludwig |
| 2012/0319987 A1 | 12/2012 | Woo |
| 2012/0327006 A1 | 12/2012 | Israr et al. |
| 2013/0027345 A1 | 1/2013 | Binzel |
| 2013/0033967 A1 | 2/2013 | Chuang et al. |
| 2013/0058816 A1 | 3/2013 | Kim |
| 2013/0063356 A1 | 3/2013 | Martisauskas |
| 2013/0106699 A1 | 5/2013 | Babatunde |
| 2013/0141365 A1 | 6/2013 | Lynn et al. |
| 2013/0191741 A1 | 7/2013 | Dickinson et al. |
| 2013/0207793 A1 | 8/2013 | Weaber et al. |
| 2013/0217491 A1 | 8/2013 | Hilbert et al. |
| 2013/0222280 A1 | 8/2013 | Sheynblat et al. |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0082490 A1 | 3/2014 | Jung et al. |
| 2014/0085065 A1 | 3/2014 | Biggs et al. |
| 2014/0143785 A1 | 5/2014 | Mistry et al. |
| 2014/0168153 A1 | 6/2014 | Deichmann et al. |
| 2014/0197936 A1 | 7/2014 | Biggs et al. |
| 2014/0232534 A1 | 8/2014 | Birnbaum et al. |
| 2014/0267076 A1 | 9/2014 | Birnbaum et al. |
| 2015/0005039 A1 | 1/2015 | Liu et al. |
| 2015/0040005 A1 | 2/2015 | Faaborg |
| 2015/0090572 A1 | 4/2015 | Lee et al. |
| 2015/0098309 A1 | 4/2015 | Adams et al. |
| 2015/0169059 A1 | 6/2015 | Behles et al. |
| 2015/0192414 A1 | 7/2015 | Das et al. |
| 2015/0194165 A1 | 7/2015 | Faaborg et al. |
| 2015/0220199 A1 | 8/2015 | Wang et al. |
| 2015/0227204 A1 | 8/2015 | Gipson et al. |
| 2015/0296480 A1 | 10/2015 | Kinsey et al. |
| 2015/0349619 A1 | 12/2015 | Degner et al. |
| 2015/0362993 A1* | 12/2015 | Billington ............... G06F 3/016 345/156 |
| 2016/0049265 A1 | 2/2016 | Bernstein |
| 2016/0063826 A1 | 3/2016 | Morrell et al. |
| 2016/0071384 A1 | 3/2016 | Hill |
| 2016/0103544 A1 | 4/2016 | Filiz et al. |
| 2016/0162025 A1 | 6/2016 | Shah |
| 2016/0163165 A1 | 6/2016 | Morrell et al. |
| 2016/0172953 A1 | 6/2016 | Degner et al. |
| 2016/0195929 A1 | 7/2016 | Martinez et al. |
| 2016/0196935 A1 | 7/2016 | Bernstein |
| 2016/0206921 A1 | 7/2016 | Szabados et al. |
| 2016/0211736 A1 | 7/2016 | Moussette et al. |
| 2016/0216764 A1 | 7/2016 | Morrell et al. |
| 2016/0216766 A1 | 7/2016 | Puskarich |
| 2016/0231815 A1* | 8/2016 | Moussette ............... G06F 3/016 |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1 | 2/2017 | Bijamov et al. |
| 2017/0070131 A1 | 3/2017 | Degner et al. |

(56) References Cited

U.S. PATENT DOCUMENTS

| | | | |
|---|---|---|---|
| 2017/0084138 A1 | 3/2017 | Hajati et al. |
| 2017/0085163 A1 | 3/2017 | Hajati et al. |
| 2017/0090667 A1 | 3/2017 | Abdollahian et al. |
| 2017/0192507 A1 | 7/2017 | Lee et al. |
| 2017/0192508 A1 | 7/2017 | Lim et al. |
| 2017/0242541 A1 | 8/2017 | Iuchi et al. |
| 2017/0255295 A1 | 9/2017 | Tanemura et al. |
| 2017/0257844 A1 | 9/2017 | Miller et al. |
| 2017/0285747 A1 | 10/2017 | Chen |
| 2017/0311282 A1 | 10/2017 | Miller et al. |
| 2017/0357325 A1 | 12/2017 | Yang et al. |
| 2017/0364158 A1 | 12/2017 | Wen et al. |
| 2018/0052550 A1 | 2/2018 | Zhang et al. |
| 2018/0060941 A1 | 3/2018 | Yang et al. |
| 2018/0081441 A1 | 3/2018 | Pedder et al. |
| 2018/0174409 A1 | 6/2018 | Hill |
| 2018/0203513 A1 | 7/2018 | Rihn |
| 2018/0302881 A1 | 10/2018 | Miller et al. |
| 2019/0159170 A1 | 5/2019 | Miller et al. |

FOREIGN PATENT DOCUMENTS

| | | |
|---|---|---|
| CA | 2355434 | 2/2002 |
| CN | 1324030 | 11/2001 |
| CN | 1692371 | 11/2005 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103567135 | 2/2014 |
| CN | 103970339 | 8/2014 |
| CN | 104220963 | 12/2014 |
| CN | 104956244 | 9/2015 |
| CN | 105556268 | 5/2016 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2003527046 | 9/2003 |
| JP | 200494389 | 3/2004 |
| JP | 2004236202 | 8/2004 |
| JP | 2006150865 | 6/2006 |
| JP | 3831410 | 10/2006 |
| JP | 2007519099 | 7/2007 |
| JP | 200818928 | 1/2008 |
| JP | 2010536040 | 11/2010 |
| JP | 2010272903 | 12/2010 |
| JP | 2011523840 | 8/2011 |
| JP | 2012135755 | 7/2012 |
| JP | 2014002729 | 1/2014 |
| JP | 2014509028 | 4/2014 |
| JP | 2014235133 | 12/2014 |
| JP | 2014239323 | 12/2014 |
| JP | 2015228214 | 12/2015 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/016932 | 5/1997 |
| WO | WO 00/051190 | 8/2000 |
| WO | WO 01/059558 | 8/2001 |
| WO | WO 01/089003 | 11/2001 |
| WO | WO 02/073587 | 9/2002 |
| WO | WO 03/038800 | 5/2003 |
| WO | WO 03/100550 | 12/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/150667 | 10/2013 |
| WO | WO 13/169299 | 11/2013 |
| WO | WO 13/169302 | 11/2013 |
| WO | WO 13/173838 | 11/2013 |
| WO | WO 13/186846 | 12/2013 |
| WO | WO 13/186847 | 12/2013 |
| WO | WO 14/018086 | 1/2014 |
| WO | WO 14/098077 | 6/2014 |
| WO | WO 15/023670 | 2/2015 |

OTHER PUBLICATIONS

Nasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.
Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.
Kim et al., "Tactile Rendering of 3D Features on Touch Surfaces," UIST '13, Oct. 8-11, 2013, St. Andrews, United Kingdom, 8 pages.
Lee et al, "Haptic Pen: Tactile Feedback Stylus for Touch Screens," Mitsubishi Electric Research Laboratories, http://wwwlmerl.com, 6 pages, Oct. 2004.
Nakamura, "A Torso Haptic Display Based on Shape Memory Alloy Actuators," Massachusetts Institute of Technology, 2003, pp. 1-123.
U.S. Appl. No. 15/881,476, filed Jan. 26, 2018, Moussette et al.
U.S. Appl. No. 15/621,966, filed Jun. 13, 2017, Pedder et al.

(56) References Cited

OTHER PUBLICATIONS

U.S. Appl. No. 15/621,930, filed Jun. 13, 2017, Wen et al.
U.S. Appl. No. 15/622,017, filed Jun. 13, 2017, Yang et al.
U.S. Appl. No. 15/641,192, filed Jul. 3, 2017, Miller et al.
U.S. Appl. No. 16/259,645, filed Jan. 28, 2019, Miller et al.
U.S. Appl. No. 16/352,784, filed Mar. 13, 2019, Moussette et al.
Actuator definition downloaded from http://www.thefreedictionary.com/actuator on May 3, 2018, 2 pages.

* cited by examiner

HAPTIC NOTIFICATIONS

CROSS-REFERENCE TO RELATED APPLICATIONS

This application is a continuation of U.S. Nonprovisional patent application Ser. No. 14/841,582, filed Aug. 31, 2015, which is a nonprovisional patent application of and claims the benefit to U.S. Provisional Patent Application No. 62/044,964, filed Sep. 2, 2014 and titled "Haptic Notifications," and to U.S. Provisional Patent Application No. 62/129,693 filed Mar. 6, 2015 and titled "Haptic Notifications," the disclosures of each of which are hereby incorporated herein by reference in their entirety.

FIELD

The present disclosure is directed to alert output. Further, the embodiments disclosed herein are directed to haptic actuators, as well as input to the haptic actuators and output characteristics that are used to generate or provide various types of haptic alerts and other alert output for electronic devices.

BACKGROUND

Electronic devices are commonplace in today's society. These electronic devices include cell phones, tablet computers, personal digital assistants and the like. Some of these electronic devices include an ability to notify a user of a particular item of interest, such as, for example, an incoming phone call, or may otherwise attempt to gain the user's attention through the use of various alerts. These alerts may include vibrating motors, noise from speakers in the form of ringtones, visual graphics, and the like. In some instances, the alerts may include an alert component or simply a user interface component, such as, for example in the form of a visual notification.

Most electronic devices use the same haptic alert to notify users about multiple items of interest. As a result, it may be difficult to immediately distinguish between a telephone call, a text message or other such notification. This is often caused because the haptic actuator in these electronic devices is limited in its output or operation. Furthermore, conventional rotary eccentric mass motors generally produce a very "buzzy" output caused by the spinning and/or oscillation of an eccentric weight about a shaft.

It is with respect to these and other general considerations that embodiments of the present disclosure have been made. Although relatively specific problems have been discussed, it should be understood that the embodiments described herein should not be limited to solving the specific problems identified in this background.

SUMMARY

Generally, embodiments described herein may take the form of, or include, an actuator operative to output haptic or tactile language expressed as a series of haptic or tactile outputs. The individual haptic input or output waveforms (known herein as "atoms") may be combined with one another to convey increasingly complex information. Thus, the atoms may be combined in a variety of fashions to provide specialized outputs with particular meanings, or otherwise correspond to particular operations, alerts, states, statuses, receipt and/or transmission of data by an electronic device. The actuator may be part of, or otherwise incorporated into, the electronic device or may be separate from, but associated with, the electronic device.

The haptic input and/or outputs may be used to provide discrete and discreet alerts or notifications of information associated with the electronic device. Such information may include data received by the electronic device, displayed by the electronic device, operating parameters of the electronic device and so on. In certain embodiments, the haptic outputs, although generated by the electronic device, may be in response to events occurring on a separate device. For example, a wearable electronic device may generate haptic output(s) based on information associated with, received by, or sent from a mobile phone or tablet computer.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Generally, haptic outputs may be used to notify, alert or otherwise gain the attention of a person or a user. For example, a wearable device may include an actuator that moves or shakes the wearable device, such that the person wearing the wearable device has his or her attention drawn to it. In many cases described herein, a haptic or tactile output may provide alert functionality that is relatively imperceptible beyond the person interacting with the device producing the haptic output.

Figure 13:
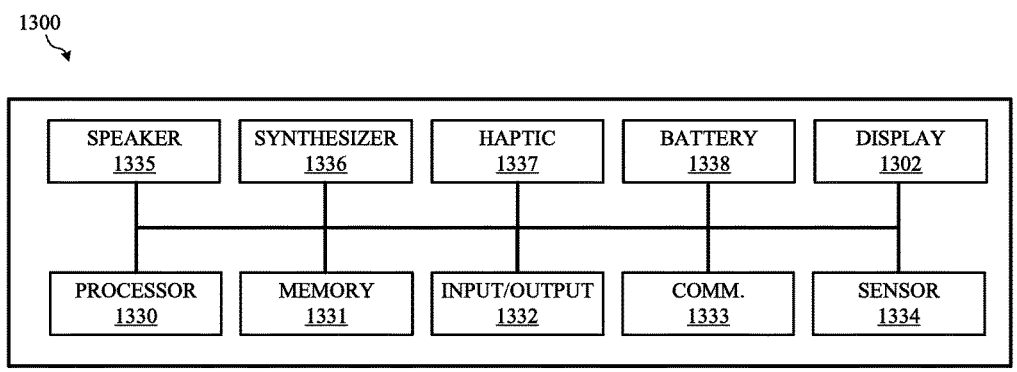
FIG. 13 illustrates an example electronic device and its associated components according to one or more embodiments of the present disclosure.
Figure 14:
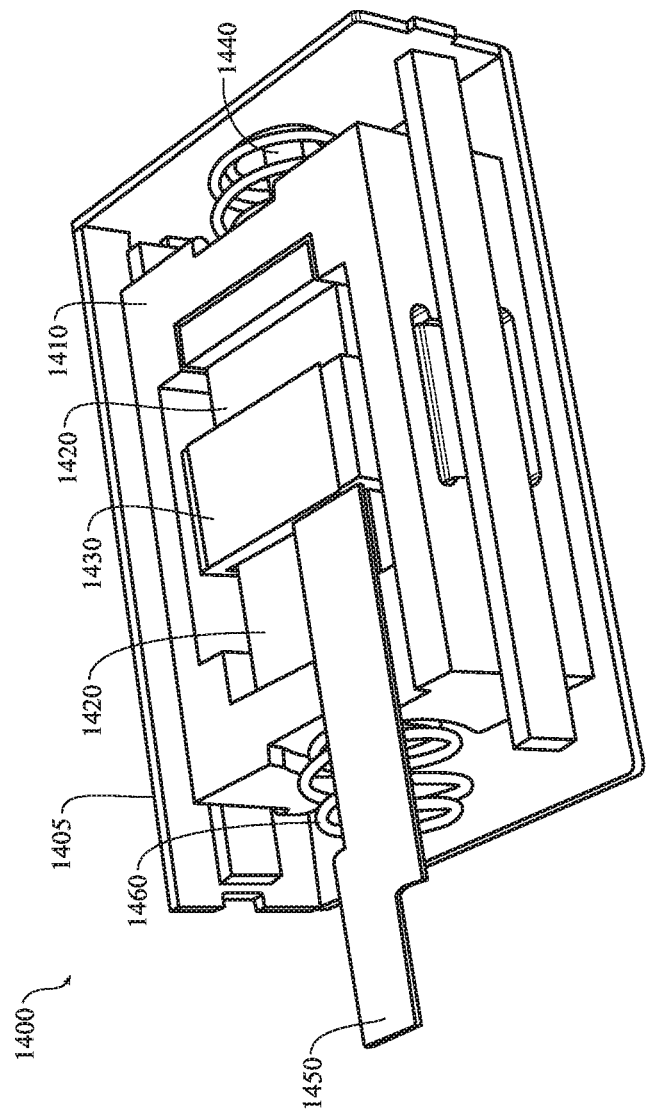
FIG. 14 illustrates a haptic actuator that may be used to provide haptic output according to one or more embodiments of the present disclosure.

Example electronic devices (such as those shown in FIGS. 12A-13) may be physically coupled to an actuator (such as shown in FIG. 14) that is operative to produce a haptic/tactile output. Generally, a haptic actuator produces relative motion between two parts of the electronic device. More specifically, and in one embodiment, the haptic actuator includes an internal mass that moves with respect to a mass of the electronic device. For example, the haptic actuator reacts to an actuator input waveform to create forces that move the internal mass relative to the electronic device. These forces impart kinetic energy to the electronic device, thereby inducing motion in the device. This device motion may be represented by a device output waveform.

This device motion may be felt by a person wearing, holding, or interacting with the device. Specifics of the sample electronic device and sample actuator are provided later herein.

The terms "haptic" and "tactile" are used herein. It should be understood that, although haptic may sometimes refer to a sense or perception of force and tactile may sometimes refer to a sense or perception of touch, the two terms may be used herein in a substantially interchangeable manner and each term is intended to encompass the other. Thus, a haptic output may encompass a tactile output and a tactile output may encompass a haptic output.

Certain embodiments may employ unique and distinct haptic waveforms ("atoms") to provide haptic alerts to a user. More specifically, an atom may correspond to a drive signal that includes a voltage, a voltage value, a current or other electrical input that is configured to control an actuator. In some embodiments, once the atom has been played by the actuator, the actuator may return to its nominal position.

These atoms may be combined in a variety of forms and ways to create different haptic patterns. The atoms may be thought of as letters of a haptic language. Each atom may represent a base building block or a base haptic pattern or waveform of the haptic language. Accordingly, the combination of different atoms results in different words and/or phrases in the haptic language. As the various atoms are combined in different patterns, the alerts of the haptic language may become more advanced. As a result, different "words" or "phrases" of the haptic language may be associated with, for example, various alert events or notifications. The various atoms may be chosen from a predefined or prearranged library of atoms. The atoms in the library may also be freely combined with one another. In some implementations, different combinations of atoms may be cycled or otherwise repeated at a given frequency or over a certain duration of time. For example, a first atom or combination of atoms may be played 10 times at certain intervals. This cycle may then be repeated for a specified number of times and/or for specified duration.

As a user of the electronic device becomes familiar with the haptic language, the user may be able to understand what event notifications or alerts are being received based, for example, solely or in part on the haptic output provided by the haptic language. Further, a user (or developer) may be able to program or create a customized haptic language specific or otherwise tailored to the needs of the user, a program, an application and the like. Audio and/or acoustic output may also be provided as part of, or in addition to, a haptic waveform of an alert. Addition of the audio output may further enhance the haptic language and/or enable further customization of alerts.

Accordingly, alerts may be generated: upon receipt of data by the electronic device from an external source (text messages, emails, phone calls, warning systems, and the like); by an application (for example, to indicate that a user input is requested); upon reaching a certain time (for example, a time at which a calendar entry occurs); by an operational state of the electronic device (for example, a low battery charge, an upgrade to the operating system of the electronic device, the temperature of the electronic device reaching a certain point and so on); through a user-initiated setting (an alarm set to occur at a certain time); due to geographic factors (entering or exiting a certain area); proximity to another person and/or another electronic device); and so on. These and other alert conditions will be appreciated upon reading this document in its entirety.

Basic atoms may correspond to simple alerts while more complex combinations of atoms may correspond to more intricate alerts. Various alerts may be provided for a variety of operations of an electronic device, information received by an electronic device, information displayed by an electronic device, interactions with a graphical user interface of an electronic device, acknowledgement of user inputs, and so on, collectively referred to as "alert events" or "alert conditions." Additional examples of alert events may include: 1) incoming and/or outgoing text based communications such as, for example, an email, a text message and so on; 2) incoming and/or outgoing voice, image and/or video communications; 3) calendaring and/or appointment notifications; 4) electronic device alert notifications such as, for example, a low battery notification, electronic device or application update notifications, electronic device pairing notifications, and so on; 5) location and/or directional based notifications; 6) application based notifications such as, for example, push notifications, alerts and so on from various applications that are executing on the electronic device or on a companion device; 7) time based notifications such as alarms, time notifications, and so on; and 8) health related or physiological conditions or notifications. In some embodiments, the alert notification may be played by multiple devices concurrently or substantially concurrently.

In other implementation, a first device may begin to play an alert notification and an associated electronic device or a companion device may assume the output or playback of the alert notification. In still yet other implementations, various alert conditions may correspond to different electronic devices. In such cases, the alert notifications may be played on a single electronic device or multiple electronic devices. Although specific alert events are stated above, these are examples and not to be taken in a limiting sense.

In certain embodiments, a unique haptic output may be associated with any or all of the example alert events listed above (and more). Thus, when one alert event occurs or is about to occur, a haptic output associated with that particular alert event is provided by the electronic device. A user or wearer of the electronic device will feel the haptic alert when he or she is wearing the electronic device or interacting with the electronic device. Thus, the user or wearer of the electronic device may be able to distinguish one alert event from other alert events.

More specifically, each type of haptic output that is associated with a particular alert event may be made up of different patterns or combinations of haptic atoms. For example, when an email notification event is received, a first haptic output pattern may be provided by the electronic device. In this example, the first haptic output pattern may consist of a first type of haptic atom provided at a first time, followed by a second type of haptic atom provided at a second time, followed by a third type of haptic atom provided at a third time. In such embodiments, the combination of the first type of haptic atom, the second type of haptic atom and the third type of haptic atom is a unique pattern of haptic output that is associated with an email message. In another example, if a telephone communication is received, the electronic device may provide a second haptic output pattern consisting of a first type of haptic atom followed by three iterations of a second type of haptic atom.

In addition to the patterns or combinations of haptic atoms, the haptic output for an alert event may also include various types of audio output. The audio output may be provided with, before or after each haptic atom.

Figure 1:
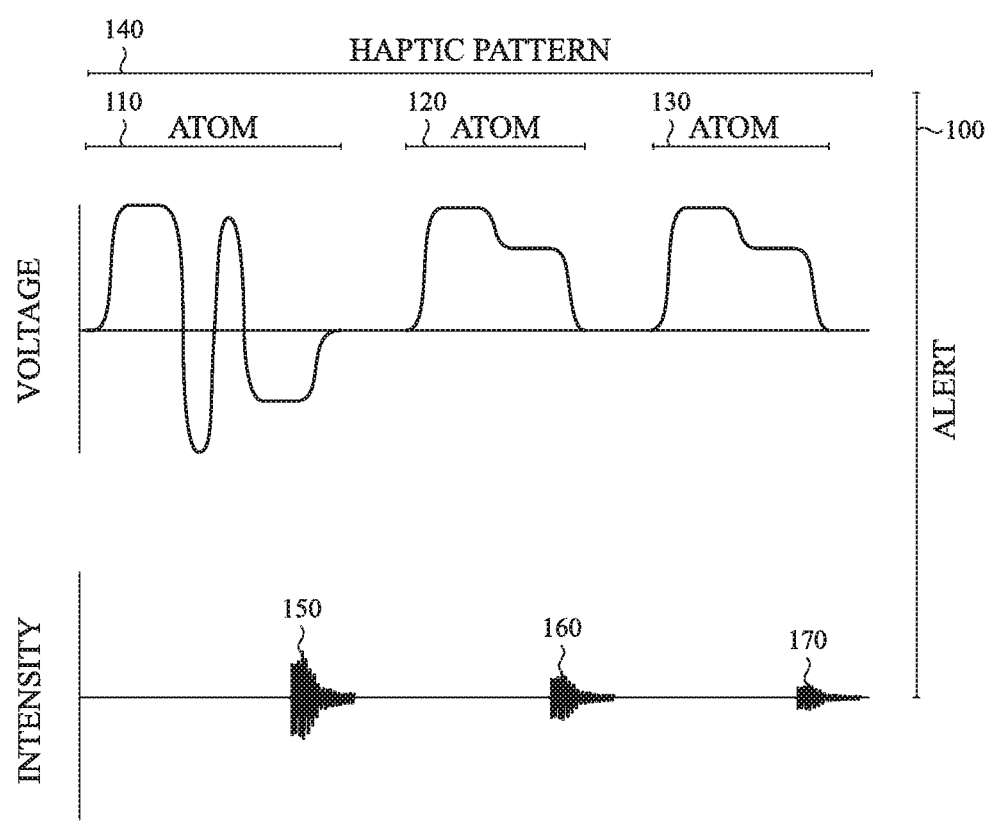
FIG. 1 illustrates an example alert event comprising various atoms according to one or more embodiments of the present disclosure.

For example, as shown in FIG. 1, an alert event 100 may include a first haptic atom 110, followed by a second haptic atom 120 which is followed by a third haptic atom 130. As also shown in FIG. 1, each atom may be followed by an audio output. For example, audio output 150 may be output such that it overlaps the end of the first haptic atom 110, audio output 160 may be output slightly after the second haptic atom 120 and audio output 170 may be provided slightly after the third haptic atom 130. Further, the intensity and/or frequency of each audio output may increase decrease over a given time period. Although audio output is shown and described as being output slightly after each atom, in some embodiments the audio output may be output before, during or after each atom.

The combination of each of the haptic atoms 110, 120, and 130 constitute a haptic pattern 140. For example and as discussed above, each haptic atom 110, 120 and 130 represents a base building block of the haptic language. Thus, when combined, each haptic atom 110, 120 and 130 make up a particular phrase in the haptic language. Addition of various types of audio output, such as audio output 150, 160 and 170 may also be used as part of the haptic language.

As yet another example and returning to the concept of a haptic language, a notification or an alert of an incoming video call may be formed from two atoms or two haptic patterns. For example, one atom or pattern may correspond to "video," "image," or the like and another atom or pattern may correspond to "telephone call," "message," and so on. This may permit a user to perceive the nature of the alert and/or the underlying event once the user appreciates and comprehends the meaning of the individual haptic atoms or patterns. It should be appreciated that sample words or phrases created from atoms need not bear any relationship to the individual atoms used to create the particular term, word or phrase. For example, although various types of atoms may be combined to form a notification of an incoming telephone call, each individual atom in the combination need not be specifically directed to a notification of an incoming message, telephone call, etc.

In each of the examples above, a time delay (either constant and/or variable) may be interspersed between each type of haptic atom that makes up each haptic output pattern. Continuing with the example of FIG. 1 described above, a first time delay may be provided between the first haptic atom 110 and the second haptic atom 120. However, a different time delay (e.g. a time delay that is either longer or shorter than the first time delay) may be provided between the second haptic atom 120 and the third haptic atom 130.

In some instances, the time delay between each atom may be associated with a particular atom being played. For example, a first type of atom may require a set time delay before a second atom is played in order to ensure that an actuator mass of the haptic actuator has stopped moving or has returned to its nominal position, a predetermined position or a particular condition. A variable delay may also be placed between sequences of atoms to increase or decrease the time delay between each of the atoms. Although specific examples have been given, embodiments described herein are not so limited and various types of haptic output patterns may be created and used for a variety of alert events, conditions or notifications.

Generally, three different waveforms may be involved in or associated with any given atom. First, an input waveform may be provided to the haptic actuator. Next, the actuator may move in response to the input waveform, thereby generating an actuator waveform. Third, the motion of the haptic actuator (or a mass of the haptic actuator) may produce a motion of the electronic device, which is expressed as a device waveform. It should be appreciated that the device waveform may have an amplitude or an intensity that is different from the amplitude or the intensity of the actuator waveform due to the mass of the device when compared to the mass of the actuator. Further, the device waveform may be have a displacement direction that is opposite from the displacement direction of the actuator waveform since the motion of the actuator/mass causes an opposing motion of the device.

Figure 2:
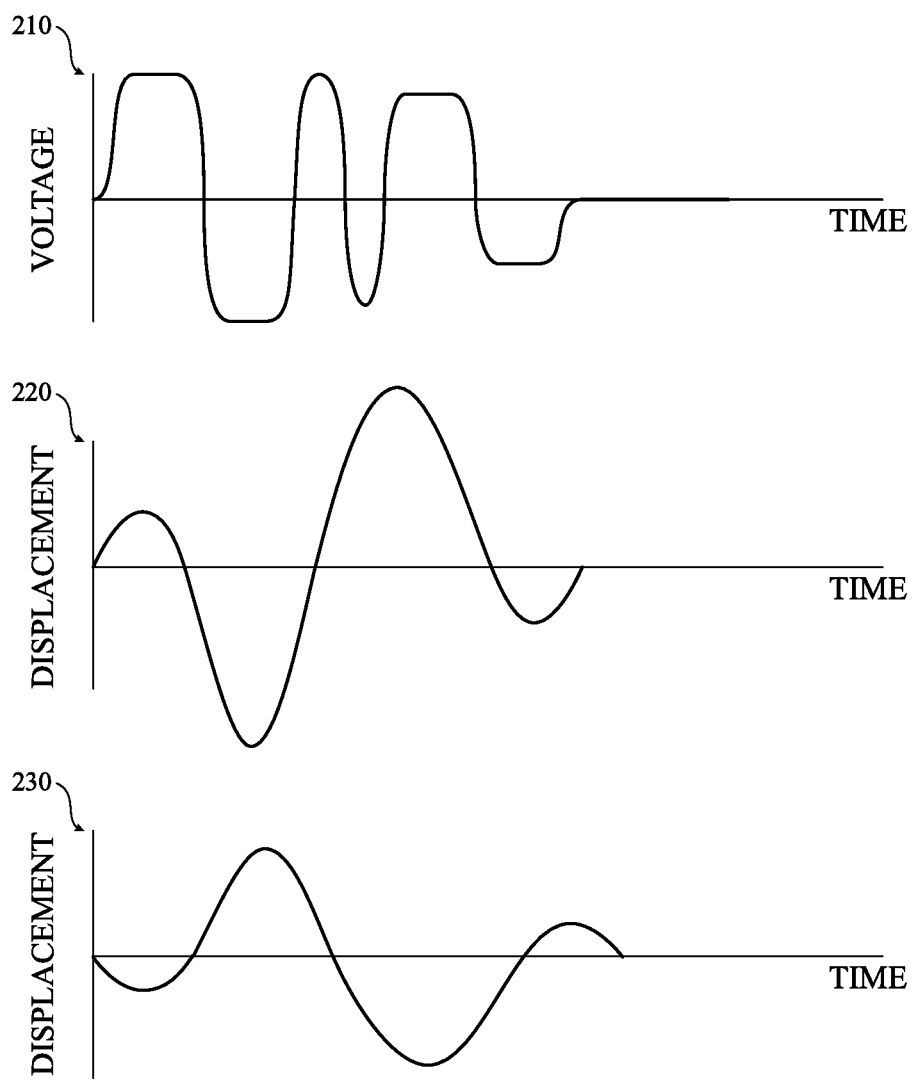
FIG. 2 illustrates example input and output waveforms according to one or more embodiments of the present disclosure.

This concept is further illustrated in FIG. 2. For example and as shown, an input waveform 210, such as a current, a voltage, a voltage value or other electrical input, may be provided to a haptic actuator of the electronic device. In response to the input waveform 210, the movement or displacement of the actuator, or the actuator mass, may be expressed as an output waveform 220. Movement or displacement of the actuator as represented by the output waveform 220 causes the electronic device to move. Like the movement of the actuator, the movement of displacement of the electronic device may be represented as a device waveform 230.

Further, the term "output waveform" or "output atom" as used herein, may encompass both actuator waveforms and device waveforms. In some embodiments, a device waveform may be substantially identical to an actuator waveform except that its amplitude or intensity may be a percentage of the amplitude or intensity of the actuator waveform, insofar as the device has greater mass than the actuator (or a moving part of the actuator).

As will be explained below, each atom, sequence of atoms, and/or combination of atoms may be described or defined with respect to various parameters and/or waveforms. Likewise, the various input waveforms may be described using similar parameters.

Generally, "parameters" of a waveform are those characteristics of a waveform that are measurable and variable. Thought of another way, varying a parameter of a waveform may vary a haptic output of an electronic device. Typically, although not necessarily, a waveform (be it input, actuator or device) may be described and shown on a graph of any two parameters, where each parameter corresponds to an axis of the graph. Certain parameters may be more useful than others in describing certain waveforms.

In some embodiments, these parameters may include: 1) displacement; 2) frequency; 3) shape of the waveform; 4) an envelope associated with the waveform; 5) velocity; 6) intensity or amplitude; 7) zero crossings; 8) force; 9) time; 10) mass of the actuator; 11) mass of an electronic device and/or a housing of the electronic device; 12) number of cycles; and 13) momentum of the actuator or the electronic device. Each of these parameters may be viewed with respect to other parameters set forth above and various other parameters. In some embodiments, an intensity of a waveform may include or be associated with an amplitude of a waveform. Thus, the higher the intensity of a particular haptic output or output waveform, the higher the amplitude of the waveform.

For example and as will be shown below, displacement and velocity may be described with respect to time. Further, insofar as momentum is equal to mass times velocity, the waveform of any graph showing velocity vs. time also illustrates a scaled version of momentum vs. time, insofar as the masses of the moving parts of the actuator or housing are time-invariant. Likewise, force may be described with respect to mass. In yet other examples, the shape of the atom may include characteristics of a waveform such as, for example, whether the waveform is a square wave, a sinusoidal wave and so on.

A "zero crossing" is a crossing of a graph axis by the waveform, including crossing at a threshold percentage of a peak value or at a DC offset. Thus, for a waveform expressed as a plot of displacement with respect to time, each intersection of the waveform with the time axis is a zero crossing. In some embodiments, a zero crossing occurs when a given parameter exceeds a minimum threshold of a maximum or peak value of that parameter, or a predetermined minimum threshold value. For example, if displacement was the given parameter, and a peak or maximum displacement value of an actuator mass of the haptic actuator was ten, a zero crossing would occur when the displacement of the actuator mass crosses a threshold percentage (e.g., 10%), or some other threshold value, of the peak displacement (e.g., a ringdown threshold). Although crossing of graph axis is specifically mentioned, certain embodiments may account for any DC offset that may be present in the system. For example, if DC offset was present in the system such that crossing of an axis did not occur, or did not occur in the specified amount of times as set forth herein, the waveform may still have the specified number of zero crossings if such an offset were removed from the system.

Further, each atom may be expressed in terms of an envelope. An envelope may bind a varying signal with one or more smooth curves that outline the amplitude extremes of the signal. These bounded regions may indicate, for example, an area in which the waveform may vary slightly, significantly, or not at all while still providing a desired result. An envelope can also be applied to a waveform to conform the amplitude extremes of the waveform to a desired behavior.

As discussed above, haptic outputs may be formed from one or more haptic atoms. For example, certain output waveforms may be associated with a haptic output having a particular or desired haptic profile within a target number of zero crossings. For example, one sample haptic output from the actuator may be described or illustrated as an output waveform that has four or fewer zero crossings. As described above, additional output waveform parameters may include the amplitude of the displacement and/or the time in which the zero crossings occur. In certain embodiments, reducing the number of zero crossings and/or bounding such zero crossings within a time envelope, while maintaining a relatively large displacement of a moving mass of the haptic actuator, may provide a noticeable haptic output in a relatively short amount of time.

In addition to the parameters described above, each atom may be described in terms of the feel of the haptic output and/or the waveform associated with the atom. For example, each waveform, whether an input waveform or an output waveform, may have a shape that is tailored to provide a specific result. In the case of an input waveform, that shape may be designed to generate a particular output waveform having desired, useful or predetermined haptic properties (or, in some cases, auditory properties or combinations of haptic and auditory properties). For example, the input waveform may have a sinusoidal shape. In other implementations, the input waveform may be a square waveform or a substantially square waveform.

In one embodiment, one of the atoms described herein may be referred to as a "tap." In certain embodiments, the tap may be perceived as a crisp, single haptic tap, much like a tap for gaining someone's attention. In addition, one atom may be called a "mini-tap." The mini-tap creates a weaker but sharper tap sensation than the tap described above. Another type of atom is described herein as a "micro-tap." The micro-tap may be described as creating a weaker but sharper sensation than the mini-tap just described. Each of these atoms, along with their resulting output waveforms, will be discussed in greater detail below.

In addition to the tap, mini-tap and micro-tap atoms described above, additional atoms may be referred to herein as a "sine," "sine with a boost," "sine with a brake," and "sine with a boost and a brake." Further, each of these atoms may have an associated haptic feel. For example, the sine atom may be a pure sine wave that takes a few cycles to achieve a steady-state amplitude. As a result, the beginning and end of the haptic output may not be as crisp and/or sharp as the tap atom described above. As will be described below, the sine with a boost may have a crisp and/or sharp start while the sine with a brake may have a sharp and/or crisp stop. Further, the sine with a boost and a brake may have both a sharp and/or crisp start and a sharp and/or crisp stop.

In addition to the above atoms, an electronic device or system can also be configured to permit a user or designer/developer to create and/or generate various types of custom atoms, each of which provide haptic output. In such embodiments, each custom atom may have an associated input waveform, output waveform and tactile feel. These custom atoms may be bound by certain maximum parametric values in order to maintain system operation. As one non-limiting example, a maximum displacement of the actuator mass may be defined by the system to prevent the mass from impacting the actuator enclosure. As another non-limiting example, a minimum time between atoms may be system-specified to permit the actuator to attain a particular operating state after completion of one atom and before beginning another atom. The electronic device or system can bound by any of the above-identified parameters.

FIGS. 3A-10C illustrate different atoms (including their associated input and output waveforms) and envelopes that may be played and/or used by the electronic device and/or a haptic actuator associated with the electronic device. Although various waveforms and envelopes are shown and described with respect to FIGS. 3A-10C, the waveforms and envelopes, including the amplitudes, the intensity, and directions of the waveforms, are for illustrative purposes. As shown in these figures and described below, each atom, sequence of atoms, and/or combination of atoms may be described or defined with respect to various parameters. Likewise, the various output waveforms may be described using similar parameters.

As discussed above, these parameters may include but are not limited to: 1) displacement; 2) frequency; 3) shape of the waveform; 4) an envelope associated with the waveform; 5) velocity; 6) intensity or amplitude; 7) zero crossings; 8) force; 9) time; 10) mass of the actuator; 11) mass of an electronic device; 12) number of cycles; 13) momentum; and so on. In some embodiments, some of these parameters may be constrained by various envelopes. In other embodiments, these parameters may be viewed with respect to additional parameters. Although specific examples using the above parameters are illustrated in the accompanying figures, these figures, and their associated parameters, are for illustrative purposes only.

Figure 3A:
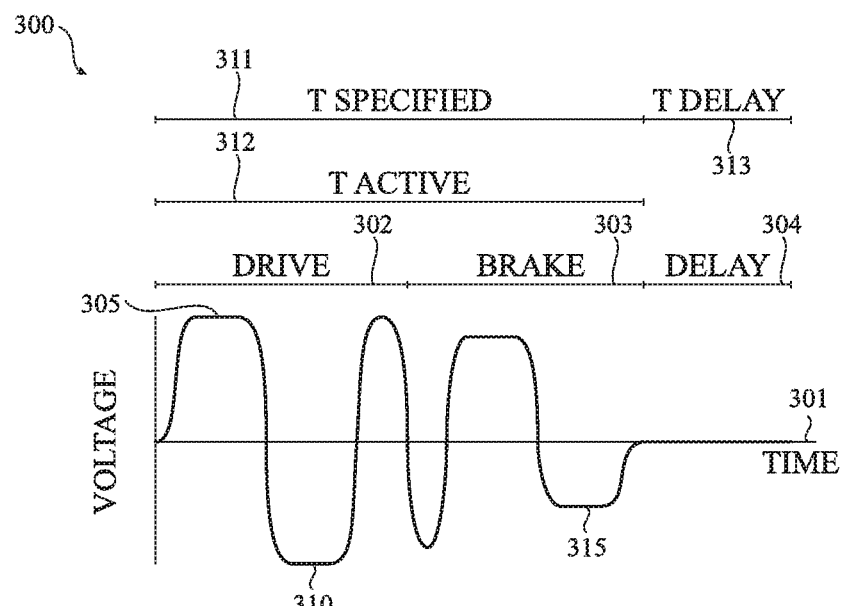
FIG. 3A illustrates an example input waveform that may be applied to a haptic actuator to produce a first type of haptic output according to one or more embodiments of the present disclosure.
Figure 3B:
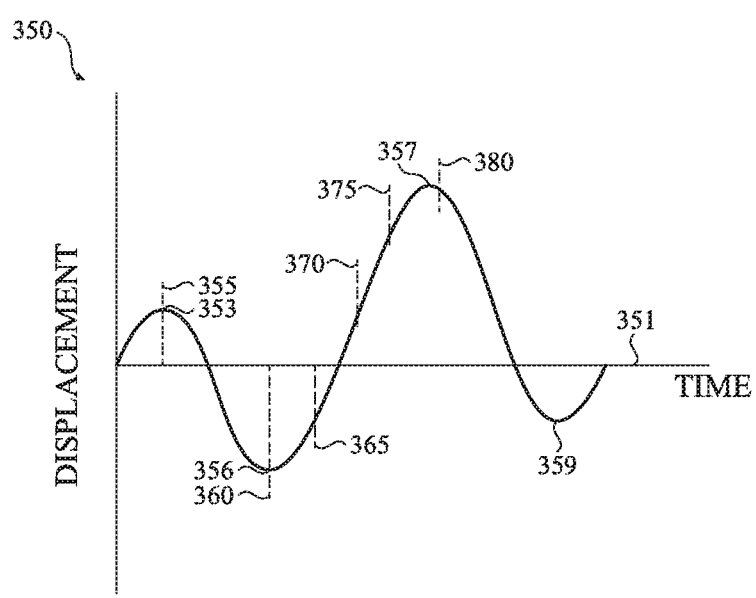
FIG. 3B illustrates an example output waveform for providing the first type of haptic output according to one or more embodiments of the present disclosure.

FIG. 3A illustrates an example input waveform 300 that may be used to produce a first type of haptic output (e.g., output atom or output waveform) according to one or more embodiments of the present disclosure. Although a substantially square waveform is shown and described with respect to FIG. 3A, the input waveform 300 may have a variety of shapes including a sinusoidal waveform, a saw tooth waveform and so on. FIG. 3B illustrates an example output waveform 350 that results from the input waveform 300 being played by a haptic actuator, such as, for example, haptic actuator 1400 (FIG. 14). In certain embodiments, the input waveform 300 causes a haptic actuator of an electronic device to output a first type of haptic output. More specifically, the input waveform 300 and the output waveform 350 correspond to haptic output described herein as a "tap" atom.

In certain embodiments, the atom known as the tap, as well as the other types of haptic output described herein, may be quieter than a typical haptic output produced by conventional haptic actuators. In some embodiments, the haptic output provided by each of the atoms described herein is up to ten times quieter than a conventional vibration provided by other haptic actuators. As a result, the haptic notifications may be more private. That is, the haptic output provided by the haptic actuator may be perceived by a user wearing or interacting with the wearable electronic device with little to no perception by others.

As shown in FIG. 3A, the input waveform 300 associated with the tap atom may be represented as a substantially square waveform having a drive period 302, a brake period 303, and a delay period 304. As shown, each of the drive period 302, the brake period 303 and the delay period 304 may be applied at different times along a time period 301. In certain embodiments, the drive period 302 and the brake period 303 collectively make up an active period. The active period may be described as a section of an atom, such as input waveform 300, where the waveform is carefully crafted and tuned to achieve a desired actuation and haptic output. In some embodiments, the time duration of the active period may be between six and forty milliseconds. In some examples, the time duration of the active period is approximately thirty-five milliseconds. The drive period 302 and the brake period 303 may each be between approximately three milliseconds and twenty milliseconds. In some instances, the drive period 302 may be approximately seventeen and a half milliseconds and the brake period 303 may be approximately seventeen and a half milliseconds. Further, the drive period 302 may be described as part of the waveform where controlled excitation is applied to the haptic actuator. For example, the drive period 302 cause an electromotive force to "push" and/or "pull" on the actuator mass of the haptic actuator to excite movement. Put another way, the electromotive force may "push" the actuator mass in a first direction and "pull" the actuator mass in a second direction once movement of the actuator mass in the first direction has stopped. The "push" followed by the "pull" may act to increase displacement, velocity and/or momentum such as described below.

The brake period 303 may be described as a period in which a brake (or a drive in reverse) is applied to the actuator and in which excitation of the haptic actuator is stopped (also known as open loop braking). Likewise, the brake period 303 may cause an electromotive force to "push" and/or "pull" on the actuator mass in order to slow and eventually stop movement of the actuator mass. For example, as the actuator mass is traveling in a first direction, the electromotive force may "push" against the actuator mass in order to slow or otherwise reduce movement, displacement, velocity and/or momentum of the actuator mass. When the actuator mass moves in a second direction, the electro motive force may "pull" against the actuator mass to further slow the actuator mass.

As also shown in FIG. 3A, the input waveform 300 may include a delay period 304. In certain embodiments, the delay period 304 is configured to provide a safety margin between atoms when atoms are stitched together (e.g., combined, placed in sequence etc.). In certain embodiments, the delay period 304 helps prevent residual motion from cascading to a following atom, which could result in excessive actuator excitation and impact. In some embodiments, each input waveform described herein may have a set delay period associated with it. Thus, a first atom may have a first delay period while a second atom has a second, different delay period.

As also shown in FIG. 3A, the input waveform 300 may have various other time parameters that are used to determine a desired actuation time of the haptic actuator, the actual actuation time of the haptic actuator and a delay time that represents a time period that may be required between when a first atom is provided by a synthesizer engine and a second atom is provided by a synthesizer engine. These time periods are referred to herein as Tspecified 311, Tactive 312, and Tdelay 313. Although these time parameters are shown and described with respect to FIG. 3A, these time parameters may be used with any and all of the input waveforms described herein including various waveform sequences.

As used herein, Tspecified corresponds to a desired actuation time of the haptic actuator. Further, a synthesizer engine may be configured to fit as many cycles as possible into the time period specified by Tspecified. In some embodiments, the time period associated with Tspecified may be a variable amount of time. Tactive is defined as the resulting active period of Tspecified. More specifically, Tactive consists of N number of complete cycles that an actuator may play based on, for example how the actuator is tuned. In some embodiments, Tactive may be shorter in time, or be equivalent or substantially equivalent in time to Tspecified. For example, as discussed above, a synthesizer engine may be configured to play complete cycles. Thus, if a designer or computing instructions specifies a first time period for Tspecified but only N complete cycles can fit within the time period of Tspecified, Tactive is the resulting time period for the haptic output. In some implementations, the time difference between Tactive and Tspecified is less than one period of a cycle. Tdelay is a time period that represents a delay that may be required between atoms to ensure most, if not all residual motion of the actuator mass has ceased. Tdelay may be equivalent to the delay period associated with each atom.

In certain embodiments of the tap atom, each of the drive period 302 and the brake period 303 may include at least one positive voltage 305 and at least one negative voltage 310. Further, each pulse of the positive voltage 305 and the negative voltage 310 may be applied at various times along the time period 301. For example, a first voltage may be applied at a first time, a second voltage may be applied at a second time, and a third voltage may be applied at a third time. Further, each of the applied voltages may cause a momentum and/or a velocity of the actuator mass of the haptic actuator to increase or decrease and/or may cause a displacement of the actuator mass to increase or decrease.

For example, a first voltage or a first voltage value may be applied to the haptic actuator at a first time. In certain embodiments, the first voltage is applied at a time when the displacement or movement of the actuator mass is zero, substantially zero or below a threshold displacement distance (e.g., the mass of the haptic actuator may have residual movement but that residual movement is below a threshold).

The first voltage (or a voltage having a first value) may provide a first electromotive force which moves the actuator mass of the haptic actuator from a starting point to a first point in a first direction. At a second time, the second voltage (or a voltage having a second value) provides a second electromotive force which moves the actuator mass of the haptic actuator from the first point to a second point in a second direction. The second electromotive force may have a polarity that is opposite from the first electromotive force and the second direction is opposite from the first direction.

At a third time, a third voltage (or a voltage having a third value) is applied to the haptic actuator which provides a third electromotive force. The third electromotive force causes the actuator mass of the haptic actuator to move from the second point to a third point in the first direction. In certain embodiments, the third voltage may be substantially equivalent to the first voltage.

As a result of each of the various electromotive forces described above, an output waveform, such as, for example, output waveform 350, is shaped and the desired haptic output, or the tap, may be provided. In certain embodiments, the difference between the first time and the third time, or more specifically, the drive period 302, may be between three milliseconds and twenty milliseconds. In some cases, the drive period 302 may be approximately seventeen and a half milliseconds. Once the drive period 302 has completed, the brake period 303 may begin. In some embodiments, the brake period 303, like the drive period 302, consists of a series of voltages, having different peak amplitudes or values, that are applied at other discrete time periods in order to slow movement of the actuator mass. For example, fourth, fifth and sixth voltages having various peak amplitudes may be applied at a fourth time, fifth time and sixth time respectively to cause various electromotive forces to be applied to the haptic actuator. In some embodiments, each of these electromotive forces may have a polarity that is opposite from the current direction of travel of the actuator mass when the electromotive force is applied. As a result, each of these forces cause the actuator mass to slow and eventually stop movement. When the movement of the actuator has stopped, the actuator may be in its nominal position.

In certain embodiments, the tap haptic output uses substantially the full excursion limits of the haptic actuator mass and as a result, the actuator mass is at a high risk for crashing or impacting into the sidewall of the haptic actuator which may cause damage to the haptic actuator and/or the actuator mass. As a result, residual motion of the actuator mass may need to be reduced to zero, or substantially zero, prior to initiating another tap or other atom to be output. Accordingly, once the brake period 303 has completed, a delay period 304 is provided.

In some cases, the delay period 304 is a time period in which additional atoms may not be played by the haptic actuator. This helps ensure that movement of the actuator mass has stopped or slowed so that any residual motion of the actuator will not cascade with another atom thereby causing excessive movement of the actuator mass. In some embodiments, the delay period 304 after the tap atom is played (or the recommended or required delay before the tap atom is played) is approximately fifteen milliseconds or higher although other values (including lower values) may be used. In some implementations, the total time footprint for the tap atom may be approximately seventy milliseconds. Thus, the time between when the synthesizer engine begins playing the tap atom and the time when a subsequent atom may be played is approximately seventy milliseconds. As with other times discussed herein with respect to atoms, the time may be greater or less than seventy milliseconds. In addition to a delay period 304, a "silence" atom may be played by the haptic actuator in order to increase a delay between sequences of atoms. During the silence atom, no haptic voltage is applied to the actuator and the actuator mass returns to its nominal state and/or remains substantially stationary.

In certain embodiments, input waveform 300 may have a frequency of between 50 Hz and 150 Hz although other frequencies may be used. For example, the input waveform 300 may have a frequency of approximately 80 Hz. In other embodiments, the frequency may be 200 Hz or higher or 300 Hz or higher. In some embodiments, the frequency of the input waveform 300 is configured to achieve salience without a leading buzz or a trailing buzz that is typically present in conventional haptic actuators.

For example, the input waveform 300 (along with those of other atoms described herein) is designed to maximally excite the haptic actuator and then provide a braking function to cancel the oscillations as quickly as possible. The input waveform 300, along with those of the other atoms described herein, may be defined as a function of a resonance frequency and/or a quality factor associated with the haptic actuator or the electronic device.

The tap atom may have two full periods of motion generated by a 2.5 period waveform. For example, the combination of the drive period 302 and the brake period 303 may be equivalent to an input waveform 300 having an active period of approximately 2.5 periods. More specifically, the input waveform 300 for the tap atom includes a drive period 302 of approximately 1.25 periods which is used to accelerate the actuator mass of the haptic actuator. Likewise, the input waveform 300 for the tap includes a brake period 303 of approximately 1.25 periods that is used to brake or otherwise slow the actuator mass of the haptic actuator. In some embodiments, the 1.25 cycles may be at 200 Hz or higher or 300 Hz or higher. Although periods of the drive and the brake are specifically mentioned, the specifics of each of the periods may be altered or changed based on various factors that are associated with the haptic actuator or on forces that are being applied on the actuator mass of the haptic actuator.

In certain embodiments, the haptic actuators disclosed herein may be tuned or calibrated to provide a consistent feel between various devices. More specifically, the electronic device and/or the haptic actuator of the electronic device may be calibrated based on values of parameters that are specific to the electronic device. This may include size of the device, the material of the housing of the device, differences in tolerances of the various components of the electronic device and so on.

For example, a housing of the electronic device may be available in different sizes. Accordingly, a drive period, a brake period, and/or an audio output may be tuned or calibrated based on the shape and/or size of the housing. In other examples, duration of a drive period of the input waveform 300 may be tuned based on (e.g., approximately to match) a resonance frequency of the haptic actuator that is present in the electronic device. In another embodiment, the duration of the drive period 302 of the input waveform 300 may be tuned based on (e.g., approximately to match) the resonance frequency of the actuator. In still yet other embodiments, the atoms and/or the different periods of the atoms described herein may be tuned to different housings of an electronic device.

In other implementations, the audio output and the haptic output may be tuned or otherwise calibrated based on user preferences. For example, the intensity of a vibratory and/or audio output may be set by a user via an operating system on the device.

The haptic output and the audio output may also be calibrated or tuned based on the material of the housing. For example, the audio output and haptic output may be customized or calibrated in a first manner if the housing is made of or plated with a precious metal (e.g., gold or silver) and customized or calibrated in a second manner if the housing is made of or plated with a second material (e.g., stainless steel or aluminum).

Calibration of the haptic actuator may also be based on an operating temperature of the device and/or an overall temperature under which the electronic device is operating. Accordingly, the atoms, and the haptic output caused by the atoms, may be adjusted based on the temperature. In certain other embodiments, the haptic actuator may be calibrated or tuned based on the wear of the haptic actuator. For example, the atom and the haptic output may be adjusted over the life of the electronic device.

In one example of tuning, the drive period 302 may be tuned based on ninety-five percent of the resonance frequency of the haptic actuator or the electronic device. Tuning the drive period of the input waveform 300 in such a manner may provide a haptic output during use of the electronic device that may be preferential in some way than would otherwise be provided if the haptic actuator was not tuned. Further, tuning the drive period 302 such as described may enable the actuator mass to stop movement of the actuator mass more quickly than would otherwise occur if the haptic actuator was not tuned. Although a specific form of tuning is discussed, the haptic actuator may be tuned based on other factors such as, life of the device, material of the device, operating temperature and so on.

In certain embodiments, an input force on the actuator mass may change sign at a peak displacement of the actuator mass. At that moment, the momentum and velocity of the actuator mass is zero. For example, if an actuator mass moves from a starting point to a first point in a first direction in response to a first electromotive force, the momentum and velocity of the actuator mass will begin to slow and eventually reach zero as it reaches the first point (and prior to returning to its starting point). At that time, the input force applied on the actuator mass changes sign. Likewise, the momentum, velocity, and the displacement of the actuator mass may also change sign.

However, due to various imperfections, external forces, or differing tolerance and the like, an actuator may not deliver equal force at all times when the actuator mass is in each position. Accordingly, alternate drive timing may be required. As such, drive periods may vary between eighty-five and one hundred percent of the natural period of the actuator mass but each segment of the drive waveform may be adjusted or tuned individually.

In certain embodiments, the brake period 303 may also be adjusted. The adjustments to the brake period 303 may be based on the haptic actuator, the actuator mass, the electronic device, material of the housing, size of the housing, forces acting on the actuator mass and so on. For example, the brake period 303 may be adjusted such that the amount of power provided to brake the actuator mass is equivalent to a percentage of the maximum power or drive of the input waveform 300. More specifically, the brake period 303 may be tuned to match a dampening of the haptic actuator. For example, once the drive is changed from one of acceleration to braking, the actuator mass of the haptic actuator will begin to slow naturally which causes the actuator to lose energy. Accordingly, if the brake is tuned to the dampening, less energy may be required to slow, and eventually stop, movement of the actuator mass. This is shown in FIG. 3A as the amplitudes of the voltage waveform associated with the brake period 303 are less than the amplitude of the voltage waveform associated with the drive period 302.

In certain embodiments, the drive period 302 and/or the brake period 303 may be adjusted based on the weight, shape or other factors of the haptic actuator or the actuator mass. In some embodiments, the amount of power consumed when each haptic atom is played or otherwise provided to the haptic actuator to produce the haptic output may be between approximately 0.5 and 1.0 watt of power.

In the embodiments described herein, each of the atoms for the tap, mini-tap and micro-tap may be described and shown as a square waveform or a partial square waveform. However, square waveforms may produce a strong acoustic signature when played by the haptic actuator. For example, if an input waveform is square, the atom may excite higher-order modes at a transition edge which causes acoustic emissions. Because the acoustic signature is present, the acoustic signature may be output with each actuation of the actuator and produce unwanted sounds.

In order to reduce these acoustic emissions, a low-pass filter (which may be a 500 Hz low-pass filter in one sample embodiment) may be applied to the input waveforms described herein. The low-pass filter may be used to round off the square edges of the input waveform 300. However, because the low-pass filter is a casual filter, it may leave some sharp transitions when complete. In order to remedy this, the low-pass filter may be a bi-direction low-pass filter. As such, both the leading edge of each crest and trough of the input waveform 300 and the trailing edge of each crest and trough of the input waveform 300 may be rounded. Applying the filter in this manner reduces the amount of acoustic noise caused by the haptic actuator. As a result, the feel of the tactile output may be less "buzzy."

In additional or alternative embodiments, one or more notch filters may be applied to the input waveform 300 if particular acoustic resonances caused by the sharp edges of the input waveform 300 are known. In yet another embodiment, high-frequency acoustic noise may be reduced or eliminated by reducing input energy.

In other embodiments, it may be desirable to have the acoustic noise caused by the sharp transitions of the input waveform 300 as such acoustic are capable of producing sound. In such cases, the acoustic waveforms associated with the acoustic noise may be superimposed on the input waveform 300 to produce desired sounds.

In certain other embodiments, the amplitude of any of the pulses in the input waveform 300 may vary. For example, the amplitude of the final braking pulse 315 shown in FIG. 3A may be adjusted such that the actuator mass achieves zero momentum and velocity at zero displacement (or substantially zero displacement) with the final braking pulse. The adjustment to the amplitude of the pulse may be made based on a particular device, a haptic actuator or based on a reference waveform.

The final pulse of a brake may also be modified or otherwise adjusted to account for back electromotive force (back EMF). Back EMF is a voltage or an electromotive force that pushes against the current which induces it. Thus, as voltage is being applied to the haptic actuator and the actuator mass is moving, a voltage is generated that opposes the drive voltage being applied to the haptic actuator. Put another way, a moving magnet of the haptic actuator may generate a back EMF proportional to the momentum and/or velocity of the actuator mass. Thus, a drive voltage applied to an actuator will result in less effective input power due to the back EMF is opposing it. As it may be desirable to provide peak power at all times, and as the haptic actuator may be working within a fixed power budget (e.g., between 0.5 and 1.0 watt of power for a given time period), the drive voltage of the input waveform 300 can be increased based on the momentum and/or velocity of actuator mass.

Back EMF may also be accounted for when a brake is applied to the actuator mass. For example, because the back EMF is opposing the drive, the back EMF essentially assists with the braking. As such, an amplitude of the voltage in the brake period 303 need not be as high as the voltage in the drive period 302.

FIG. 3B illustrates an output waveform 350 associated with the haptic output described as the tap atom. In certain embodiments, the output waveform 350 is generated by the input waveform 300 shown and described with respect to FIG. 3A. As shown in FIG. 3B, the output waveform 350 may be represented as an oscillating wave. More specifically, the output waveform 350 may be represented as an oscillating wave that illustrates the displacement of an actuator mass of the haptic actuator at different time periods along a time period 351.

As shown in FIG. 3B, an actuator mass of a haptic actuator may be displaced a first distance (represented by the first peak 353 in the output waveform 350) in response to a first voltage. For example and as discussed above, the first voltage may cause a first electromotive force to be applied to the actuator mass. In response, the actuator mass moves a first distance. In some embodiments, the first electromotive force may be defined as a "push."

The displacement between the starting point of the waveform and point 355 shown in FIG. 3B, may be equivalent to the time in which an electromotive force provided by the first voltage "pushes" the actuator mass and, as a result, causes the actuator mass to be displaced the first distance. The electromotive force that is applied may have a first polarity which causes the actuator mass to be displaced a first distance or otherwise moved from its nominal position (or a state of minimal movement) to a first position represented by the first peak 353.

When a second voltage, or a voltage having a different amplitude or value, is applied at a second time period, the second voltage may cause a second electromotive force to be applied to the actuator mass. The second voltage may cause the sign of the displacement (or the momentum of the actuator mass such as shown in FIG. 3D) to change from positive to negative or vice versa.

In the example shown in FIG. 3B, the second electromotive force has a second polarity that is opposite from the first polarity. The second electromotive force, or a "pull," causes the actuator mass to be displaced a second distance represented by the trough 356. The "pull" may be provided between point 355 and point 360 as shown in FIG. 3B. As also shown in FIG. 3B, the second displacement is greater than the first displacement.

As a result of the second displacement, the actuator mass crosses its point of origin or its nominal position. In addition, the oscillating wave that represents the output waveform 350 crosses a zero displacement axis. Crossing of the axis in this manner is referred to as a zero crossing. Thus, haptic output may be provided by the haptic actuator in a given number of (e.g., three or fewer) zero crossings. In some embodiments, the zero crossings may be defined in terms of velocity and/or momentum. In such embodiments, the haptic output may be provided in four or fewer velocity zero crossings.

At a third time, a third voltage, or a voltage having a third value or amplitude that is different than the second voltage, is applied to the haptic actuator. The third voltage causes a third electromotive force to be applied to the haptic actuator. In the example illustrated by FIG. 3B, the third electromotive force may have a polarity that is equivalent to the first polarity. The third electromotive force may also be seen as a "push." That is, between point 360 and point 365, the third electromotive force pushes the actuator mass to further increase the displacement such as shown by the second peak 357. In addition, in some embodiments, and with all the atoms described herein, a peak velocity (or a velocity having a peak amplitude) may be reached within two periods of a peak input voltage being applied to the haptic actuator.

The output waveform 350 may be shaped by the various voltages or voltage values that are applied during the drive period 302 and the brake period 303. As such, the shape of the output waveform 350 causes the haptic actuator to provide the "tap" haptic output. The time between when the voltage is first applied and the second peak 357 is reached may be between three milliseconds and twenty milliseconds. In a more specific example, the time may be approximately seventeen and a half milliseconds and is achieved in approximately 1.25 cycles of drive such as described above with respect to FIG. 3A. As also shown in FIG. 3B, the peak displacement (whether represented by a peak or a trough) in the output waveform 350 may be achieved in four or fewer zero crossings. In other embodiments, the peak displacement may be achieved in three or fewer zero crossings. As discussed above, the zero crossings may be defined in terms of velocity and/or momentum. In such embodiments, the haptic output may be provided in four or fewer velocity or magnitude zero crossings.

Thus, unlike conventional haptic actuators that require significantly more zero crossings to achieve peak or maximum displacement (which causes a "buzzy" feel to haptic output), driving the actuator such as described above, produces a sharp sensation. More specifically, by providing the haptic output in four or fewer, or three or fewer, zero crossings, the tap atom is achieved which produces the sharp sensation that has not otherwise been obtainable.

In order to generate a sharp tap such as described, the oscillation of the actuator mass must be stopped as quickly as possible after peak displacement (or a peak momentum shown in FIG. 3D) has been achieved. As such, another 1.25 cycles of a brake (represented as brake period 303 of FIG. 3A) may be applied to the haptic actuator. In the example output waveform 350 of FIG. 3B, the various voltage values of the brake period 303 (e.g., the peaks and troughs of the brake period 303) are represented by point 370, point 375 and point 380.

More specifically, at a fourth time, a fourth voltage, or a voltage having a fourth value or an amplitude that is different than the third voltage, may be applied to the haptic actuator which causes a fourth electromotive force to be applied to the actuator mass of the haptic actuator. The fourth electromotive force may have a polarity that is opposite from the "pull" that was previously applied (e.g., the third electromotive force represented by point 365). As such, the brake may cause the overall displacement or movement of the actuator mass to decrease.

Continuous application of the brake over a time period at fifth and sixth time periods respectively may cause the peak displacement of the actuator mass to further decrease such as represented by trough 359 until an overall displacement of zero or substantially zero has been reached. As discussed above, the value or peaks of the applied voltages may cause various electromotive forces to be applied to the actuator mass that have different polarities (e.g., polarities that are the same as, or opposite from) from the direction of movement of the actuator mass immediately before the force is applied. In certain embodiments, the time that elapses between when the actuator begins its movement or displacement and the time at which the actuator mass returns to a state of rest as a result of the brake period 303 (or a displacement of substantially zero over a given time period), may be anywhere between approximately six milliseconds and approximately forty milliseconds. In some embodiments, the time period is approximately thirty-five milliseconds.

Figure 3C:
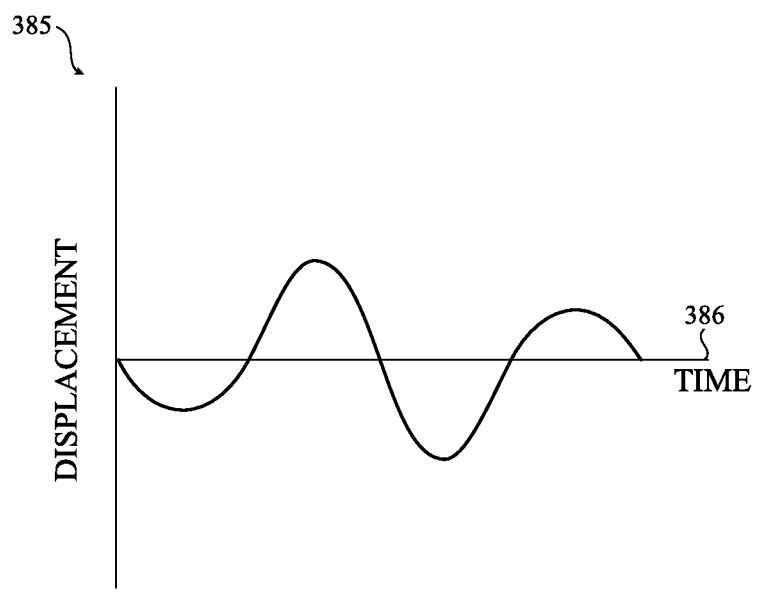
FIG. 3C illustrates an example device output waveform for providing the first type of haptic output according to one or more embodiments of the present disclosure.
Figure 3D:
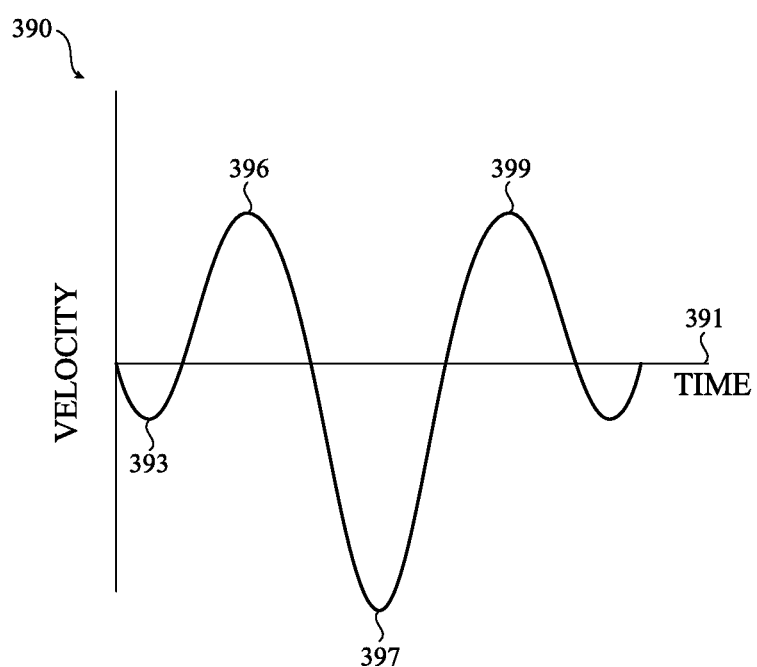
FIG. 3D illustrates an example momentum graph showing a change in momentum of an actuator mass of a haptic actuator when the input waveform of FIG. 3A is applied to a haptic actuator according to one or more embodiments of the present disclosure.

FIG. 3C illustrates an example device waveform 385 that is associated with the haptic output described as the tap. The device waveform 385 is generated by the input waveform 300 shown and described with respect to FIG. 3A. The device waveform 385 may be represented as an oscillating wave over a time period 386. As shown in FIG. 3C, the device waveform 385 is similar to the output waveform 350. However, the device waveform may have different or reduced displacement or intensities when compared against the displacement or intensities shown in FIG. 3B due to the relatively larger mass of the device as compared to the actuator mass. Further, the device waveform 385 may have an opposite sign from the output waveform 350 of the actuator as movement of actuator or actuator mass causes an opposing motion of the device.

FIG. 3D illustrates a momentum/velocity graph 390 of an actuator mass of a haptic actuator along discrete time periods of a time period 391. This graph is yet another example of an output waveform, which is expressed in terms of momentum over time. Since the mass of the moving object is constant, it should be appreciated that velocity varies with time in the same fashion as momentum, shown on FIG. 3D. The time period 391 may correspond to the time periods 301, 351, and 386 described above. The momentum/velocity graph 390 is generated by the input waveform 300 shown and described with respect to FIG. 3A and is associated with the haptic output described as the tap atom. Further, the momentum/velocity graph 390 may be used to show the momentum of an actuator mass as the actuator mass is being displaced such as shown in FIG. 3B. That is, the first trough 393 in the momentum/velocity graph 390 may be reached (e.g., correspond to the midpoint) between the starting point and the first peak 353 of the output waveform 350, peak 396 may be reached (e.g., correspond to the midpoint) between the first peak 353 and trough 356 of the output waveform 350, trough 397 may be reached (e.g., correspond to the midpoint) between trough 356 and the second peak 357 of the output waveform 350 and peak 399 may be reached (e.g., correspond to the midpoint) between the second peak 357 and trough 359 of the output waveform 350.

In addition to the above, each peak and trough of the momentum/velocity graph 390 may be reached at corresponding zero-crossings of the displacement graph 385 Likewise, each peak and trough in the displacement graph 385 may correspond to various zero-crossings in the momentum/velocity graph 390. For example, peak 396 may be reached at the same time the first zero-crossing in the displacement graph 385 occurs. Likewise, trough 397 in the momentum/velocity graph 390 may be reached at the same time the second zero-crossing occurs in the displacement graph 385 and so on.

As shown in FIG. 3D, an actuator mass of a haptic actuator may have a first momentum (represented by the first trough 393) in response to a first voltage being applied to the haptic actuator at a first time. As discussed above, the first voltage may cause a first electromotive force to be applied to the actuator mass in the form of a "push." The first electromotive force causes the actuator mass to increase its momentum from zero, or substantially zero, to a first momentum represented by the first trough 393.

When the second voltage is applied at a second time period, the second voltage may cause a second electromotive force to be applied to the actuator mass. In certain embodiments, the second voltage is applied when the sign of the momentum of the actuator mass changes from positive to negative or vice versa. The second electromotive force causes the actuator mass to have a second peak momentum represented by the peak 396. The second momentum is greater than the first momentum such as shown in FIG. 3D.

Further, as also shown in FIG. 3D, as the actuator mass crosses its point of origin or its original starting point, the oscillating wave that represents the momentum of the actuator mass crosses a zero axis. Crossing of the axis in this manner is referred to as a zero crossing. Thus, a peak momentum (and peak velocity) of the actuator mass may be reached within given number (e.g., four or fewer) zero crossings or within two periods of receiving peak input voltage.

When a third voltage is applied to the haptic actuator at a third time, the third voltage causes a third electromotive force to be applied to the haptic actuator. The third electromotive force increases the momentum of the actuator mass such as shown by the trough 397.

In certain embodiments, the time period between the first applied voltage and the time when the peak momentum (and velocity) has been reached may be anywhere between approximately three milliseconds and approximately twenty milliseconds. In one example, the peak momentum/velocity may be reached in approximately seventeen and a half milliseconds or less and be achieved in approximately 1.25 cycles of drive such as described above with respect to FIG. 3A. The peak momentum may be between approximately 1500 gram millimeters per second and approximately 2000 gram millimeters per second.

As discussed above, in order to generate a sharp tap, the momentum of the actuator mass must be stopped as quickly as possible after peak momentum has been achieved. As such, 1.25 cycles of a brake may be applied to the haptic actuator. In certain embodiments, the brake voltages of the input waveform 300 may cause the momentum of the actuator mass to reduce such as described above with respect to the displacement of the actuator mass.

For example, at a fourth time, a fourth voltage may be applied to the haptic actuator which causes a fourth electromotive force, or a brake, to be applied to the actuator mass of the haptic actuator. The fourth electromotive force causes the momentum of the actuator mass to decrease. Likewise, application of additional electromotive forces cause the momentum of the actuator mass to further decrease such as represented by peak 399 until a momentum of zero or substantially zero has been reached. In some embodiments, the time that elapses between the actuator mass increasing in momentum from zero, or substantially zero, to the time at which the actuator mass returns to a momentum (and velocity) of zero or substantially zero, may be somewhere between six milliseconds and forty milliseconds. In one implementation, the time period may be approximately thirty-five milliseconds.

The momentum and/or velocity of a device with respect to the tap atom may also be represented as an output waveform. In such embodiments, the output waveform that represents the momentum and/or velocity of the device may be similar to the momentum/velocity graph 390 shown above with respect to FIG. 3D. Ideally, conservation of momentum would cause the amplitude of the momentum graph of the device to be similar to the amplitude of the momentum of actuator mass (shown in FIG. 3D) but have an opposing sign. With conservation of momentum, the velocity of the device may be smaller when compared to the velocity of the actuator mass because the device has a mass that is greater than the mass of the actuator. However, as momentum may not be ideally conserved, the momentum graph of the device may have a smaller amplitude (and an opposing sign such as described above) than the momentum/velocity graph 390 of the actuator.

Figure 4A:
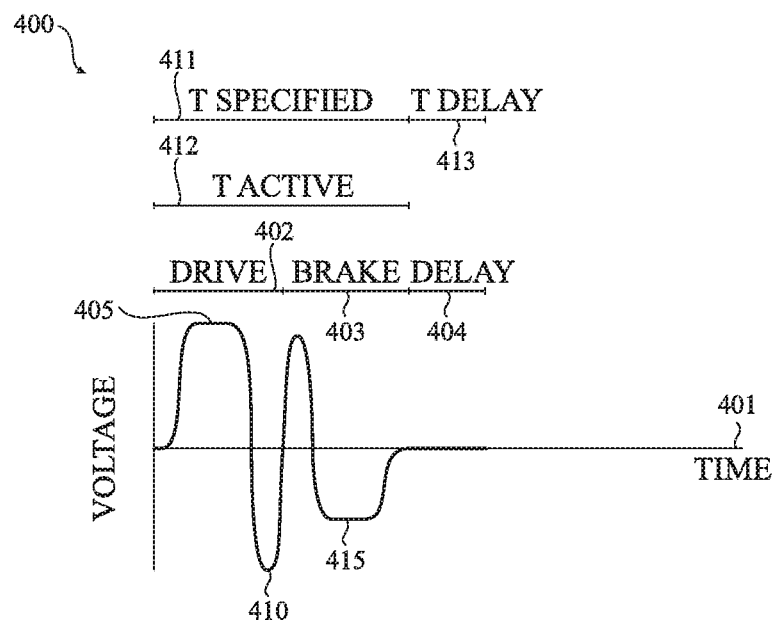
FIG. 4A illustrates an example input waveform that may be applied to a haptic actuator to produce a second type of haptic output according to one or more embodiments of the present disclosure.
Figure 4B:
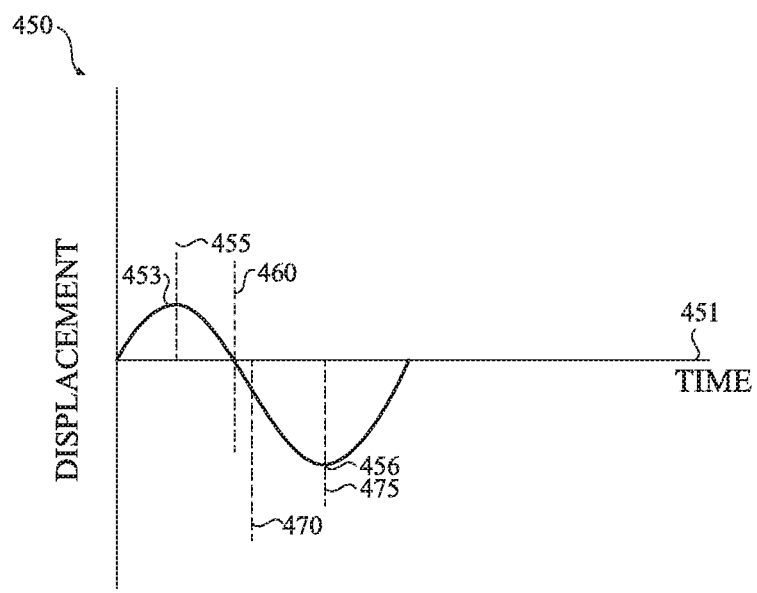
FIG. 4B illustrates an example output waveform for providing the second type of haptic output according to one or more embodiments of the present disclosure.

FIG. 4A illustrates an example input waveform 400 that may be used to produce a second type of haptic output according to one or more embodiments of the present disclosure. FIG. 4B illustrates an example output waveform 450 that is a result of the input waveform 400 being applied to a haptic actuator, such as, for example, haptic actuator 1400 (FIG. 14).

The input waveform 400 causes a haptic actuator of an electronic device to output a second type of haptic output described herein as a "mini-tap" atom. The mini-tap atom includes portions of the tap atom described above. For example, various portions of a drive period and/or the brake period of the mini-tap atom may correspond to various portions of the drive period and/or brake period of the tap atom. The mini-tap atom creates a weaker but sharper tap sensation than the tap atom described above. However, because the pulse duration of the mini-tap atom is shorter than the tap atom (in some instances the duration may be approximately twenty milliseconds for mini-tap atom versus approximately thirty-five milliseconds for the tap atom), the mini-tap atom may be played in sequence at a higher frequency (i.e., another atom may be played after the mini-tap atom sooner than an atom is played after the tap atom). Further, the motion of the actuator mass for the mini-tap atom does not use the maximum allowable displacement provided by the haptic actuator. Accordingly, the risk of impact of the actuator mass with the haptic actuator is low.

As shown in FIG. 4A, the input waveform 400 of the mini-tap may be represented as a substantially square waveform having a positive voltage 405 and a negative voltage 410. Each pulse of the positive voltage 405 and the negative voltage 410 may be applied at various times along a time period 401. For example, a first voltage, voltage value, voltage having a first peak, current or other electrical input may be applied at a first time, a second voltage may be applied at a second time, and a third voltage may be applied at a third time and so on. Further, each of the applied voltages may cause a momentum or a velocity of the actuator mass of the haptic actuator to increase or decrease and/or may cause a displacement of the actuator mass to increase or decrease.

For example, when a first voltage is applied to the haptic actuator at a first time, the first voltage causes the haptic actuator to provide a first electromotive force which moves the actuator mass of the haptic actuator in a first direction. At a second time, a second voltage is applied to the haptic actuator. The second voltage causes the haptic actuator to provide a second electromotive force which moves the actuator mass of the haptic actuator in a second direction. The second electromotive force may have a polarity that is opposite from the first electromotive force and the second direction is opposite from the first direction. As will be discussed below, the application of the electromotive forces in such a manner may shape the output waveform that is equivalent to the mini-tap atom and its associated sensation.

Additional voltages may be applied at other discrete time periods in order to slow movement of the actuator mass. For example, a third voltage may be applied at a third time to cause a third electromotive force (a braking force) to be applied to the actuator mass. As a result, the actuator mass slows and eventually stops moving.

Although a square atom is shown and described, the input waveform 400 may have a variety of shapes including a sinusoidal waveform, a saw tooth waveform and so on such as described above. Further, the input waveform 400 may have a frequency of between 40 Hz and 150 Hz although other frequencies may be used.

As with the input waveform 300 of FIG. 3A, the input waveform 400 consists of both a drive period 402 and a brake period 403 followed by a delay period 404. In some embodiments, the drive period 402 may be between approximately three milliseconds and approximately fifteen milliseconds. In addition, the brake period 403 may be between approximately three milliseconds and approximately fifteen milliseconds. The delay period 404 after the mini-tap atom is played (or the recommended or required delay before the mini-tap atom is played) is approximately ten milliseconds or higher although other values (including lower values) may be used. In some implementations, the total time for the mini-tap atom may be approximately thirty-three milliseconds. Thus, the time between when the synthesizer engine begins playing the mini-tap atom and the time when a subsequent atom may be played is approximately thirty-three milliseconds (although additional delays, such as a silence atom, may be introduced between atoms). As with other atoms, the total time may vary in different embodiments and may be greater or less.

As discussed above, the drive period may be caused by an electromotive force effectively "pushing" and/or "pulling" on the actuator mass of the haptic actuator Likewise, the brake period may also be caused by the electromotive force "pushing" and/or "pulling" on the actuator mass. The delay period is used as a safety margin and is present to prevent residual motion from cascading to a following atom.

The combination of the drive period 402 and the brake period 403 collectively make up an active period. The active period of the mini-tap atom is approximately 1.5 cycles (which is one full cycle less than the atom (e.g., input waveform 300) for the tap). In some embodiments, the active period of the mini-tap atom may be anywhere between approximately six milliseconds and thirty milliseconds. In one implementation, the duration of the active period may be approximately twenty milliseconds. More specifically, the input waveform 400 for the mini-tap atom includes a drive period 402 of approximately 0.75 cycles which is used to accelerate the actuator mass of the haptic actuator. Likewise, the input waveform 400 for the mini-tap atom includes a brake period 403 of approximately 0.75 cycles that is used to brake or otherwise slow the actuator mass of the haptic actuator.

As also shown in FIG. 4A, the input waveform 400 may have various other time parameters that are used to determine a desired actuation time of the haptic actuator (Tspecified 411), the actual actuation time of the haptic actuator (Tactive 412) and a delay time (Tdelay 413) that represents a time period that may be required between when a first atom is provided by a synthesizer engine and a second atom is provided by a synthesizer engine.

Although the input waveform 400 is shown and described as a square waveform having rectangular pulses, in certain embodiments, a low-pass filter (either unidirectional or bidirectional) may be applied to the input waveform 400 such as described above. As also described above, the height of any of the pulses in the input waveform 400 may vary. For example, the height of the final braking pulse 415 shown in FIG. 4A may be adjusted such as described herein. Likewise, the input waveform 400 may be adjusted to account for back EMF such as described above.

FIG. 4B illustrates an output waveform 450 associated with the haptic output described as the mini-tap atom according to one or more embodiments of the present disclosure. The output waveform 450 may be generated by the input waveform 400 shown and described with respect to FIG. 4A.

As shown in FIG. 4B, the output waveform 450 may be represented as an oscillating wave. More specifically, the output waveform 450 may be represented as an oscillating wave that illustrates the displacement of an actuator mass of the haptic actuator at different time periods along a time period 451. Further, each peak and trough of the output waveform 450 may correspond to the peaks and troughs of the input waveform 400. That is, the peak and trough of the drive period 402 of the input waveform 400 may cause displacement peak 453 and displacement trough 456 of the output waveform 450.

As shown in FIG. 4B, an actuator mass of a haptic actuator may be displaced a first distance represented by the displacement peak 453 in the output waveform 450 in response to a first voltage that is applied to the haptic actuator. The first voltage may cause a first electromotive force to be applied to the actuator mass. In the example of FIG. 4B, the displacement between the starting point of the of the output waveform 450 and point 455 may be equivalent to the time in which the first electromotive force provided by the first voltage "pushes" the actuator mass or has a first polarity that acts upon the actuator mass. As a result, the first electromotive force causes the actuator mass to be displaced the first distance represented by the displacement peak 453.

When the second voltage is applied at a second time period, the second voltage may cause a second electromotive force to be applied to the actuator mass. In certain embodiments, the second voltage is applied when the sign of the displacement (or the momentum of the actuator mass such as shown in FIG. 4D) changes from positive to negative or vice versa. In the example of FIG. 4B, the second electromotive force is a "pull" (or has a second polarity that is opposite from the first polarity).

The second electromotive force, or the "pull" causes the actuator mass to be displaced a second distance represented by the displacement trough 456. The "pull" may be provided between point 455 and point 460 as shown in FIG. 4B. As also shown in FIG. 4B, the second displacement is greater than the first displacement. As with the tap atom described above, the peak displacement caused by the applied voltages, combined with the subsequent braking, causes the haptic actuator to provide the mini-tap haptic output.

Further, as also shown in FIG. 4B, as the actuator mass crosses its point of origin, the oscillating wave that represents the output waveform 450 crosses a zero axis. Crossing of the axis in this manner is referred to as a zero crossing such as described above. Thus, the haptic output associated with or provided by the mini-tap atom may be provided by the haptic actuator in two or fewer zero crossings.

In order to generate a crisp mini-tap, the oscillation of the actuator mass should stop as quickly as possible after peak displacement (or a peak momentum shown in FIG. 4D) has been achieved. As such, a brake period 403 may be applied to the haptic actuator for 0.75 cycles. More specifically, various electromotive forces acting as a brake may be applied to the haptic actuator at different time periods. In some embodiments, the various peaks and troughs of the brake period 403 are represented as points 470 and 475 respectively shown on the output waveform 450.

Braking generally involves reversing the input waveform 400 to remove energy from the haptic actuator. As shown in FIG. 4B, at a third time period, a third voltage may be applied to the haptic actuator which causes a third electromotive force to be applied to the actuator mass of the haptic actuator. The third electromotive force may have a polarity that is opposite from the "pull" that was previously applied. As such, the brake may cause the overall displacement of the actuator mass to decrease.

Likewise, continuous application of a brake may cause the displacement of the actuator mass to further decrease until a displacement of zero or substantially zero has been reached. As with the brake discussed above with respect to the third time period, the brake, or more specifically the voltage that causes the actuator to slow, may cause an electromotive force to be applied to the actuator mass that has a polarity that is the same as, or opposite from, the polarity of the push and/or direction of movement of the actuator mass. The time that elapses between the beginning displacement and the time at which the actuator mass returns to a state of rest as a result of the brake period 403, or a displacement of substantially zero over a given time period, may be anywhere between approximately six milliseconds and approximately thirty milliseconds. In some embodiments, the time period is approximately twenty milliseconds.

Figure 4C:
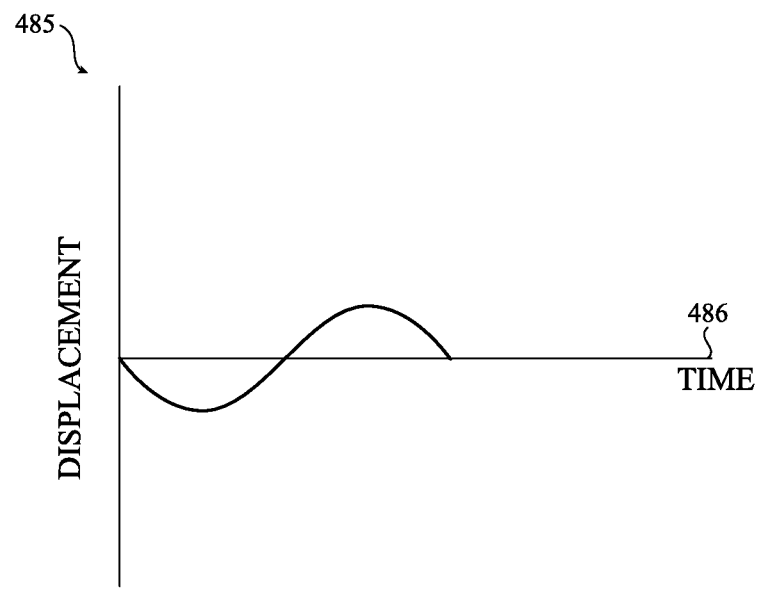
FIG. 4C illustrates an example device output waveform for providing the second type of haptic output according to one or more embodiments of the present disclosure.
Figure 4D:
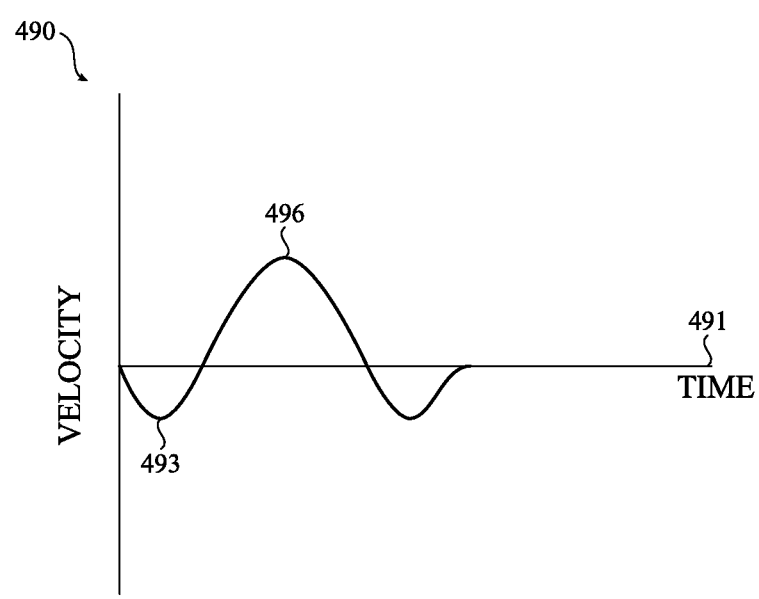
FIG. 4D illustrates an example momentum graph showing a change in momentum of an actuator mass of a haptic actuator when the input waveform of FIG. 4A is applied to a haptic actuator according to one or more embodiments of the present disclosure.

FIG. 4C illustrates an example device waveform 485 over a time period 486 that is associated with the haptic output described as the mini-tap atom. The device waveform 485 is generated by the input waveform 400 shown and described with respect to FIG. 4A. As shown, the device waveform 485 may be represented as an oscillating wave.

The device waveform 485 may be similar to the output waveform 450. However, the device waveform 485 may have different or reduced amplitudes when compared against the amplitudes of the output waveform 450 shown in FIG. 4B due to the relatively larger mass of the device as compared to the actuator mass. Further, the device waveform 485 may have an opposite sign from the output waveform 450 of the actuator as movement of actuator or the actuator mass causes an opposing motion of the device.

FIG. 4D illustrates a momentum/velocity graph 490 of an actuator mass along discrete time periods of a time period 491 according to one or more embodiments of the present disclosure. The time period 491 may correspond to time period 401, time period 451 and time period 486 described above. As with the other graphs discussed above, the momentum/velocity graph 490 is associated with the haptic output described as the mini-tap atom. For example, the momentum/velocity graph 490 may be generated by the input waveform 400 shown and described with respect to FIG. 4A. Further, the momentum/velocity graph 490 may be used to show the momentum of an actuator mass of a haptic actuator as the actuator mass is being displaced such as shown in FIG. 4B. That is, momentum trough 493 in the momentum/velocity graph 490 may correspond to a midpoint (or may be reached) between a starting point and the displacement peak 453 of the output waveform 450. The momentum peak 496 may correspond to a midpoint (or may be reached) between displacement peak 453 and displacement trough 456 of the output waveform 450. Further, the various momentums may correspond to the various peaks and troughs of the input waveform 400. That is, the drive period 402 and the brake period 403 in the input waveform 400 cause the momentum trough 493 and the momentum peak 496 (which represents the peak momentum of the actuator mass) shown in FIG. 4D.

An actuator mass of a haptic actuator may have a first momentum (represented by momentum trough 493) in response to a first voltage that is applied to the haptic actuator at a first time. As discussed above, the first voltage may cause a first electromotive force to be applied to the actuator mass in the form of a "push." The first electromotive force causes the actuator mass to increase its momentum from zero, or substantially zero, to a first momentum represented by momentum trough 493.

When a second voltage is applied at a second time, the second voltage may cause a second electromotive force to be applied to the actuator mass. Application of the second voltage may cause the sign of the momentum of the actuator mass changes from positive to negative or vice versa. The second electromotive force may be a "pull" which causes the actuator mass to have a second momentum represented by the momentum peak 496. In certain embodiments, the second momentum is a peak momentum of the actuator mass.

Each peak and trough of the momentum/velocity graph 490 may be reached at corresponding zero-crossings of the displacement graph 485 in a similar manner as described above with respect to the momentum/velocity graph 390 and the displacement graph 385. That is, peak 496 may be reached at the same time the first zero-crossing in the displacement graph 485 occurs and so on. Likewise, each peak and trough shown in the displacement graph 485 may be reached at the same time a zero-crossing occurs in the momentum/velocity graph 490.

Further, as also shown in FIG. 4D, as the actuator mass crosses its point of origin, the sine wave that represents the momentum of the actuator mass crosses a zero axis. Thus, the peak momentum (and velocity, as momentum may be considered a scalar of velocity when a mass is invariant, as here) of the actuator mass may be reached in two or fewer zero crossings.

In order to generate a sharp and/or crisp mini-tap sensation, the momentum of the actuator mass should be stopped as quickly as possible after a peak momentum has been achieved. As such, 0.75 cycles of a brake may be applied to the haptic actuator. In such embodiments, the brake period 403 of the input waveform 400 may cause the momentum of the actuator mass decrease such as described above with respect to the displacement of the actuator mass.

For example, at a third time, a third voltage may be applied to the haptic actuator which causes a third electromotive force to be applied to the actuator mass of the haptic actuator. The third electromotive force causes the momentum of the actuator mass to decrease, insofar as the velocity decreases and the mass remains constant Likewise, application of additional electromotive forces during the brake period 403 may cause the momentum of the actuator mass to further decrease until a momentum of zero or substantially zero has been reached. In some instances, the actuator mass may have a small amount of trailing momentum. However, because the amount of movement and momentum is below a threshold, the movement or momentum does not cause a perceptible haptic output nor does it account for, or count as, a zero crossing such as described herein.

The time that elapses between the actuator mass increasing its momentum from zero, or substantially zero, to the time at which the actuator mass reaches a peak momentum and subsequently returns to zero or substantially zero, may be between six milliseconds and thirty milliseconds. In some implementations, the time may be approximately twenty milliseconds. In addition to the above, the peak momentum may be between approximately 1500 gram millimeters per second and approximately 2000 gram millimeters per second.

The momentum and/or velocity of a device with respect to the mini-tap atom may also be represented as an output waveform. The output waveform that represents the momentum and/or velocity of the device may have an intensity or an amplitude that is smaller than the intensity or the amplitude of the momentum/velocity graph 490 shown above with respect to FIG. 4D and have an opposing sign. Further, the velocity of the device may be smaller when compared to the velocity of the actuator mass because the device has a mass that is greater than the mass of the actuator.

Figure 5A:
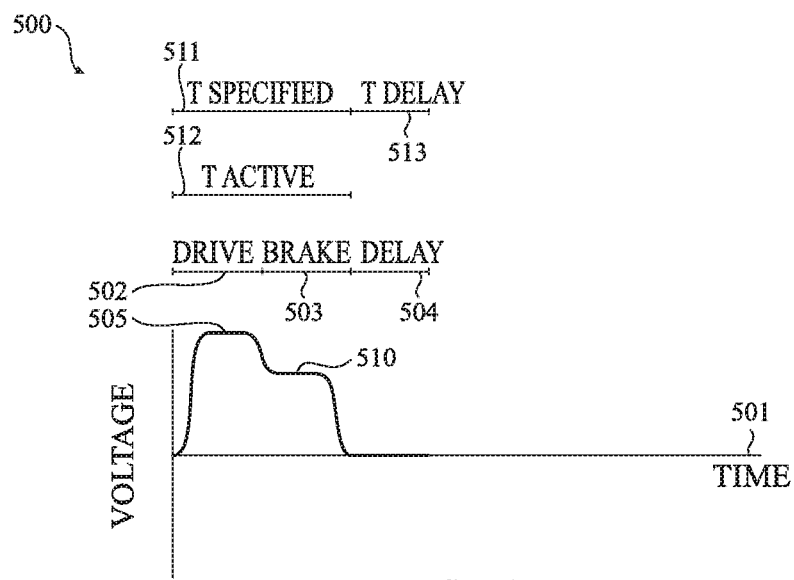
FIG. 5A illustrates an example input waveform that may be applied to a haptic actuator to produce a third type of haptic output according to one or more embodiments of the present disclosure.
Figure 5B:
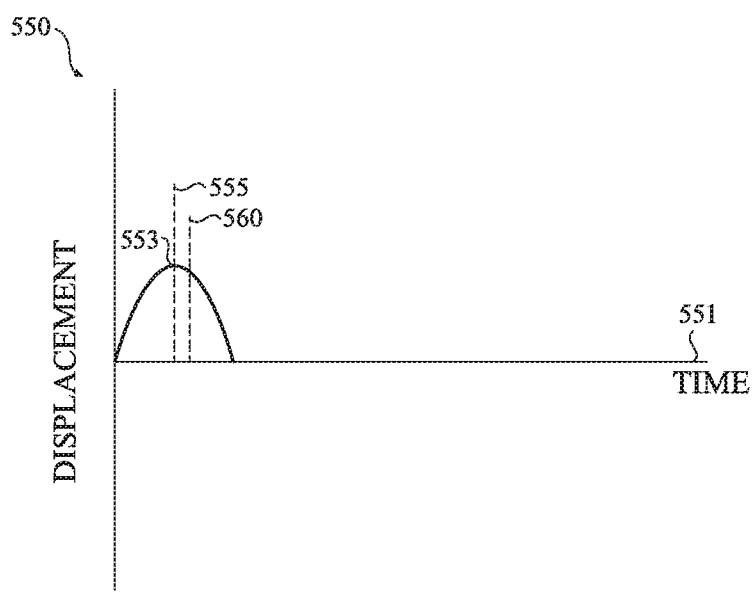
FIG. 5B illustrates an example output waveform for providing the third type of haptic output according to one or more embodiments of the present disclosure.

FIG. 5A illustrates an example input waveform 500 that may be used to provide a third type of haptic output according to one or more embodiments of the present disclosure. FIG. 5B illustrates an example output waveform 550 that is a result of the input waveform 500 being applied to a haptic actuator, such as, for example, haptic actuator 1400 (FIG. 14).

The input waveform 500 causes a haptic actuator of an electronic device to provide the haptic output described herein as a micro-tap. The micro-tap atom consists of one-half period of a drive period 502 followed by one-half period of a brake period 503. The drive period 502 may be between approximately three milliseconds and approximately ten milliseconds. In addition, the brake period 503 may be between approximately three milliseconds and ten milliseconds. The combination of the drive period 502 and the brake period 503 collectively make up an active period. The active period may be between approximately six milliseconds and twenty milliseconds. In other embodiments, the active period may be approximately fifteen milliseconds. As with the other types of atoms described herein, a delay period 504 may be provided after the micro-tap atom to ensure any residual motion of the actuator mass has ceased. The delay period 504 after the micro-tap atom is played (or the recommended or required delay before the micro-tap atom is played) may be approximately five milliseconds or higher although other values (including lower values) may be used. In some implementations, the total time for the micro-tap atom may be approximately twenty milliseconds, although this may vary between embodiments. Thus, the time between when the synthesizer engine begins playing the micro-tap atom and the time when a subsequent atom may be played is approximately twenty milliseconds (although additional delays, such as a silence atom, may be introduced between atoms).

The micro-tap atom may include portions of either the tap atom or the mini-tap atom described above. For example, various portions of a drive period 502 and/or the brake period 503 of the micro-tap atom may correspond to various portions of the drive period and/or brake period of the tap atom and/or the mini-tap atom. The micro-tap atom creates a weaker but sharper sensation than the mini-tap atom described above. Since the pulse duration of the micro-tap atom is shorter than the duration of the mini-tap atom, a micro-tap atom may be sequenced with another atom at a higher frequency than both the tap atom and the mini-tap atom. Further, the motion of the actuator mass for the micro-tap atom is much less than the maximum allowable displacement provided by the haptic actuator. Accordingly, the risk of impact of the actuator mass with the haptic actuator is very low.

As shown in FIG. 5A, the input waveform 500 of the micro-tap atom may be represented as a substantially square waveform having a first voltage 505 and a second voltage 510. The first voltage 505 and the second voltage 510 may be applied at various times along a time period 501. For example, a first voltage 505 may be applied during the drive period 502 and the second voltage 510 may be applied during the brake period 503. Further, each of the applied voltages cause a momentum and velocity of the actuator mass of the haptic actuator to increase or decrease and/or may cause a displacement, momentum and/or velocity of the actuator mass to increase or decrease.

In one example, the first voltage 505 may be applied to the haptic actuator at a first time (e.g., during the drive period 502). The first voltage 505 provides a first electromotive force which moves the actuator mass of the haptic actuator in a first direction. At a second time (e.g., during the brake period 503), the second voltage 510 is applied to the haptic actuator. The second voltage 510 provides a second electromotive force which causes the displacement and/or momentum of the actuator mass to decrease. The second electromotive force may have a polarity that is the same as the polarity of the first electromotive force.

Continuing with the "push" and "pull" examples from above, the first electromotive force represented by the first voltage 505 may be a push which causes the actuator mass to move from a first position to a second position Likewise, the second voltage 510 may also cause a push (e.g., a push to slow) which causes the displacement of the actuator mass to decrease.

The combination of the drive period and the brake period is equivalent to an input waveform 500 having an overall drive of approximately one period. More specifically, the input waveform 500 for the micro-tap atom includes a drive period 502 of approximately half of a cycle which is used to accelerate the actuator mass of the haptic actuator. Likewise, the input waveform 500 for the micro-tap atom includes a brake period 503 of approximately half a cycle that is used to brake or otherwise slow the actuator mass of the haptic actuator.

The input waveform 500 may have various other time parameters associated with it. As discussed above with respect to FIG. 3A and FIG. 4A, input waveform 500 may include a Tspecified 511 parameter that is used to determine a desired actuation time of the haptic actuator, a Tactive 512 parameter that represents the actual actuation time of the haptic actuator and a Tdelay 513 parameter that represents a time period that may be required between when a first atom is provided by a synthesizer engine and a second atom is provided by a synthesizer engine.

Although the input waveform 500 is shown and described as a substantially square waveform, a low-pass filter may be applied to the input waveform 500 such as described above. As also described above, the height of any of the pulses in the input waveform 500 may vary to account for back EMF and the like such as described herein.

FIG. 5B illustrates an output waveform 550 associated with the haptic output described as the micro-tap according to one or more embodiments of the present disclosure. The output waveform 550 may be generated by the input waveform 500 shown and described with respect to FIG. 5A. As shown in FIG. 5B, the output waveform 550 may be represented as an oscillating wave. More specifically, the output waveform 550 may be represented as an oscillating wave that illustrates the displacement of an actuator mass of the haptic actuator at different time periods along a time period 551. Further, the displacement peak 553 of the output waveform 550 may correspond to the drive period 502 of the input waveform 500 of the micro-tap atom. That is, the first voltage 505 of the drive period 502 causes displacement peak 553 of the output waveform 550.

As shown in FIG. 5B, an actuator mass of a haptic actuator may be displaced a first distance represented by the displacement peak 553 in the output waveform 550 in response to a first voltage 505 that is applied to the haptic actuator. The first voltage 505 may cause a first electromotive force to be applied to the actuator mass. In the example of FIG. 5B, the first electromotive force may be a "push" or have a first polarity which causes the actuator mass to be displaced a first distance or otherwise moved from its nominal position to a first position represented by the displacement peak 553. The displacement between the starting point of the output waveform 550 and point 555 may be equivalent to the time in which the first electromotive force provided by the first voltage "pushes" the actuator mass and, as a result, causes the actuator mass to be displaced the first distance.

When the second voltage 510 is applied at a second time period, the second voltage 510 may cause a second electromotive force to be applied to the actuator mass. The second voltage is applied shortly after the displacement (or the momentum of the actuator mass such as shown in FIG. 5D) changes from positive to negative or vice versa. In the example of FIG. 5B, the second electromotive force is also a push or has the same polarity as the first electromotive force (also known as a "push to stop"). That is, a push is used to start the movement of the actuator mass in a first direction. Once the actuator mass has reached a peak displacement and is returning to the origin, a second push is applied to the actuator mass to slow and eventually stop the actuator mass from crossing its original point of origin. Thus, the micro-tap haptic output may be provided by the haptic actuator in one, or less than one, zero crossing. The push to stop may be represented as the distance between point 560 and the end of the output waveform 550.

Figure 5C:
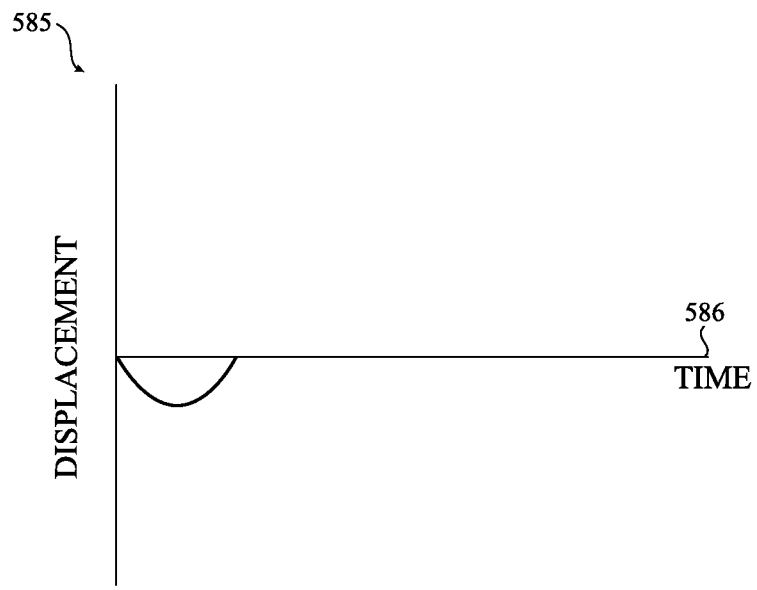
FIG. 5C illustrates an example device output waveform for providing the third type of haptic output according to one or more embodiments of the present disclosure.
Figure 5D:
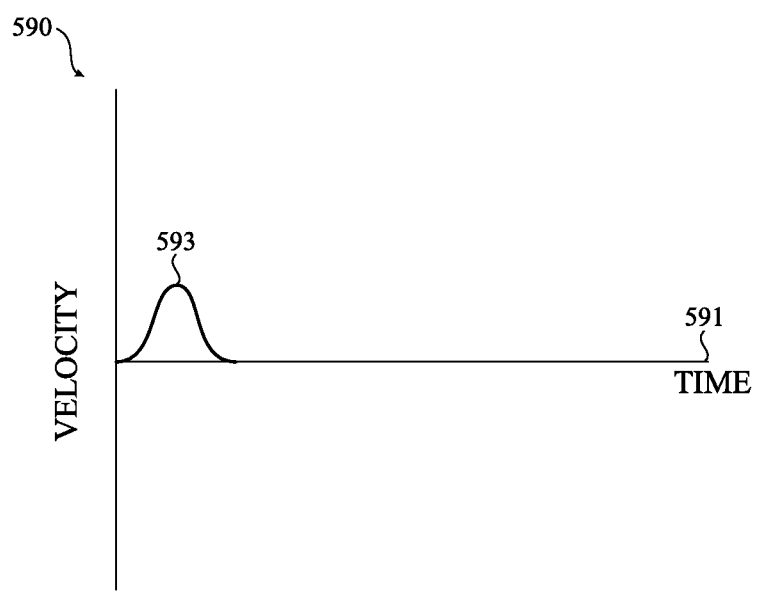
FIG. 5D illustrates an example momentum graph showing a change in momentum of an actuator mass of a haptic actuator when the input waveform of FIG. 5A is applied to a haptic actuator according to one or more embodiments of the present disclosure.

FIG. 5C illustrates an example device waveform 585 that is associated with the haptic output described as the micro-tap atom along a time period 586. The device waveform 585 may be generated by the input waveform 500 shown and described with respect to FIG. 5A. In some embodiments, the device waveform 585 may be represented as an oscillating wave.

As shown in FIG. 5C, the device waveform 585 is similar to the output waveform 550. However, the device waveform 585 may have a different or a reduced intensity or amplitude when compared against the intensity or amplitude shown in FIG. 5B due to the relatively larger mass of the device as compared to the actuator mass. Further, the device waveform 585 may have an opposite sign from the output waveform 550 as movement of actuator or actuator mass causes an opposing motion of the device.

FIG. 5D illustrates a momentum/velocity graph 590 of an actuator mass along discrete time periods of a time period 591 according to one or more embodiments of the present disclosure. In certain embodiments, the momentum/velocity graph 590 is associated with the haptic output described as the micro-tap. The momentum/velocity graph 590 may be generated by the input waveform 500 shown and described with respect to FIG. 5A. Further, the momentum/velocity graph 590 may correspond to the displacement graph or the output waveform 550 shown and described above with respect to FIG. 5B. That is, peak 593 in the momentum/velocity graph 590 may correspond to a midpoint (or may be reached) between the start of the graph and the displacement peak 553 of the output waveform 550. Further, the peak 593 of the momentum/velocity graph 590 may be caused by the first voltage 505 of the input waveform 500.

As shown in FIG. 5D, an actuator mass of a haptic actuator may reach a first momentum (represented by peak 593) in response to a first voltage that is applied to the haptic actuator during the drive period 502. As discussed above, the first voltage may cause a first electromotive force to be applied to the actuator mass in the form of a push. The first electromotive force causes the actuator mass to increase its momentum from zero, or substantially zero, to a first momentum represented by peak 593. The peak momentum may be between approximately 1500 gram millimeters per second and approximately 2000 gram millimeters per second.

As shown in FIG. 5D, the actuator mass does not cross its point of origin or its original state of rest prior to reaching its peak momentum. Thus, the peak momentum (and velocity) of the actuator mass may be reached in one, or less than one, zero crossing. In certain embodiments, the time that elapses between the actuator mass increasing its velocity, and thus its momentum, from zero, or substantially zero, to the time at which the actuator mass returns a momentum of zero or substantially zero, may be between approximately six milliseconds and approximately twenty milliseconds. In some implementations, the elapsed time may be approximately fifteen milliseconds.

The momentum and/or velocity of a device with respect to the micro-tap atom may also be represented as an output waveform. The output waveform that represents the momentum and/or velocity of the device may have an intensity or amplitude that is less than the intensity or the amplitude of the momentum/velocity graph 590 shown above with respect to FIG. 5D and have an opposing sign. Further, the velocity of the device may be smaller when compared to the velocity of the actuator mass because the device has a mass that is greater than the mass of the actuator.

Figure 6A:
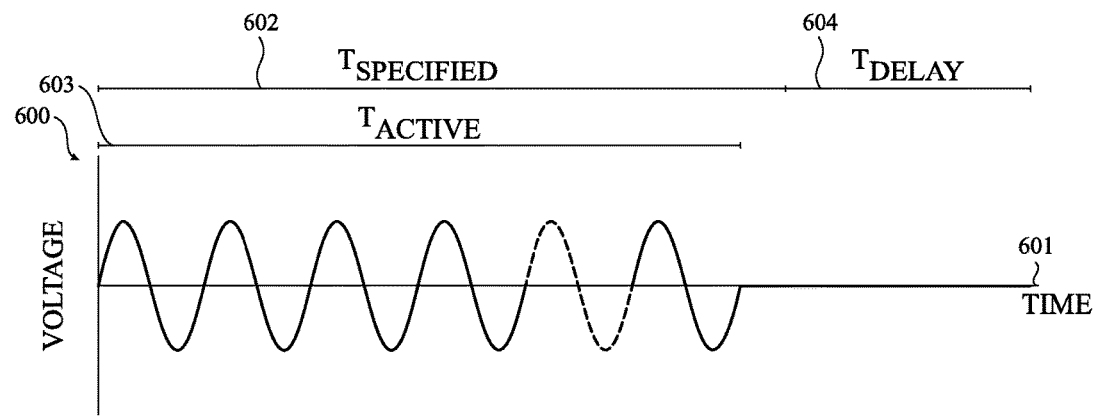
FIG. 6A illustrates an example input waveform for producing a fourth type of type of haptic output according to one or more embodiments of the present disclosure.
Figure 6B:
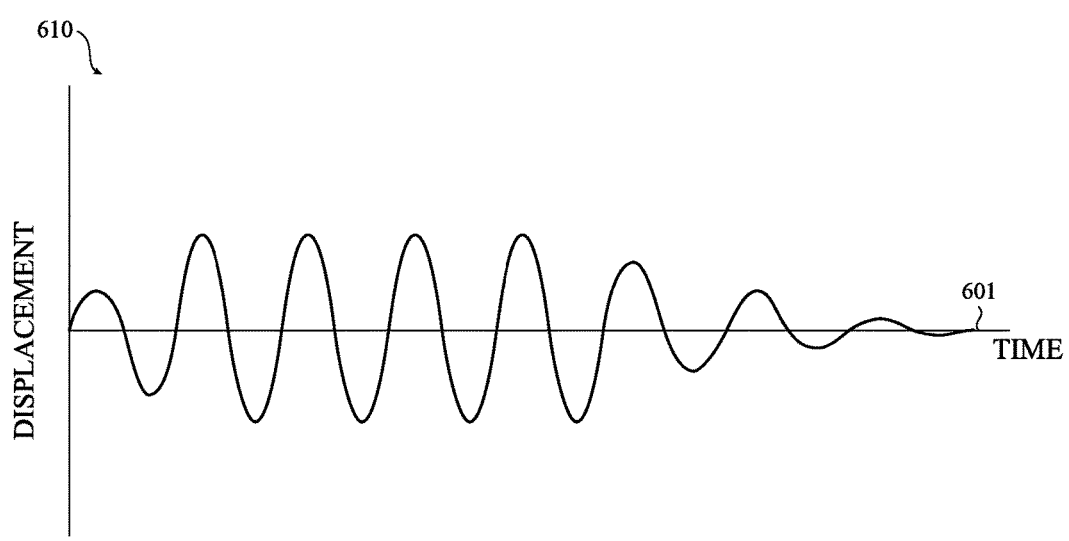
FIG. 6B illustrates an example output waveform for providing the fourth type of haptic output according to one or more embodiments of the present disclosure.

FIG. 6A illustrates an example input waveform 600 for producing a fourth type of haptic output according to one or more embodiments of the present disclosure. The fourth type of haptic output is referred to herein as a "sine" atom and may be represented as input waveform 600 such as shown in FIG. 6A and an output waveform 610 such as shown in FIG. 6B. The input waveform 600 for the sine atom may have a frequency of between approximately 35 Hz and approximately 150 Hz although other frequencies may be used. For example, the sine atom may have a frequency of between approximately 59 Hz and 87 Hz. In certain embodiments, the sine atom, along with the other sine atoms disclosed herein, are configured to produce a steady vibe signal. For example, the input waveform 600 for the sine atom may cause the haptic actuator to produce a pun or light buzz, or some other type of continuous or semi-continuous regular oscillating haptic output over a time period 601.

The input waveform 600 may benefit from the resonance of the haptic actuator. As such, the maximum drive amplitude of the sine atom may not need to be as great as the maximum drive amplitude of the input waveform 300 for the tap atom described above in order to maintain the same displacement of the actuator mass and/or electronic device. However, because the maximum drive amplitude for the sine atom is reduced, the sine atom may take some time to ramp up and/or wind down (subject to the sine atom being combined with other atoms such as described below).

While a sine wave is specifically mentioned with respect to FIG. 6A, embodiments disclosed herein may be represented as any regular periodic oscillating wave or a simple harmonic oscillating wave Likewise, the same may be said of the other sine waves described below.

Referring to FIG. 6A, the input waveform 600 comprises different time variables such as Tspecified 602, Tactive 603 and Tdelay 604 such as described above. For example, the duration of the input waveform 600, set by Tspecified 602 may be equivalent to a desired number of cycles or a desired amount of time that the input waveform 600 is to be played by a synthesizer engine. However, the synthesizer engine may be configured to play or otherwise fit the largest number of sine cycles into the time specified or requested. As a result, the synthesizer engine may determine that N number of cycles may be played during Tspecified 602 and as a result, play the N number of complete cycles for the duration set forth in Tactive 603.

Tdelay 604 represents an amount of time or a recommended delay between when the synthesizer engine stops playing the input waveform 600 and begins playing a subsequent atom. In some embodiments, Tdelay 604 for the input waveform 600 is approximately one hundred milliseconds or higher although other values (including lower values) may be used.

When the input waveform 600 is applied to a haptic actuator, such as, for example, haptic actuator 1400 (FIG. 14), the actuator mass of the haptic actuator may require some cycles to ramp up to its peak amplitude or its steady-state amplitude. This is represented in FIG. 6B. For example, as shown in FIG. 6B, when power is first applied to the haptic actuator, the first peak and trough of the output waveform that indicates a displacement of the actuator mass are less than a peak displacement or a peak amplitude during steady state. In some implementations, a peak momentum of the actuator mass may be achieved between three and four zero crossings.

When power is no longer applied to the haptic actuator (e.g., when the synthesizer engine stops playing the input waveform 600), residual motion of the actuator mass may persist for a time. More specifically, because the input waveform 600 does not include a brake period such as described above with respect to the other atoms, the actuator mass may slow its oscillation, or non-oscillating motion, and eventually stop once the synthesizer engine stops playing the input waveform 600.

As the movement of the actuator mass of the haptic actuator may take more than one cycle to achieve steady-state amplitude, the haptic output associated with the sine atom may not be as crisp and/or sharp as the other embodiments described herein. That is, there may be slight leading haptic outputs and slight trailing haptic outputs.

However, one or more embodiments disclosed enable a portion of the input waveform 300, such as described above with respect to FIG. 3A, to be combined with the input waveform 600 of FIG. 6A. The resulting combination is the sine with a boost input waveform 700 shown with respect to FIG. 7A. This atom reduces the slight leading haptic output of the sine atom and provides a crisper, sharper start to the haptic output.

Figure 7A:
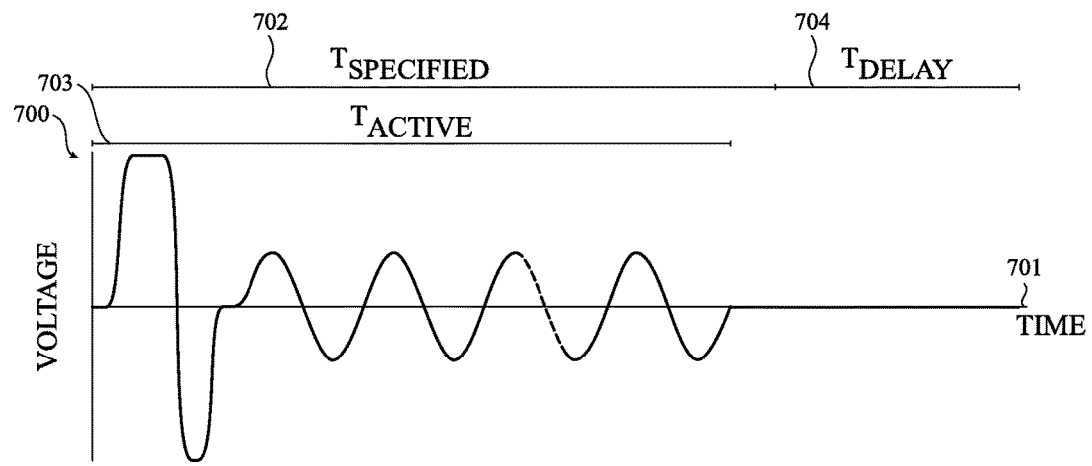
FIG. 7A illustrates an example input waveform for producing a fifth type of haptic output according to one or more embodiments of the present disclosure.
Figure 7B:
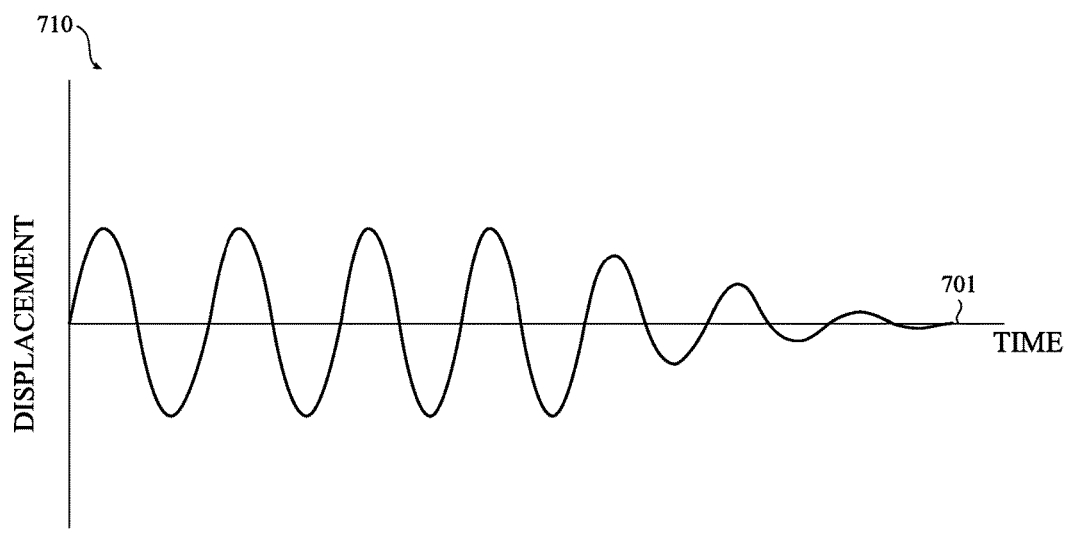
FIG. 7B illustrates an example output waveform for providing the fifth type of haptic output according to one or more embodiments of the present disclosure.

For example, FIG. 7A illustrates an example input waveform 700 for producing a fifth type of haptic output according to one or more embodiments of the present disclosure. In addition, FIG. 7B illustrates an example output waveform 710 that represents a displacement of an actuator mass over a time period 701 in response to the input waveform 700. In certain embodiments, the fifth type of haptic output and the input waveform 700 may be described a sine with a boost.

The sine with a boost input waveform 700 comprises the time variables Tspecified 702, Tactive 703 and Tdelay 704 such as described above. The Tdelay 704 after the sine with a boost input waveform 700 is played (or the recommended or required Tdelay 704 before the sine with a boost input waveform 700 is played) is approximately one hundred milliseconds or higher although other values (including lower values) may be used.

In addition, the boost portion of the sine with a boost input waveform 700 consists of a portion of the input waveform 300 described above. More specifically, and as shown in FIG. 7A, the boost portion of the sine with a boost input waveform 700 may consist of approximately half of the drive period 302 shown and described above with respect to the tap atom. As such, the boost may be represented as a substantially square atom, or a portion of a square atom such as shown in FIG. 7A.

Put another way, the sine a with boost may be a regular periodic oscillating wave or a simple harmonic oscillating wave preceded by a boost. The boost portion has an amplitude that is greater than a peak amplitude of the regular periodic oscillating wave. As such, the boost may cause the actuator to peak at a steady state displacement (or within a particular percentage (e.g., 10%) of the steady state amplitude) within 1-2 cycles or before a set period of time has elapsed. That is, the boost may cause the actuator mass of the haptic actuator to reach a peak amplitude of the sine with a boost atom in its first or second cycle. Likewise, peak momentum of the actuator mass may be reached between three and four zero crossings. Once peak amplitude has been reached, the remaining sine wave may enable the actuator mass to remain oscillating at the steady-state peak amplitude until the drive wave is stopped.

However, because it may take time for actuator mass to return to a state of rest (such as shown in FIG. 7B) once the sine with a boost input waveform 700 is no longer applied to the haptic actuator, the haptic output provided by the input waveform 700 may have trailing haptic output due to the residual movement of the actuator mass.

Figure 8A:
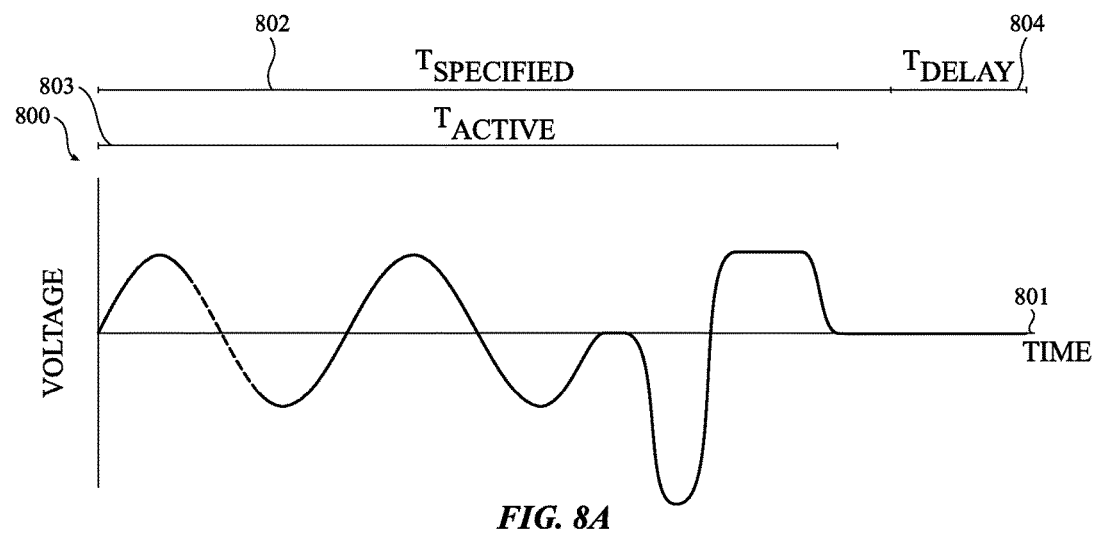
FIG. 8A illustrates an example input waveform for producing a sixth type of type of haptic output according to one or more embodiments of the present disclosure.
Figure 8B:
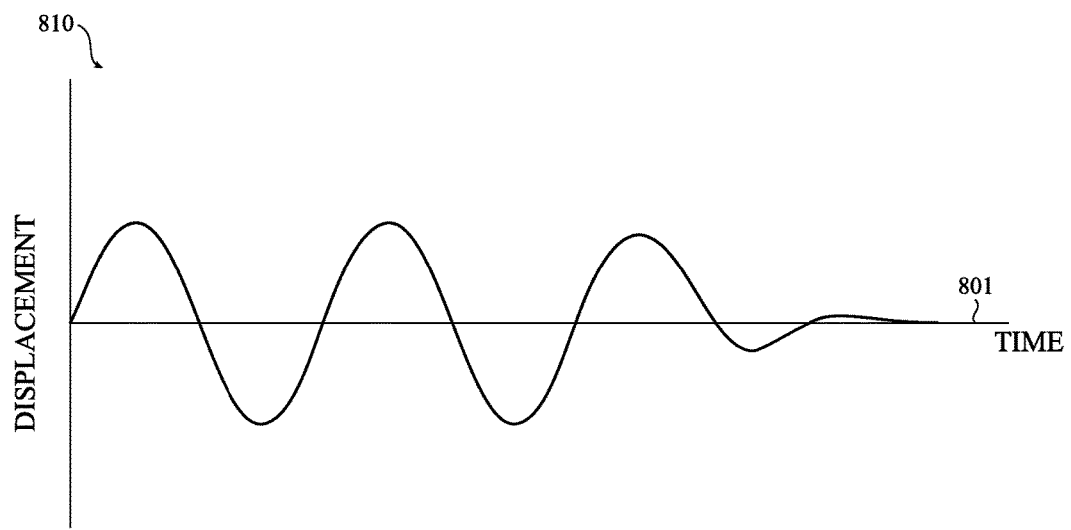
FIG. 8B illustrates an example output waveform for providing the sixth type of haptic output according to one or more embodiments of the present disclosure.

Likewise, FIG. 8A illustrates an example input waveform 800 for producing a sixth type of haptic output known herein as sine with a brake atom according to one or more embodiments of the present disclosure. In addition, FIG. 8B illustrates an example output waveform 810 that represents a displacement of an actuator mass in response to the input waveform 800 over a time period 801. As shown in FIG. 8A, the input waveform 800 comprises different time variables described as Tspecified 802, Tactive 803 and Tdelay 804 such as described above. The Tdelay 804 after the input waveform 800 for the sine with a brake atom is played (or the recommended or required Tdelay 804 before the atom for the sine with a brake is played) is approximately thirty milliseconds or higher although other values (including lower values) may be used.

The sine with a brake input waveform 800 may be used to abruptly stop a sine oscillation. As such, a braking period, such as, for example, the brake period 303 of the input waveform 300 described above with respect to FIG. 3A, may be added to the tail end of the sine with a brake input waveform 800. Introduction of a brake causes the displacement of the actuator mass to abruptly stop such as described above and shown in FIG. 8B.

Thus, although the haptic actuator may take a few cycles to ramp up prior to oscillation, any residual motion of the actuator mass may be reduced by application of a brake such as shown. The brake period that is applied to the input waveform 800 may cause the actuator mass to go from peak momentum to the ringdown threshold (or below) within four or fewer zero crossings and in some implementations, three or fewer zero crossings. A delay may be provided after the active period and before the braking starts so that the braking is out of phase with the motion of the actuator. For example, in some implementations, a delay of 0.225 periods is provided after the sine wave and before the braking so that the braking is approximately 180 degrees out of phase with motion of the actuator.

Although the sine with a brake atom is shown and described as a sine wave, the sine with a brake atom may be represented as any regular periodic oscillating wave or a simple harmonic oscillating wave with a brake following the oscillating wave. In some embodiments, the brake portion has an amplitude that is greater than a peak amplitude of the regular periodic oscillating wave.

Figure 9A:
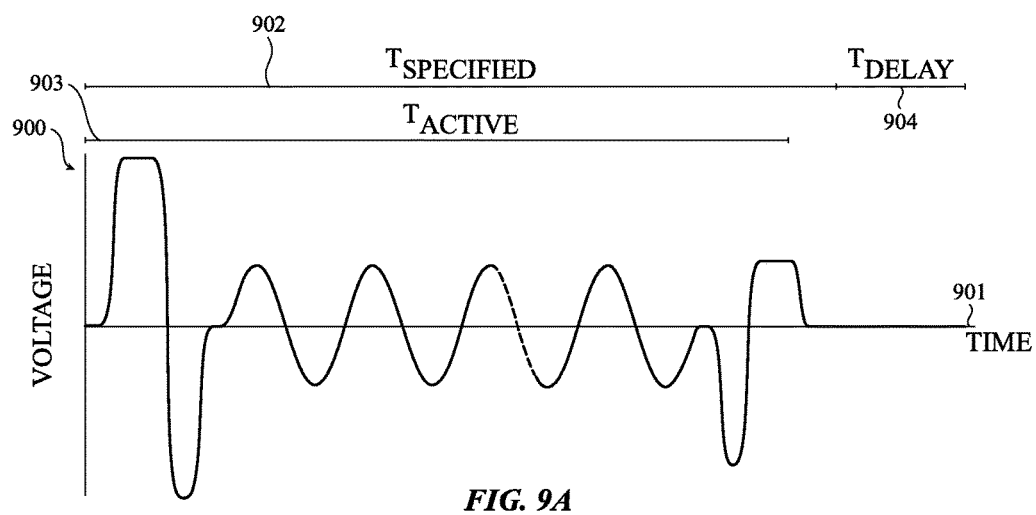
FIG. 9A illustrates an example input waveform for producing a seventh type of haptic output according to one or more embodiments of the present disclosure.

FIG. 9A illustrates an example input waveform 900 for producing a seventh type of haptic output, known herein as a sine with a boost and a brake, according to one or more embodiments of the present disclosure. As with the other sine waves discussed above, the sine with a boost and a brake input waveform 900 comprises different time variables described as Tspecified 902, Tactive 903 and Tdelay 904. The Tdelay 904 after the input waveform 900 for the sine with a boost and a brake atom is played (or the recommended or required Tdelay 904 before the sine with a boost and a brake atom is played) is approximately thirty milliseconds or higher although other values (including lower values) may be used.

Figure 9B:
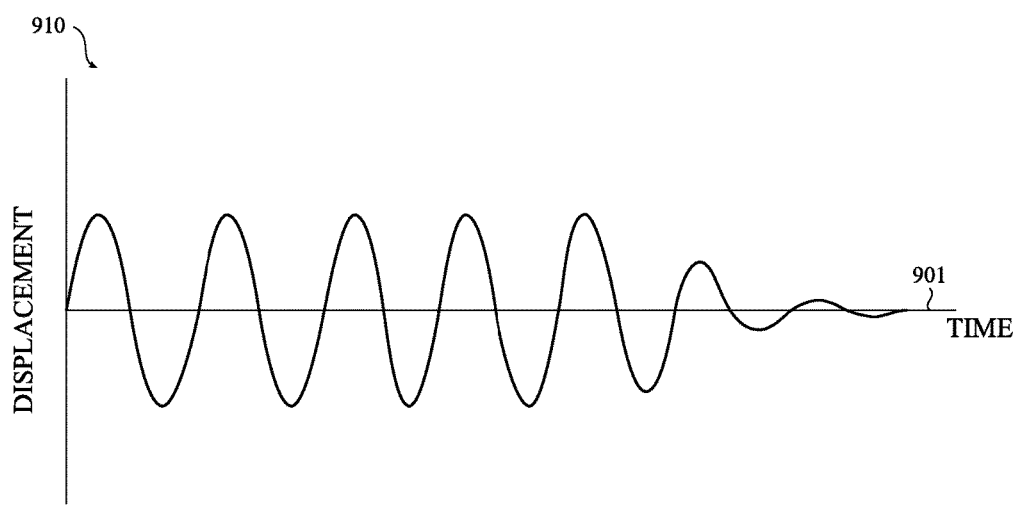
FIG. 9B illustrates an example output waveform for providing the seventh type of haptic output according to one or more embodiments of the present disclosure.

In addition, FIG. 9B illustrates an example output waveform 910 that represents a displacement of an actuator mass in response to the input waveform 900 over a time period 901. The haptic output provided by the input waveform 900 may be described as a sine with a boost and a brake. Although a sine wave is shown and described with respect to FIG. 9A, the sine with a boost and a brake may be represented as any regular periodic oscillating wave or a simple harmonic oscillating wave preceded by a boost and followed by a brake.

The sine with a boost and a brake input waveform 900 may be a combination of the sine with a boost input waveform 700 and the sine with a brake input waveform 800 described above. As a result, when the sine with a boost and a brake input waveform 900 is played by a haptic actuator, the start of the haptic output is crisp much like the input waveform 300 for the tap atom described above Likewise, when movement of the actuator mass is to cease, a brake, and more specifically a brake period 303 of the input waveform 300, may be appended to the end of the sine with a boost and a brake input waveform 900. As shown in FIG. 9B, the output waveform 910 that represents the displacement of an actuator mass of a haptic actuator may have both a crisp start and a crisp stop thereby reducing or eliminating any wind-up or wind-down haptic output.

In some cases, it may be desirable to have a haptic output in which an amplitude of the output waveform increases from zero or substantially zero to a peak amplitude in a ramped configuration. In other embodiments, it may be desirable to "loosen" the actuator mass (e.g., have the actuator mass move slightly to overcome any friction present in the actuator) prior to an atom being played by a synthesizer engine. However, and as mentioned above, friction may be present in the actuator (e.g., static friction and/or dynamic (or kinetic) friction between various components in the actuator). Due to the friction, it may be difficult to generate an output waveform that has the desired characteristics. For example, a minimum amount of force may be required in order for the actuator mass to begin moving. However, if too much power is applied by the input waveform at the start, the output waveform may not have the desired ramping shape. On the other hand, if too little power is applied by the input waveform at the start, the actuator mass may not have enough force to overcome the friction and begin movement.

Figure 19A:
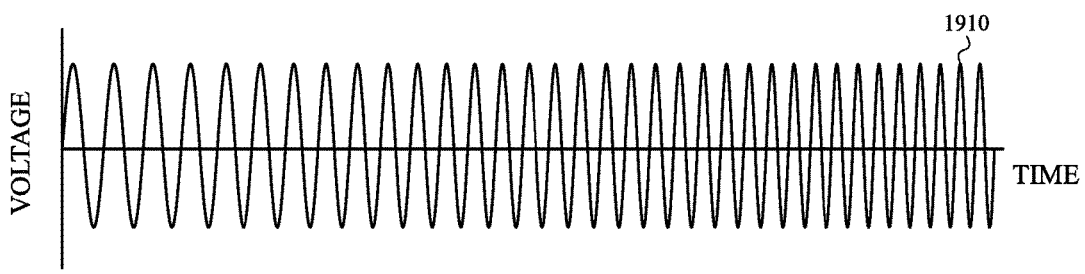
FIG. 19A illustrates an example input waveform that starts off-resonance and moves to a resonance frequency according to one or more embodiments of the present disclosure.
Figure 19B:
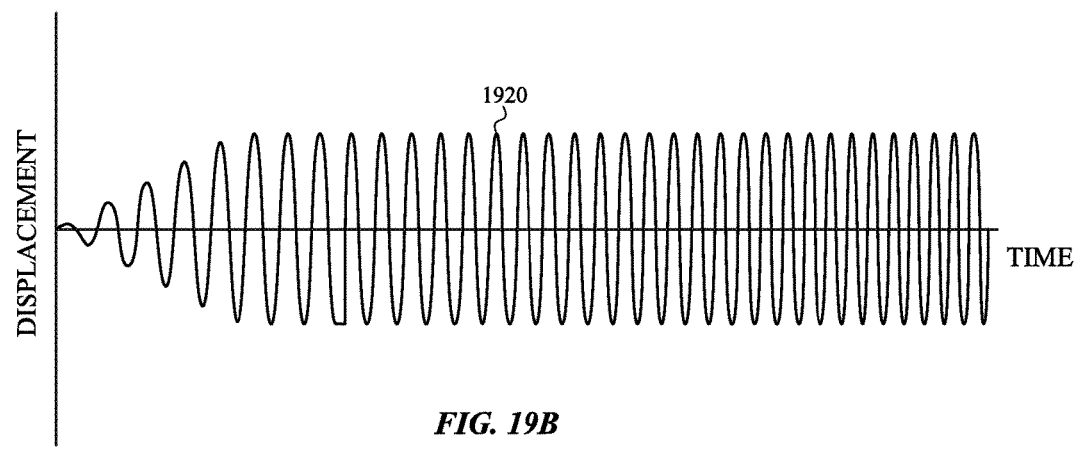
FIG. 19B illustrates an example output waveform having a ramped configuration caused by the input waveform of FIG. 19A according to one or more embodiments of the present disclosure.

In order to solve the aforementioned problem, a frequency chirp (or frequency shift) may be applied to an input waveform. For example and turning to FIG. 19A, an input waveform 1910 having an applied frequency chirp may be used to produce the output waveform 1920 of FIG. 19B. That is, the input waveform 1910 may begin off-resonance and slowly move to the resonance frequency. For example, if resonance frequency (A) of the input waveform 1910 is approximately 150 Hz, the input waveform may be played at a frequency of 130 Hz (off-resonance) to start and move toward 150 Hz (on-resonance). As the frequency of the input waveform shifts from off-resonance to on-resonance, the amplitude of the resulting output waveform 1920 increases. The resulting output waveform 1920 may have the desired ramped configuration such as shown in FIG. 19B. Although the above example illustrates the frequency increasing from off-resonance to on-resonance, the frequency change from off-resonance to on-resonance may decrease. For example, if the resonance frequency of a sine wave was 150 Hz, the off-resonance may begin at 180 Hz and decrease to 150 Hz.

Using a frequency chirp such as shown and described above enables the input waveform 1910 to be driven at full amplitude. Because the input waveform is driven at full amplitude, the input waveform 1910 produces a high amount of force that is applied to the actuator mass which helps the actuator mass overcome the friction that is present in the actuator. As the frequency of the input waveform 1910 shifts, the amplitude of the actuator mass may linearly increase.

Figure 20A:
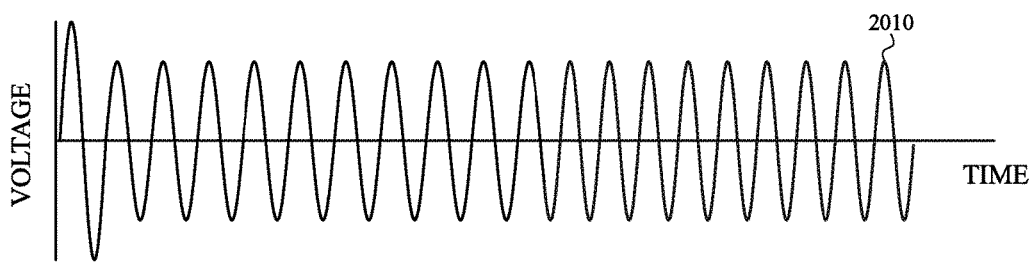
FIG. 20A illustrates an input waveform with a boost according to one or more embodiments of the present disclosure.
Figure 20B:
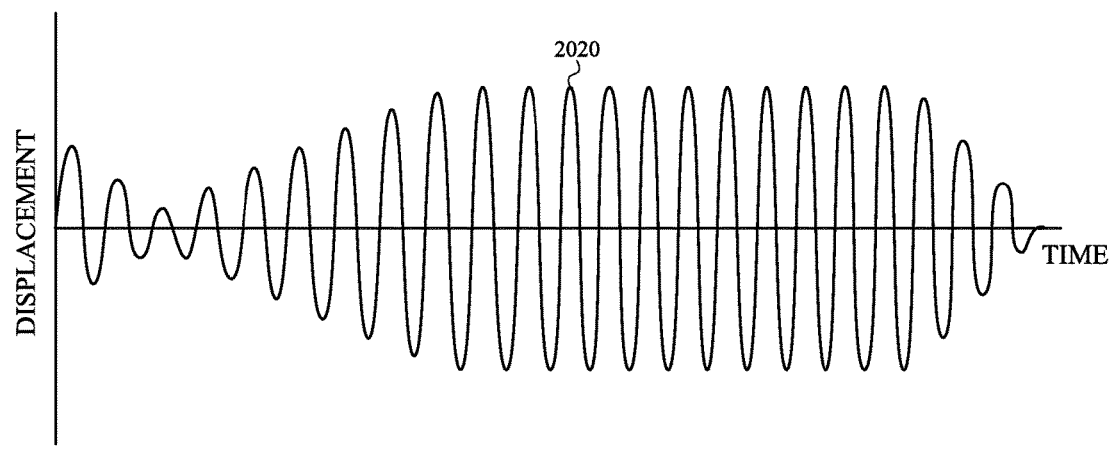
FIG. 20B illustrates an example output waveform having a ramped configuration caused by the input waveform of FIG. 20A according to one or more embodiments of the present disclosure.

In another implementation such as shown in FIGS. 20A-20B, an input waveform 2010 may include a boost at the beginning of the input waveform 2010. This boost may enable the actuator mass to break free of the friction that is present in the actuator. Once the boost is applied, a frequency chirp may also be applied to the input waveform 2010 such as described above with respect to FIG. 19A. Using the boost and the frequency chirp, the resulting output waveform 2020 may have a ramped configuration such as shown in FIG. 20B. Once the input waveform 2010 is no longer applied, movement of the actuator mass may slowly decrease until it reaches the ringdown threshold and/or stops moving.

Figure 21A:
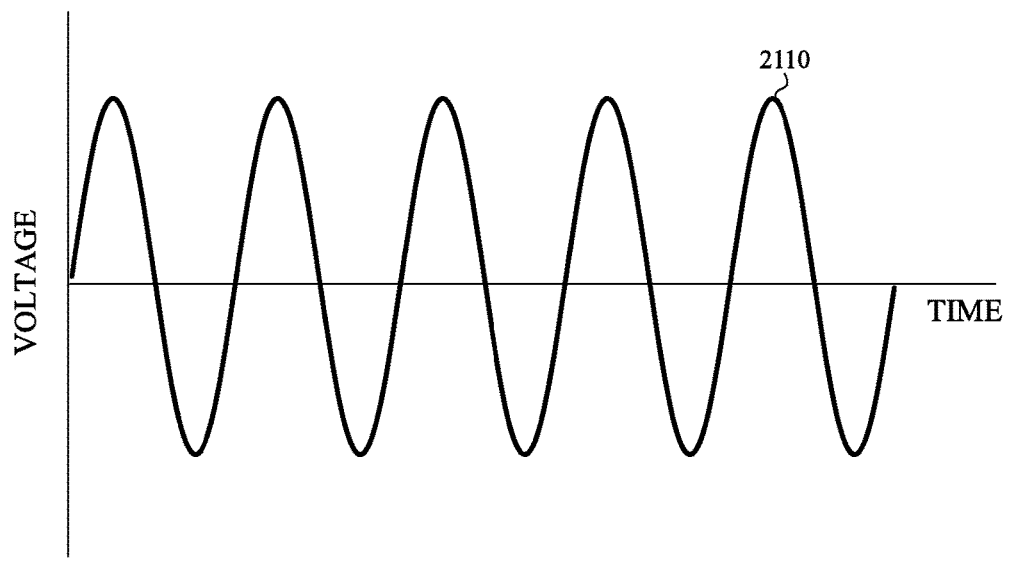
FIG. 21A illustrates an example sine wave input waveform according to one or more embodiments of the present disclosure.

FIG. 21A illustrates an example sine input waveform 2110 according to one or more embodiments of the present disclosure. This input waveform 2110 may be applied to the haptic actuator of the electronic device in the same manner as the other waveforms described herein. For example, the input waveform 2110 may played by the actuator in a similar manner as the sine atom described above with respect to FIG. 6A.

However, unlike the sine atom described above with respect to FIG. 6A, the input waveform 2110 may start off-resonance. For example, the resonance frequency of any input waveform may be represented as $f_0$. However, because the input waveform 2110 may be off-resonance, its frequency may be represented as $f_{0-n}$ where n is equivalent to some frequency shift. In some implementations, n may be approximately 10 Hz although other values for n may be used; such values may be either absolute (e.g., a fixed frequency shift) or relative (e.g., a frequency shift based on the input or corresponding output waveform, such as ¼ of the input waveform frequency).

Although the input waveform 2110 may start off-resonance, as the input waveform 2110 is applied to the haptic actuator, the input waveform 2110 may (optionally) move to the resonance frequency. As the input waveform 2110 is played by the haptic actuator, the movement of the actuator or the actuator mass may be represented as an output waveform 2120 shown in FIG. 21B.

However, one potential problem with the output waveform 2120 is that the movement of the actuator, and more specifically the movement of the actuator mass, may exceed movement bounds set by the enclosure of the haptic actuator. More specifically, application of the input waveform 2110 to the actuator may cause the actuator mass to impact one or more sidewalls of the enclosure of the haptic actuator.

Figure 21B:
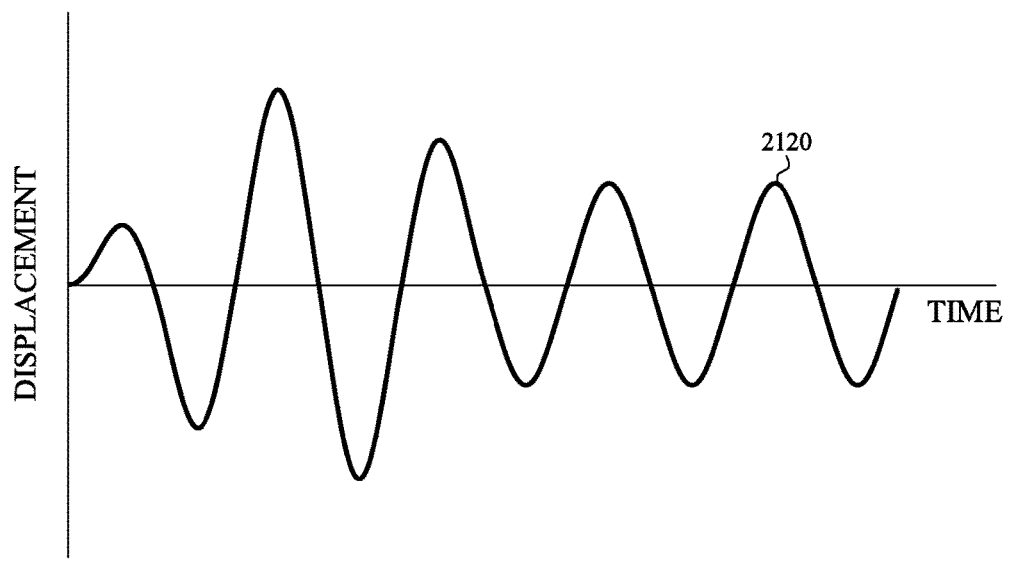
FIG. 21B illustrates an example output waveform that results from the sine input waveform of FIG. 21A according to one or more embodiments of the present disclosure.

For example and as shown in FIG. 21B, application of the input waveform 2110 may cause movement of the actuator mass to spike at the beginning of the output waveform 2120. As time passes, movement of the actuator mass may settle to the off-resonance frequency (or eventually to the resonance frequency) such as shown.

In order to compensate for the extra movement of the actuator mass at the beginning of the output waveform 2120, the enclosure or case of the haptic actuator may be expanded. However, this solution may not be desirable as the expansion of the enclosure of the haptic actuator may occupy valuable real estate within the electronic device.

Figure 22A:
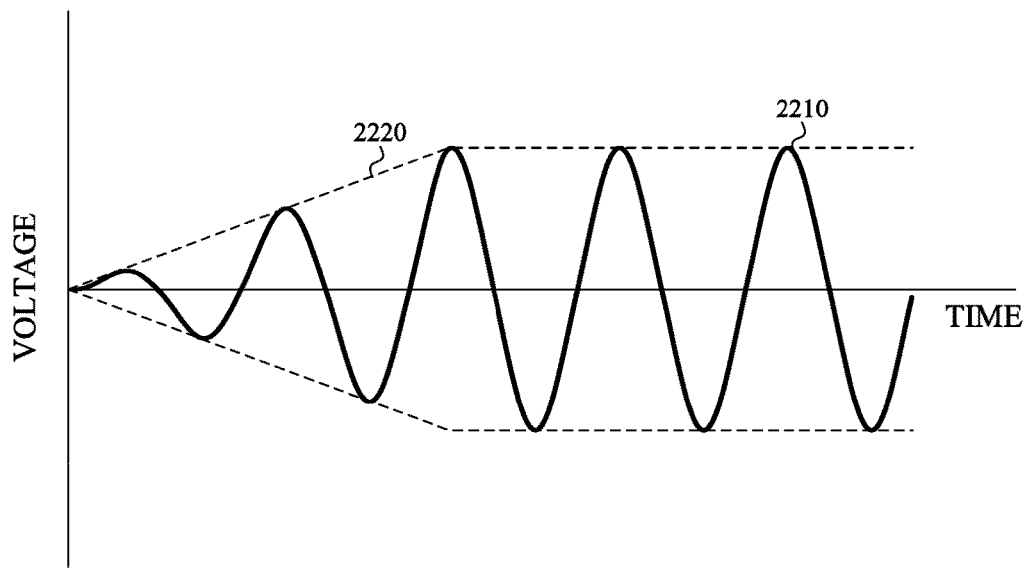
FIG. 22A illustrates an example sine input waveform having a ramped configuration according to one or more embodiments of the present disclosure.

As an alternative to expanding the enclosure of the haptic actuator, input waveform 2110 may be replaced by input waveform 2210 shown in FIG. 22A. The input waveform 2210 may be a sine wave although other waveforms may be used. Like input waveform 2110, the input waveform 2210 may have a resonance frequency $f_0$ or may be off-resonance and represented as $f_{0-n}$ where n is equivalent to some frequency shift.

In some embodiments, the input waveform 2210 may be bound by an envelope 2220 so that the input waveform 2210 has a ramped configuration. More specifically, the sine wave of the input waveform 2210 begins with a smaller amplitude as it is bound by the envelope 2220 and increases over a given time period. Although not required, as the input waveform 2210 is provided to the haptic actuator, the input waveform may transition from off-resonance to the resonance frequency.

Although the envelope 2220 is shown as having a straight line as its upper and lower bounds, in some implementations, the upper and lower bounds of the envelope 2220 may increase over time until maximum bounds are met. Put another way, the start of the envelope 2220 may increase by a first slope over a first amount of time and increase by a second, smaller slope over a second amount of time. The second amount of time may be longer than the first amount of time. In implementations in which the second slope increases, the second slope may increase until a maximum bound is met.

Figure 22B:
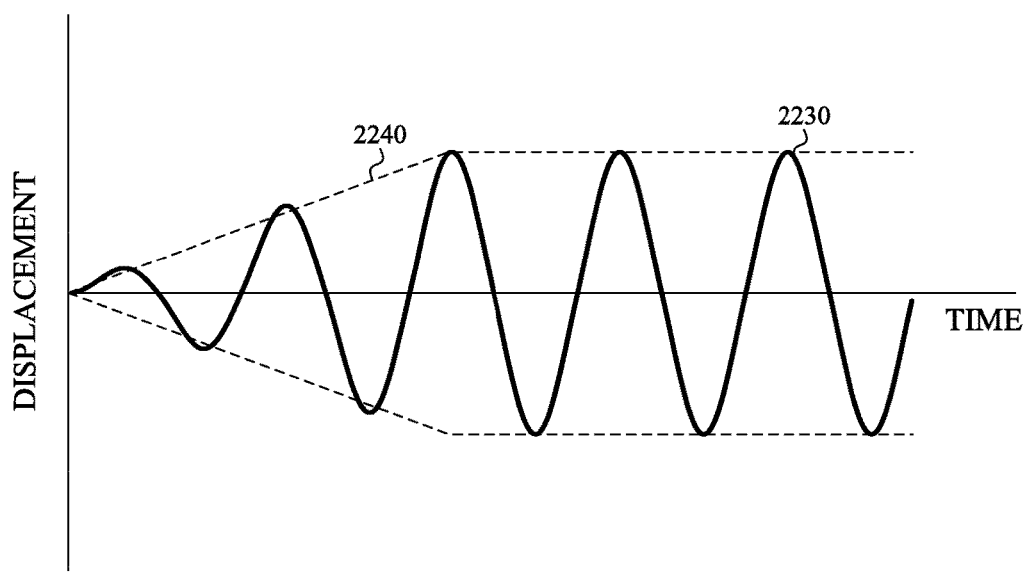
FIG. 22B illustrates an example output waveform that results from the input waveform of FIG. 22A according to one or more embodiments of the present disclosure.

FIG. 22B illustrates an example output waveform 2230 that results from the input waveform 2210 of FIG. 22A being played by the haptic actuator according to one or more embodiments of the present disclosure. The output waveform 2230 may be off-resonance (e.g., have a frequency represented as $f_{0-n}$ where n is equivalent to some frequency shift) as a result of the input waveform 2210 being off-resonance. However, in some implementations, if the input waveform 2210 moves toward the resonance frequency, the output waveform 2230 may also move toward the resonance frequency.

As shown in FIG. 22B, the displacement of the actuator may be bound by an envelope 2240. Like envelope 2220, envelope 2240 has a ramped configuration. Thus, movement of the actuator may increase by a first slope during a first period and remain steady (or increase by a second slope) during a second period of time. Although the bounds of the envelope 2240 of the first slope are shown as linearly increasing, the input waveform 2210 may cause the actuator to slightly move beyond the initial bounds of the envelope 2240 such as shown in FIG. 22B. However, even if movement of the actuator passes the bounds of the first slope, the actuator mass will not impact the sides of the enclosure of the haptic actuator.

Put another way and in contrast to the input waveform 2110 and the output waveform 2120 shown and described above with respect to FIGS. 21A-21B, the input waveform 2210 output waveform 2230 will allow the movement of the actuator to ramp up to peak displacement but not permit the actuator mass to impact one or more sidewalls of the enclosure of the haptic actuator.

Although not specifically shown in FIGS. 19A-22B, the various input waveforms 1910, 2010, 2110 and 2210 may include the various parameters (e.g., Tactive, Tspecified, Tdelay) such as described above. For example, these variables may be similar to the variables for the input waveform 600 shown and described above with respect to FIG. 6A.

Additionally, the various input atoms described herein, and more particularly the various atoms described above with respect to FIGS. 6A-9B and FIGS. 19A-22B, may be operated on by waveform "effectors" to create various input waveforms. These effectors may define scaling functions that limit the intensities or the amplitudes of signals. As one example, the effector may be used to limit or otherwise provide a rate of change of a parameter such as, for example, a rate of change of a parameter from a peak to zero, from zero to a peak, and so on. In certain embodiments, an effector may be used to modify the amplitude of a waveform. More specifically, various effectors may be used to restrict or otherwise modify the intensities or the amplitudes of various waveforms in order to change a haptic output caused by the waveform. In certain embodiments, the time period associated with the effector, the angle or curvature of the effector, as well as beginning parameter values and ending parameter values, may all be customizable and/or selected by a developer/designer or a user or be based on an application, a type of alert notification and so on.

In some cases, it may be desirable to scale input waveforms (e.g., input atoms) by applying a function or factor in order to vary an output waveform (e.g., output atom). For example, if an output waveform of steadily increasing intensity is desired, one may accomplish this by steadily increasing the amplitude of an input waveform. Given the foregoing example, the effectors described below 1000 of FIG. 10A may be applied to one or more input atoms to produce an output waveform having steadily increasing intensity.

Thus, effectors may be thought of as scaling functions that may be applied across a certain time (e.g., predefined or definable by a developer or designer) to one or more atoms in order to produce a desired output. The effector may be time-limited or may be applied indefinitely.

Figure 10A:
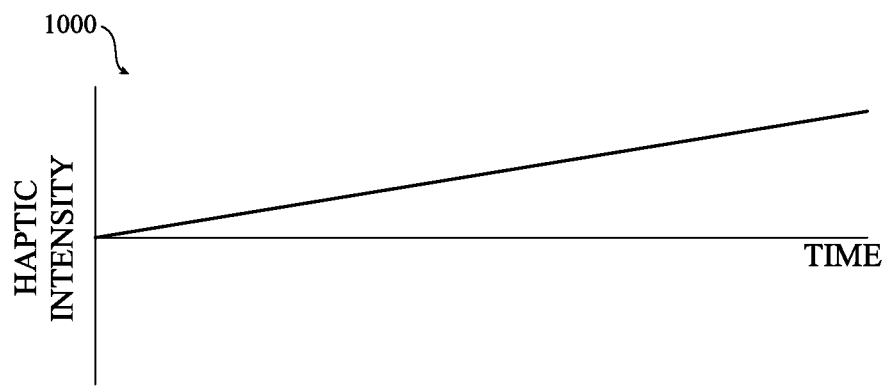
FIG. 10A illustrates a linear effector that may be used to bound one or more parameters of an atom over a time period according to one or more embodiments of the present disclosure.
Figure 10B:
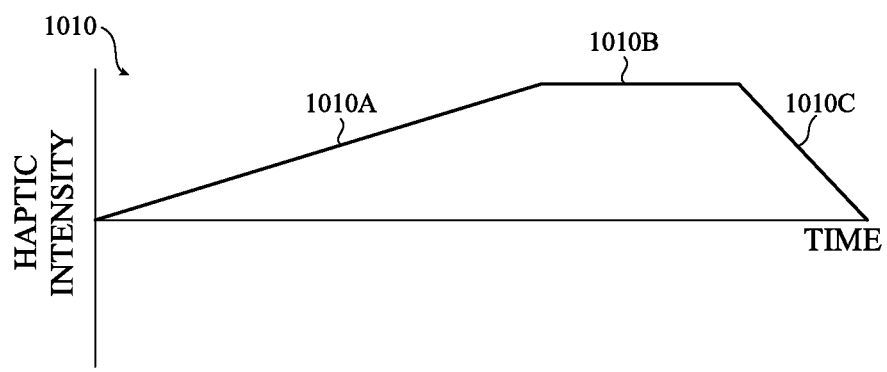
FIG. 10B illustrates a four points effector that may be used to bound one or more parameters of an atom over a time period according to one or more additional embodiments of the present disclosure.
Figure 10C:
FIG. 10C illustrates an exponential decay effector that may be used to bound one or more parameters of an atom over a time period according to one or more additional embodiments of the present disclosure.

FIGS. 10A-10C illustrate various effectors that may be used with any input atom described herein. Although FIGS. 10A-10C show that the effectors may be applied in a positive amplitude, the shape of the effectors, and more specifically the effectors themselves, may also be applied to waveforms in a negative amplitude. Thus, although the effectors may be applied in the negative amplitude the forms and/or shapes of the effectors may mirror the positive amplitude effectors described about the X axis.

FIG. 10A depicts an effector 1000 with a linearly increasing amplitude. Accordingly, when this effector is applied to an atom, the output waveform may have a linearly increasing maximum amplitude or intensity that conforms to the effector. It should be appreciated, however, that the application of a linear effector, like that shown in FIG. 10A, may be combined with an input atom having variable amplitude to produce an output atom with a variably increasing amplitude or intensity, or an atom whose amplitude increases and/or decreases at a slower rate than would be the case if the effector were not applied.

FIG. 10B depicts an effector 1010 that has three separate and unique regions, illustrated as regions 1010A, 1010B, 1010C. The initial region 1010A may function similarly to the linearly increasing effector 1000 shown in FIG. 10A. The effector's second region 1010B may function to maintain a constant scaling factor, while the third region 1010C may function to linearly reduce the scaling factor applied to an input atom from the value of region 1010B back to zero.

FIG. 10C depicts a third sample effector 1020. Here, the effector 1020 scales non-linearly from an initial non-zero value to zero as time passes. Thus, the application of the effector 1020 to an input atom may produce an output atom whose amplitude or intensity decreases non-linearly with respect to time.

It should be appreciated that many other effectors may be configured and applied to input atoms to generate any number and/or variety of output atoms. Accordingly, the three effectors shown in FIGS. 10A-10C are examples only and not meant to be limiting in any fashion. For example, and while not shown in the figures, one or more effectors may be used to linearly or otherwise reduce the maximum allowable amplitude, non-linearly increase the maximum allowable amplitude and so on.

Figure 11:
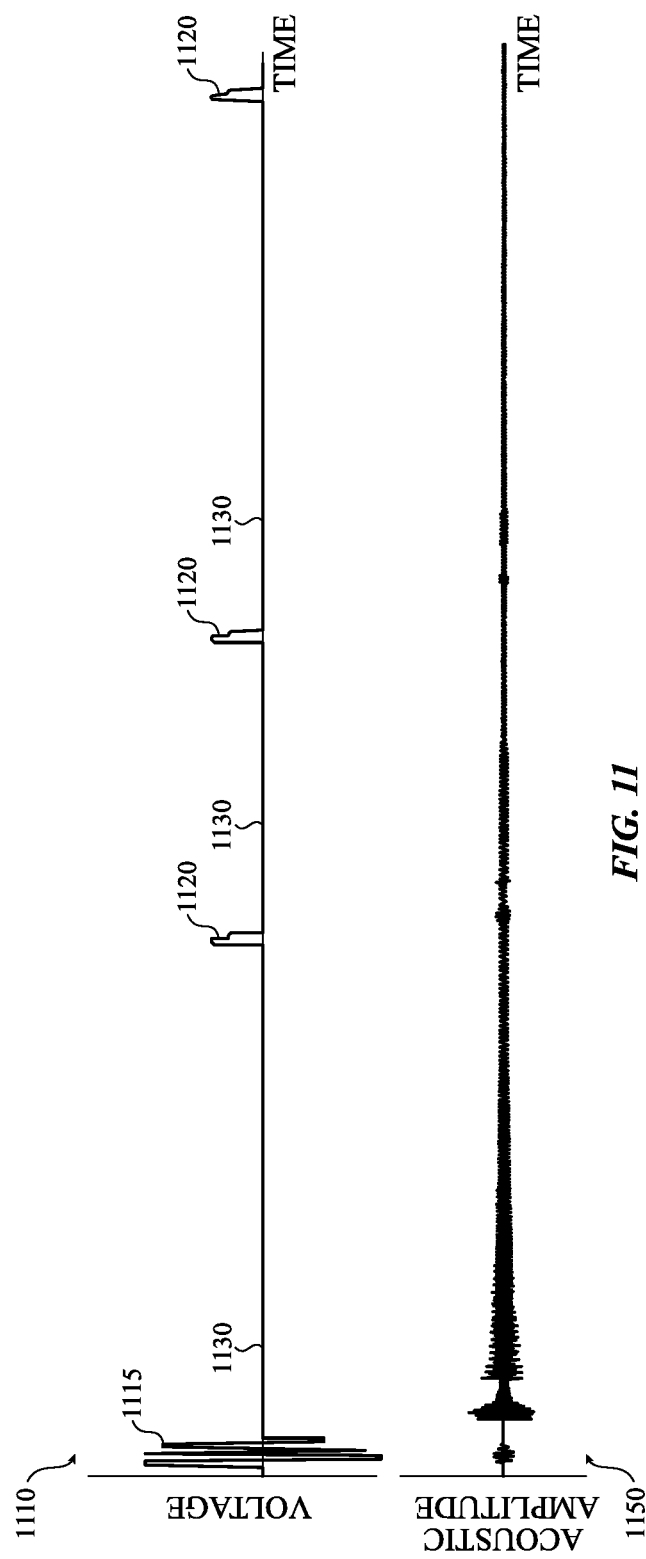
FIG. 11 illustrates a sequence of atoms and an associated audio output according to one or more embodiments of the present disclosure.

FIG. 11 illustrates a sequence of atoms 1110 and an associated audio output waveform 1150 according to one or more embodiments of the present disclosure. The sequence of atoms 1110 and the associated audio output waveform 1150 may be played by an electronic device, such as, for example, electronic device 1200 of FIGS. 12A-12C.

As previously discussed, embodiments described herein enable the generation, creation and/or use of a haptic language. The haptic language may be used or associated with the various example alert events described above. As also discussed, the haptic language may be described as a sequence of multiple haptic atoms that are arranged in a particular pattern over a time period.

For example, as shown in FIG. 11, the sequence of atoms 1110 may include a first atom 1115 followed by multiple iterations of a second atom 1120. In the illustrated example, the first atom 1115 is a tap and the second atom 1120 is a micro-tap. Although a particular sequence, combination and number of atoms are shown in FIG. 11, the various atoms described herein may be combinable in many different ways.

The sequence of atoms 1110, and more specifically the starting point of each atom in the sequence, may be specified in seconds. For example, the first atom 1115 may start at 0.068 seconds, while each of the second atoms 1120 may start at 0.642 seconds, 0.962 seconds and 1.493 seconds respectively. An actuator mass of the haptic actuator may be returned to its nominal position after each atom in the sequence has been completed.

The sequence of atoms 1110 may also include a silence atom 1130. As shown in FIG. 11, the silence atom 1130 may be played between various atoms in the sequence of atoms 1110. For example and as shown in FIG. 11, a silence atom 1130 may be played between the first atom 1115 and the second atom 1120 as well as between each iteration of the second atom 1120. The silence atom 1130 may be played individually or in sequence. Further, the length of the silence atom 1130 may be adjusted based on, for example, the type of alert event with which the sequence of atoms 1110 is associated. In some embodiments, the actuator mass of the haptic actuator remains in its nominal position, or reaches a minimum movement threshold, as each silence atom 1130 is played.

As also show in FIG. 11, an audio output waveform 1150 may be played in conjunction with, or synchronized with, the haptic output provided by the sequence of atoms 1110. The audio output waveform 1150 may be played before, during or after an atom starts playing. More specifically, playback of the audio output waveform 1150 may be initiated based on the type of atom to which the audio output waveform 1150 is being synchronized. For example, the audio output waveform 1150 may begin playing at the start of or during the brake period of a tap atom, or it may begin playing at the end of either the brake or delay period of a mini-tap atom or micro-tap atom. In another example, the playback of the audio waveform associated with the tap atom may begin playing at the end of either the brake period or the delay period while the playback of the audio waveform may begin playing at the start of or during the brake period of the mini-tap atom or micro-tap atom. Although specific examples are given, the playback of the audio waveform may be initiated at various times during or after the active periods of each atom.

The intensity of the audio output waveform 1150 may also vary based on, for example, the type of haptic atom being played by the electronic device. For example, an audio waveform associated with a tap atom may be played with a greater intensity than the intensities of an audio waveform associated with a mini-tap atom or a micro-tap atom.

In some embodiments, the audio output waveform 1150 associated with the mini-tap atom may have an intensity that is less than 100 percent (e.g., approximately eighty percent) of the audio waveform intensity of the tap atom and, as discussed above, playback may start at the beginning of or during the brake period of the mini-tap atom. In another embodiment, the playback of the audio waveform may start before the beginning of the brake period or sometime after the end of the brake period of the mini-tap atom.

Likewise, the audio waveform associated with the micro-tap atom may have an intensity that is even less than that of the mini-tap atom (e.g., approximately twenty percent of the peak intensity of the audio waveform associated with the tap atom) and playback may start at the end of the micro-tap atom (e.g., when the brake period ends) or at other various times either before, during or after the brake period such as described above. Audio waveform playback delay also may be based on the size and/or material of the electronic device, the haptic actuator, or any combination of the above.

Although specific offsets between atoms and audio waveforms have been discussed, the offsets between the waveforms may vary based on, for example, user preference, event notifications, haptic language, the type of atom being played and so on. For example, the delay between haptic output and an audio waveform may vary based on the type of atom being played. In some embodiments, there may be a longer delay between weaker atoms and audio waveforms than stronger atoms and the audio waveforms. That is, there may be a longer delay between a micro-tap atom and an audio waveform than between a tap atom and an audio waveform. In other embodiments the delay between the audio waveform and the weaker atoms may be shorter than the delay between the audio waveforms and the stronger atoms. In still yet other embodiments, there may be no difference in the delay between the audio waveforms and the weaker atoms and the stronger atoms.

Figure 12A:
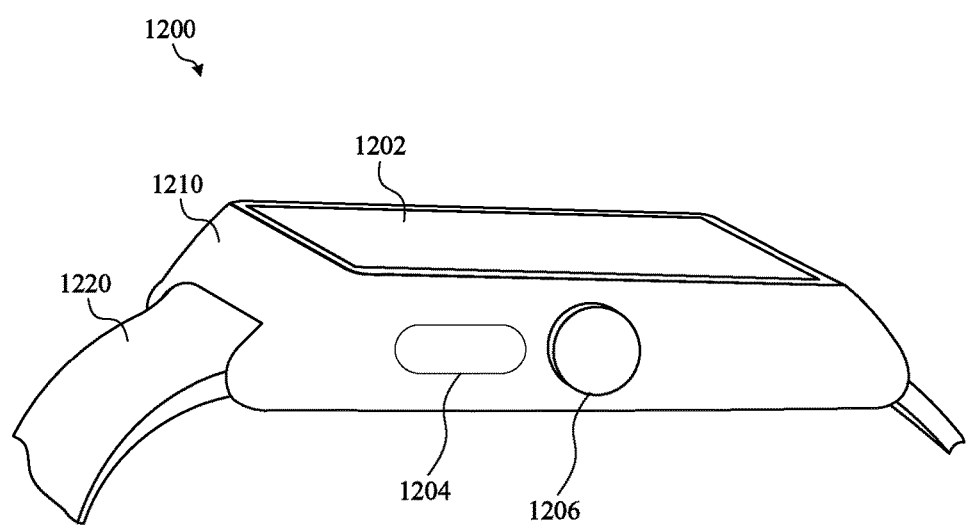
FIG. 12A illustrates an example electronic device for providing haptic output according to one or more embodiments of the present disclosure.
Figure 12B:
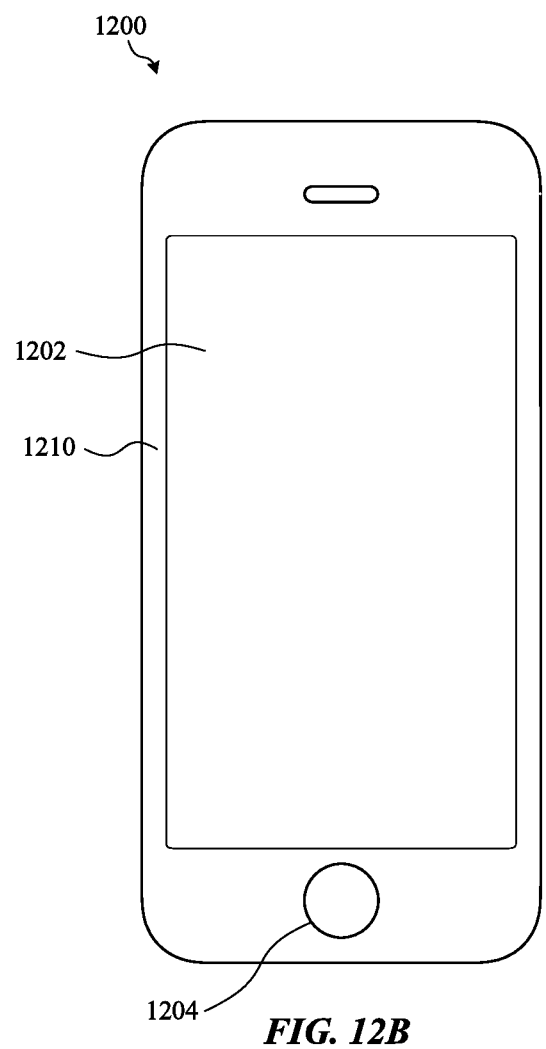
FIG. 12B illustrates another example electronic device for providing haptic output according to one or more embodiments of the present disclosure.
Figure 12C:
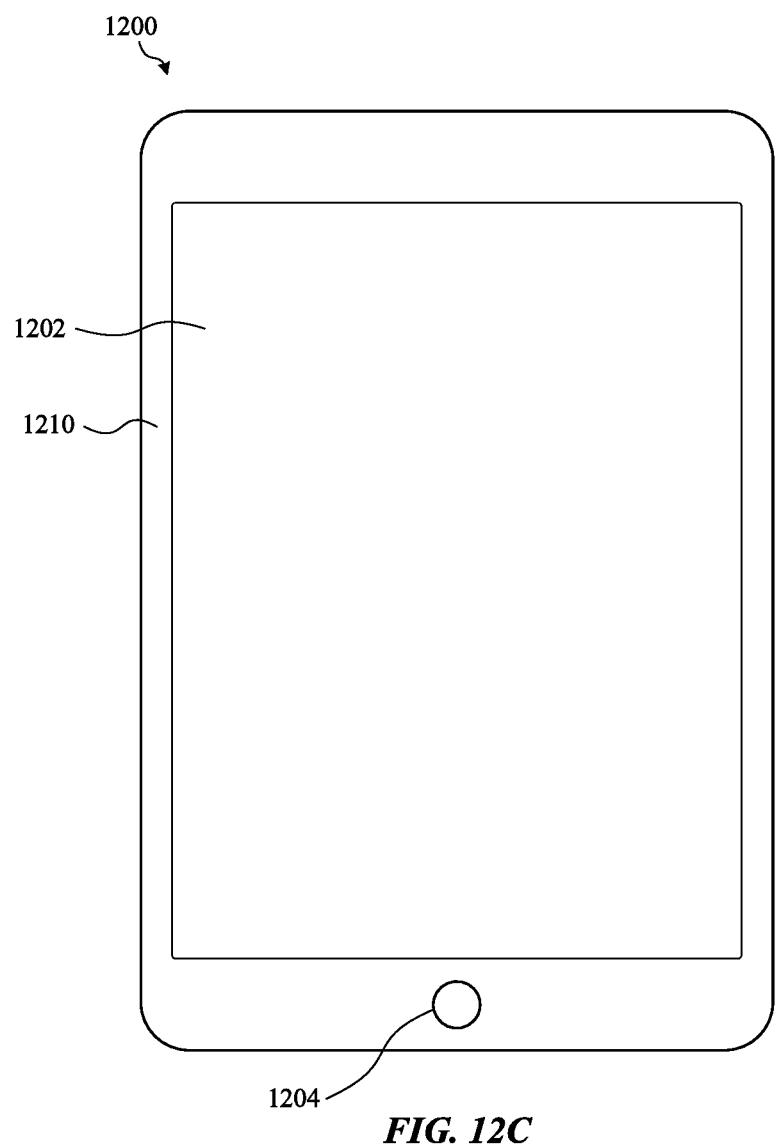
FIG. 12C illustrates another example electronic device for providing haptic output accord to one or more embodiments of the present disclosure.

FIGS. 12A-12C illustrate example electronic devices 1200 that may be used to provide haptic output according to the embodiments disclosed herein. More specifically, the types of atoms, sequences of atoms and/or combinations of atoms described herein may be used by the electronic device 1200 to produce haptic output and/or audio output described herein.

In some cases, the electronic device 1200 may be a wearable electronic device. In particular, the electronic device 1200 may include a device body 1210 (or a housing) that may be configured to be attached to the wrist of a user using a band 1220 or band assembly. This configuration may also be referred to herein as a wearable device, a wearable electronic device, a device and so on.

Although a wearable electronic device is specifically mentioned and shown with respect to FIG. 12A, the embodiments disclosed herein may be used with any number of electronic devices. For example, the electronic device 1200 may be a mobile phone (such as shown in FIG. 12B), a tablet computer (such as shown in FIG. 12C), a laptop computer or other portable electronic device, a time keeping device, a pair of computerized glasses, a navigation device, a sports device, a portable music player, a health device, a medical device and the like. As such, similar reference number may be used in each of FIGS. 12A-12C.

The electronic device 1200 may be configured to receive or identify various alert events or notifications. As discussed above, these alert events or notifications may include, but are not limited to: 1) incoming and/or outgoing text based communications; 2) incoming and/or outgoing voice, image and/or video communications; 3) calendaring and/or appointment notifications; 4) device alert notifications; 5) location and/or directional based notifications; 6) application based notifications; 7) time based notifications; and 8) health related notifications.

When alert events or notifications are received or identified, the electronic device 1200 may be configured to provide haptic output that is associated with each alert event or notification. In certain embodiments, each alert event or notification has a unique haptic output that is provided by the electronic device 1200 when the event notification is received, identified, and/or occurs. Thus, when one alert event or notification occurs, the electronic device 1200 provides a haptic output associated that particular alert event or notification. Likewise, when a second alert event or notification is received, identified, or occurs, the electronic device 1200 provides a second, different, haptic output. Thus, the user or wearer of the electronic device may be able to distinguish one alert event or notification from other alert events or notifications.

In certain embodiments, the haptic output provided by the electronic device 1200 may be made up of atoms that are stitched together in sequence or otherwise combined to create different patterns or combinations of haptic output. For example, a first sequence of atoms may consist of a first type of haptic output provided at a first time, followed by a second type of haptic output at a second time, followed by a third type of haptic output at a third time. In another example, the electronic device 1200 may provide a second set of atoms that are stitched together in sequence to provide a second type of haptic output. In this example, the second type of haptic output may consist of a first type of haptic output followed by three iterations of a second type of haptic output.

In each of the examples above, a time delay may be interspersed between each atom. The time delay may be based on the atom itself or may be a "silence" type atom in which no haptic output and/or audio output is provided by the electronic device 1200.

Once the atoms are stitched together such as described, each atom, or parts of each atom, in the sequence of atoms may need to be adjusted or modulated based on, for example, calibration data associated with each actuator. In some embodiments, the sequence of atoms may be modulated to fit within power constraints of the electronic device 1200. As discussed above, the atoms may be calibrated or modulated to account for the ambient temperature surrounding the electronic device 1200, the operating temperature of the electronic device 1200 itself, user preferences and so on.

More specifically, once the atoms are stitched together, various calibration gains may be applied to the sequence of atoms. In some embodiments, the calibration gains may be used to increase or decrease the amplitude of one or more of the atoms (or parts of the atoms) in the sequence. Once the calibration gains have been applied, one or more envelopes (e.g., the envelopes described above with respect to FIGS. 10A-10C) may be applied to the sequence of atoms. The sequence of atoms may also be modulated based on operating temperature or ambient temperature associated with the electronic device 1200 as well as on user output preferences.

Referring back to FIGS. 12A-12C, the electronic device 1200 may include a display 1202 that is integrated with the case of the device body (or housing) 1210. The display 1202 may be formed from a liquid crystal display (LCD), organic light emitting diode (OLED) display, organic electroluminescence (OEL) display, or other type of display. The display 1202 may be used to present visual information to a user and may be operated in accordance with one or more display modes or the software applications being executed by or on the electronic device 1200.

By way of example, the display 1202 may be configured to present the current time and date similar to a traditional watch or timepiece. The display 1202 may also present a variety of other visual information. This visual information may correspond to applications that are being executed by the electronic device 1200. In other embodiments, the visual information may be produced or generated using one of the other modules in the electronic device 1200.

For example, the display 1202 may be configured to display a notification message. This notification message may be produced using a wireless communications subsystem, a sensor module, or other subsystem of the electronic device 1200. The display 1202 may also be configured to present visual information or data that is based on the output of one or more sensor outputs. The display 1202 may also provide status or information related to a wireless charging process or battery power or may present visual output or information related to one or more applications being executed by the electronic device 1200. The display 1202 may further be used to display information about media content being produced using a speaker or acoustic module of the electronic device 1200. Accordingly, a variety of other types of visual output or information may be presented using the display 1202.

In some instances, a touch sensor (not shown) may be integrated with the display 1202 or other element of the electronic device 1200. The touch sensor may be formed from one or more capacitive sensor electrodes or nodes that are configured to detect the presence and/or location of an object or the user's finger that is touching the surface of the display 1202. The touch sensor may include an array of sensing nodes formed in accordance with a mutual capacitance sensing scheme. Alternatively or additionally, the touch sensor may include one or more self-capacitive nodes or electrodes that are configured to detect a change in capacitive coupling when an object, such as a user's finger, contacts or nearly contacts a surface of the device body 1210 or other surface of the electronic device 1200. Other types of electronically sensing elements or nodes, including resistive, optical, inductive, or the like, may also be integrated into a surface of the electronic device 1200.

Although not shown, the electronic device 1200 may also include a force sensor. The force sensor may be integrated with the display 1202 or other element of the electronic device 1200. When present, the force sensor may include one or more force sensing structures or force-sensing nodes for detecting and measuring the magnitude of a pressure of a touch on a surface of the electronic device 1200. In some embodiments, the force sensor may be formed from or implement one or more types of sensor configurations. For example, capacitive and/or strain based sensor configurations may be used alone or in combination to detect and measure the magnitude of a touch. More specifically, a capacitive force sensor may be configured to detect the magnitude of a touch based on the displacement of a surface or element on the device. Additionally or alternatively, a strain-based force sensor may be configured to detect the magnitude of a touch based on a deflection of the display 1202 or another part of the electronic device 1200.

As also shown in FIG. 12A, the electronic device 1200 also includes one or more buttons 1204 and a crown 1206 that may be used to receive user input. In some embodiments, the haptic output discussed herein may be in response to actuation of the one or more buttons 1204 and/or the crown 1206. For example, as the crown 1206 rotates, haptic output may be provided to simulate a winding or turning sensation. Likewise, if the button 1204 is actuated, haptic output may be provided to inform the user that the actuation of the button 1204 was received. Although not shown, the device body 1210 may also integrate other types of user input devices or modules, including for example, dials, slides, roller balls or similar input devices or mechanisms.

The electronic device 1200 may also include one or more openings or orifices coupled to an acoustic module (not shown) which may include a speaker and/or a microphone subassembly. The speaker may be configured to output audio alerts along with the haptic output provided by one or more haptic actuators.

The electronic device 1200 may also include a band 1220. The band 1220 may include a first band strap having one end removably attached to the device body 1210 and the other end configured to be removably attached to the second band strap using, for example, a band clasp or other such attachment mechanism. Likewise, the band 1220 may include a second band strap in which one end of the second band strap is attached to the device body 1210 and the other end being attached to the first band strap. In some embodiments, the band 1220 may be formed from a variety of materials, including, for example, leather, woven textiles, or metallic mesh materials.

In other embodiments, the electronic device 1200 may include a clip, a lanyard or necklace. In still further examples, the electronic device 1200 may be secured to or within another part of a user's body. In these and other embodiments, the strap, band, lanyard, or other securing mechanism may include one or more electronic components or sensors in wireless or wired communication with an accessory. For example, the band 1220 that is secured to the electronic device 1200 may include one or more sensors, an auxiliary battery, a camera, or any other suitable electronic component.

Further, the electronic device 1200 may include other components not shown or described above. For example, the electronic device 1200 may include a keyboard or other input mechanism. Additionally, the electronic device 1200 may include one or more components that enable the electronic device 1200 to connect to the internet and/or access one or more remote databases or storage devices. The electronic device 1200 may also enable communication over wireless media such as acoustic, radio frequency (RF), near field communication, infrared, and other wireless media mediums. Such communication channels may enable the electronic device 1200 to remotely connect and communicate with one or more additional devices such as, for example, a laptop computer, tablet computer, mobile telephone, personal digital assistant, portable music player, speakers and/or headphones and the like.

FIG. 13 depicts various components and modules that may be present in an example electronic device 1300, such as, for example, electronic device 1200 of FIGS. 12A-12C. As shown in FIG. 13, the electronic device 1300 includes at least one processor 1330 or processing unit configured to access a memory 1331. In certain embodiments, the memory 1331 may have various instructions, computer programs or other data stored thereon. The instructions or computer programs may be configured to perform one or more of the operations or functions described with respect to the electronic device 1300. For example, the instructions may be configured to control or coordinate the operation of the display 1302, one or more input/output components 1332, one or more communication channels 1333, one or more sensors 1334, a speaker 1335, and/or one or more haptic actuators 1337.

The processor 1330 may be implemented as any electronic device capable of processing, receiving, or transmitting data or instructions. For example, the processor 1330 can be a microprocessor, a central processing unit (CPU), an application-specific integrated circuit (ASIC), a digital signal processor (DSP), or combinations of such devices.

The electronic device 1300 may also include a synthesizer engine 1336. In some embodiments, the synthesizer engine 1336 can be part of the processor 1330. In another embodiment, the synthesizer engine 1336 may be a separate module or part of the haptic actuator 1337. The synthesizer engine 1336 is configured to generate and/or provide instructions or voltage waveforms for recreating a haptic atom or sequence of atoms, along with any effectors, to a haptic actuator 1337 of the electronic device 1300. For example, depending on the type of alert event or notification that is received or identified, the synthesizer engine 1336 may provide or generate corresponding input waveforms to the haptic actuator 1337. This information may be generated and provided to the haptic actuator 1337 in real time. The information provided to the haptic actuator 1337 may also include the time (e.g., Tspecified) that each waveform is to be output such as described above. In some embodiments, each of the time periods specified above, such as, for example, Tspecified, may be encoded within the input waveform. The synthesizer engine 1336 may also provide instructions to other modules which cause additional output to be provided.

For example, the synthesizer engine 1336 may instruct, or otherwise cause a speaker 1335 to provide audio output with a given haptic output.

The memory 1331 can store electronic data that can be used by the electronic device 1300. For example, the memory 1331 can store electrical data or content such as, for example, audio and video files, documents and applications, device settings and user preferences, timing and control signals or data for the various modules, data structures or databases, and so on. The memory 1331 may also store instructions for recreating the various types of haptic atoms that may be used to form the haptic language disclosed herein. The memory 1331 may be any type of memory such as, for example, random access memory, read-only memory, Flash memory, removable memory, or other types of storage elements, or combinations of such devices.

As briefly discussed above, the electronic device 1300 may include various input and output components represented in FIG. 13 as I/O components 1332. Although the I/O components 1332 are represented as a single item, the electronic device 1300 may include a number of different input components, including buttons, microphones, switches, and dials for accepting user input. More specifically, the I/O components 1332 may correspond to the button 1204 and crown 1206 depicted in FIG. 12A. In some embodiments, the I/O components 1332 may include one or more touch sensor and/or force sensors. For example, the display 1302 may include one or more touch sensors and/or one or more force sensors that enable a user to provide input to the electronic device 1300.

Each of the I/O components 1332 may include specialized circuitry for generating signals or data. In some cases, the I/O components 1332 may produce or provide feedback for application-specific input that corresponds to a prompt or user interface object presented on display 1302. For example, the crown 1206 may be used to receive rotational input from a user which may be translated into an instruction to scroll or scale a list or object presented on the display 1302.

The electronic device 1300 may also include one or more communication channels 1333. These communication channels 1333 may include one or more wireless interfaces that provide communications between the processor 1330 and an external device or other electronic device. In general, the one or more communication channels 1333 may be configured to transmit and receive data and/or signals that may be interpreted by instructions executed on the processor 1330. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, the one or more communication channels 1333 may include a wireless communication channel between the electronic device 1300 and another device, such as a mobile phone, tablet, computer, or the like. In some cases, output, audio output, haptic output or visual display elements may be transmitted directly to the other device for output. For example, an audible alert or visual warning may be transmitted from the electronic device 1300 to a mobile phone for output on that device and vice versa. Similarly, the one or more communication channels 1333 may be configured to receive input provided on another device to control the electronic device 1300. For example, an audible alert, visual notification, or haptic alert (or instructions therefor) may be transmitted from the external device to electronic device 1300 for presentation.

The electronic device 1300 may also include one or more sensors 1334. Although a single representation of a sensor 1334 is shown in FIG. 13, the electronic device 1300 may have many sensors. These sensors may include biometric sensors, temperature sensors, accelerometers, barometric sensors, moisture sensors and so on.

One or more one or more acoustic modules or speakers 1335 may also be included in the electronic device 1300. The speaker 1335 may be configured to produce an audible sound or an acoustic signal. For example, the speaker 1335 may comprise a high-fidelity class D audio driver. The speaker 1335 may be used to provide an audible sound that is associated with a particular type of haptic output. In such embodiments, the audible sound may vary based on the type of haptic output provided. In addition, the audible sound may be output with a slight delay with respect to the haptic output. However, the user's perception of the haptic output and the audio output may be such that the outputs are perceived simultaneously or substantially simultaneously. Alternatively or additionally, the speaker 1335 may be configured to operate as a microphone that receives an audible sound or acoustic signal.

As also shown in FIG. 13, the electronic device 1300 may include one or more haptic actuators 1337. The haptic actuators 1337 may be any type of haptic actuator including rotational haptic devices, linear haptic actuators, piezoelectric devices, vibration elements, and so on. The haptic actuator 1337 is configured to receive instructions for recreating various haptic atoms from the synthesizer engine 1336 and provide punctuated and distinct feedback to a user of the device such as described above.

For example, the haptic actuator 1337 may provide haptic output to notify a user of the electronic device 1300 of a particular condition of the electronic device 1300. The haptic output may also be used to notify the user of an incoming text message, phone call, email message or other such communication. The haptic output may also notify a user of upcoming appointments and other notifications from various applications on each of the devices.

In some cases, the haptic actuator 1337 may be operatively coupled to another module, such as the crown, buttons, force sensor, or touch sensor. Thus, as one of these modules is actuated, the haptic actuator 1337 may provide an associated output responsive thereto. For example, the haptic actuator may provide feedback in response to the operation of the crown 1306. The haptic actuator 1337 may also be used to provide an alert or signal in response to an event or action on the electronic device 1300. For example, the haptic actuator 1337 may output a tap in response to receipt of a message.

Accordingly, alerts may be generated: upon receipt of data by the device from an external source (text messages, emails, phone calls, warning systems, and the like); by an application (for example, to indicate that a user input is requested); upon reaching a certain time (for example, a time at which a calendar entry occurs); by an operational state of the electronic device (for example, a low battery charge, an upgrade to the operating system of the device, the device temperature reaching a certain point, and so on); through a user-initiated settings (an alarm set to occur at a certain time); due to geographic factors (entering or exiting a certain area); proximity (as another person with another electronic device is nearby); and so on. These and other alert conditions will be appreciated upon reading this document in its entirety.

In certain embodiments, the electronic device 1300 may include an internal battery 1338. The battery 1338 may be used to store and provide power to the various components and modules of the electronic device 1300 including the haptic actuator 1337. The battery 1338 may be configured to be charged using a wireless charging system although a wired charging system may also be used.

FIG. 14 illustrates an example haptic actuator 1400 according to one or more embodiments of the present disclosure. More specifically, the haptic actuator 1400 shown and described with respect to FIG. 14 is a linear resonant type actuator that oscillates a spring-mass-damper at its resonance frequency. Although a linear resonant type actuator is shown and described, embodiments described herein may also be used with an eccentric rotating mass actuator that creates similar haptic output by spinning an off-center mass. In such embodiments, one full cycle of revolution of the rotating mass is equivalent to one period of the linear actuator. In yet other embodiments, the actuator may be piezoelectric actuators, shape memory alloys, electroactive polymers, thermal actuators and so on.

In some embodiments, the haptic actuator may be configured to start and stop a weight or actuator mass of the haptic actuator in a relatively short amount of time. For example, each of the tap atom, the mini-tap atom and the micro-tap atom may start and stop (that is, movement of the actuator mass may start and stop) between approximately six milliseconds and approximately forty milliseconds. In some instances, the tap atom may be configured to start and stop in approximately thirty-five milliseconds, the mini-tap atom may start and stop in approximately twenty milliseconds, and the micro-tap atom may start and stop in approximately fifteen milliseconds. Due to the quick start up time and end time of each of these atoms, a leading buzz and/or a trailing buzz (e.g., noise and/or vibrations caused by the haptic actuator starting and ending movement) may be greatly reduced or eliminated.

In certain embodiments, different sizes of haptic actuators may be used. For example, in some embodiments the haptic actuator weighs between approximately forty grams and sixty grams. In some specific examples the haptic actuator weigh approximately fifty grams although other weights may be used. The fifty gram weight may include the housing, cover and all mounting hardware associated with the haptic actuator. In some embodiments, the actuator mass may weigh between approximately two grams and approximately three grams. In some specific example, the actuator mass may weigh approximately two and a half grams. In other embodiments a lighter or heavier haptic actuator and actuator mass may be used. In certain embodiments, the size and dimensions of the haptic actuator and the actuator mass may also vary.

As discussed previously, the example haptic waveforms (whether atoms or combinations thereof) may be defined or described in terms of input to the haptic actuator, output from the haptic actuator and/or output from the electronic device. For example, and as will be described below, various voltages, magnetic fluxes or currents may be applied to the haptic actuator at specified time intervals defined by the input waveform. Such electrical characteristics may be induced or applied, for example, by operation of an electromagnetic coil and the resultant flux interacting with a magnet in the actuator mass or with the actuator mass itself. The voltages/currents that are applied to the coil cause a series of Lorentz force to be exerted on moveable magnetic structures within, or associated with, the actuator mass of the haptic actuator. These forces push and pull the actuator mass at strategic intervals to increase the speed and displacement of the actuator mass in a short amount of time. Although specific structures are mentioned, the haptic actuator of the present disclosure may have other structures associated therewith.

Regardless of the type of actuator used, the haptic actuator 1400 may be configured to produce a mechanical movement or vibration that may be transmitted through a case or housing of an electronic device, such as, for example, electronic device 1200 (FIGS. 12A-12C). More specifically, the haptic actuator 1400 may be configured to receive various atoms, that when played by the haptic actuator 1400, produce a haptic output that may be transmitted to a user and perceived as a stimulus or other type of haptic output. As described herein, the atoms, and their associated haptic output, may be referred to herein as a tap, a micro-tap and a mini-tap. Additional atoms that described above may also be used with embodiments of the present disclosure and include a sine, a sine with a boost, a sine with a brake, and a sine with a boost and a brake.

Each of the input waveforms, and their respective output waveforms, are configured to start and complete within a set amount of time in order to produce a desired feel. For example, an input waveform for the tap may start and complete within between approximately six milliseconds and approximately forty milliseconds. In some embodiments, the time frame may be as little as approximately thirty-five milliseconds. This time frame provides a sharp single haptic tap, much like a tap for gaining a person's attention, rather than a buzz that is typically provided in conventional haptic actuators. For example, the input and output waveform associated with the tap may be one-tenth the duration of the buzz that is output by a conventional haptic actuator. Further, the haptic actuator 1400 may cause an electronic device to move in accordance with a device waveform such as described above.

In addition to the types of haptic output discussed above, the haptic actuator 1400 may be configured to receive and play combinations of atoms that represent a haptic language and/or repeat various combinations of atoms. The atoms may be stored in a library such as described above. Further, the various combinations of atoms may also be stored in library. In certain embodiments, the haptic language may not only be comprised of basic building blocks of atoms, the atoms may be combined and arranged in a particular sequence. As each atom may represent a number, a letter, or a word of the haptic language, a sequence of atoms may be used to represent additional numbers, letters, words or even sentences in the haptic language.

For example, each of the tap, mini-tap and micro-tap atoms may represent a base building block or a base pattern of the haptic language. As such, each of the tap, mini-tap and micro-tap atoms may be sequentially arranged or otherwise combined to create different patterns with each pattern representing a particular word, sentence and so on. Further, each number, word, or sentence may be associated with a particular event notification such as described above.

In addition to the above, the haptic actuator 1400 may also be configured to play a "silence" waveform. The silence waveform may have a duration of up to one second although other time periods are contemplated. Further, the silence waveform (as with other input and output waveforms) may be played back-to-back. Thus, if longer silence durations are needed multiple silence waveforms may be played in sequence. In certain embodiments, the silence waveform may be used to ensure that the oscillations of the actuator mass of the haptic actuator 1400 have stopped or substantially stopped, prior to outputting another type or iteration of a specific haptic output.

As the haptic actuator 1400 is configured to output a haptic language, a user of the electronic device may be able to discern between various alert events or notifications that are received based solely on the haptic output provided by the haptic language. Although the haptic language may enable a user to determine the event notifications based on the haptic language, additional notifications (e.g., text notifications, visual notifications and so one) may also be provided by the electronic device.

The haptic actuator 1400 may be configured to receive a customized haptic language that is specific to or tailored by a developer or a user of the electronic device. In addition, an audio and/or acoustic output may also be provided as part of, or in addition to, the haptic language. Addition of the audio output may further enhance the haptic language and/or enable further customization of the haptic language.

Referring back to FIG. 14, the haptic actuator 1400 may be specifically configured to provide haptic output on a wrist of a user. Although a wrist is specifically mentioned, the embodiments described herein are not so limited. The haptic actuator may provide haptic output in various orientations, locations (including locations on a user's body depending on where the electronic device is located) and so on. The haptic output provided by the haptic actuator 1400 when the haptic actuator 1400 plays the various atoms described herein, may be up to five times more powerful than a conventional vibration motor that provides a series of haptic output in the form of clicks as is usually provided by conventional vibration motors.

As shown in FIG. 14, the haptic actuator 1400 may have a body encompassed by a case 1405. In certain embodiments, the haptic actuator 1400 may have a volume of approximately 568 mm$^3$. Although a specific volume is mentioned, the haptic actuator may have various sizes and volumes. In certain embodiments, the case 1405 may extend to form a bracket (not shown) that connects to a housing of the wearable electronic device 1200. As will be explained below, motion of an actuator mass 1410 within the case 1405 may be transferred to the case 1405 and through the bracket to the housing of the wearable electronic device 1200. In this manner, the motion of the actuator mass 1410 may create the perceived stimulus.

In certain embodiments, the motion may be selective or otherwise concentrated in that it affects only a portion of the housing of the wearable electronic device 1200. In another embodiment, the motion may broadly affect the housing of the wearable electronic device 1200 as a whole. In either event, the haptic actuator 1400 may produce a tactile output that may be used as an alert or notification such as described herein.

Although the haptic actuator 1400 of the present disclosure may be enclosed within a case 1405, various sidewalls of the case 1405 have been removed in FIG. 14 to show the internal components of the example haptic actuator 1400. For example, and as shown in FIG. 14, the haptic actuator includes an actuator mass 1410 comprising a frame, a central magnet array 1420 and a coil 1430 disposed around the central magnet array 1420.

The coil 1430 of the haptic actuator 1400 may be energized by transmitting a current (e.g., from the battery) along a length of a wire that forms the coil 1430. A direction of the current along the wire of the coil 1430 determines a direction of an electromotive force that emanates from the coil 1430. In turn, the direction of the electromotive force determines a direction of movement of the actuator mass 1410.

For example, when the coil 1430 is energized, the coil 1430 generates an electromotive force. The opposing polarities of the magnets in the magnet array generate a radial electromotive force that interacts with the electromotive force of the coil 1430. The Lorentz force resulting from the interaction of the electromotive forces causes the actuator mass 1410 to move along the shaft 1440 in a first direction. Reversing current flow through the coil 1430 reverses the Lorentz force. As a result, the electromotive force or force on the central magnet array 1420 is also reversed and the actuator mass 1410 may move in a second direction. Thus, actuator mass 1410 may move in both directions along the shaft 1440, depending on the direction of current flow through the coil.

Continuing with the example above, when the coil 1430 is energized, the central magnet array 1420 (and the actuator mass 1410) moves along a shaft 1440 of the haptic actuator 1400 depending on the polarity of the electromotive force. For example, if a direction of the current along the wire of the coil 1430 is in a first direction, the actuator mass 1410 will move in a first direction (e.g., toward a proximal end of the haptic actuator 1400). Likewise, if the direction of the current along the wire of the coil 1430 is in a second direction (e.g., opposite the first direction) the actuator mass 1410 will move in a second direction that is opposite from the first direction (e.g., toward a distal end of the haptic actuator 1400).

Further, if the current through the coil 1430 is sufficiently high, the actuator mass 1410 will move rapidly and reach a peak velocity and momentum and a peak displacement in a short amount of time. In some embodiments, the peak momentum is approximately 2000 gram-millimeters per second although other momentums (and velocities) may be reached and/or used. For example, when an amount of current, represented by an input waveform or an atom, is applied to the haptic actuator, haptic output may be felt between approximately three milliseconds and approximately twenty milliseconds.

In certain embodiments, the peak velocity or momentum for the tap atom may be defined as the largest velocity or momentum that can be achieved without any internal impact of the actuator mass with one or more sidewalls of the haptic actuator 1400 and while maintaining the specified power consumption requirements (e.g., one watt of power consumed in a given time period). Further, the peak velocity of the actuator mass may be calculated by a numerical integration of a measured force output (e.g., Newtons), divided by 0.05 kg and multiplied by 1000 for an output in mm/s.

Although peak velocity and moment is defined by the above, the peak velocity/momentum used herein may also be described as the highest velocity/momentum that is reached in order to provide haptic output associated with a tap, a mini-tap and a micro-tap and or the sine, sine with a boost, sine with a brake and sine with a boost and a brake such as set forth above. In addition, any of the parameters discussed herein (e.g., momentum, velocity, intensity and so on) may also be defined for various custom waveforms and other such sequences of atoms.

In some embodiments, the movement of the actuator mass or the haptic actuator may be expressed as momentum. More specifically, some embodiments of the present disclosure may have a minimum momentum of 1500 grams per millimeter per second. In some embodiments, a fifty gram haptic actuator may have a velocity of approximately forty millimeters per second and accordingly have a momentum of approximately 2000 grams per meter per second. Likewise, a two and a half gram actuator mass may have a velocity of approximately eight hundred millimeters per second and also have a momentum of approximately 2000 grams per millimeter per second.

In some embodiments, after a target velocity, momentum, or target displacement of the actuator mass 1410 has been reached, a directional current opposite the initial directional current is applied to the coil 1430. That is, if the direction of the applied current is in a first direction to accelerate the actuator mass 1410, the second current applied to the coil 1430 may be in the opposite direction. The second current causes the generated electromotive force to exert a force in a direction opposite the initial motion of the actuator mass 1410. As a result, the electromotive force slows down or acts as a brake to the actuator mass 1410. As a result of the brake, the actuator mass is returned to its nominal position.

Use of currents in this way may be used to control or otherwise limit oscillation of the actuator mass 1410 especially when the actuator mass is at or near resonance frequency. In other embodiments, use of the currents may be used to maintain a resonance frequency of the actuator mass 1410.

In addition to the above, alternating the direction of the current, and thereby alternating the electromotive force that is applied to the actuator mass 1410, enables the coil 1430 to both "pull" and "push" the actuator mass 1410. As a result, motive force may be applied in two opposing directions through selective application of the electromotive force of the coil 1430. This may permit fine control over motion and/or velocity/momentum of the actuator mass 1410 in multiple directions.

For example, a first current value may be applied to the coil 1430 which causes a first electromotive force (e.g., a "push") to be exerted on the actuator mass 1410. As a result, the actuator mass 1410 moves from its nominal position, such as, for example, a position in which the actuator mass 1410 is at or near a center of the case 1405, to a second position in which the actuator mass 1410 has moved toward a distal end of the case 1405. Once the actuator mass 1410 has reached the second position, or after a specified amount of time has elapsed, a second voltage or current may be applied to the coil 1430 which causes a second electromotive force (e.g., a "pull") to be exerted on the actuator mass 1410. In some embodiments, the second electromotive force has a polarity that is opposite from the first electromotive force thereby causing the "pull" on the actuator mass 1410. As a result, the actuator mass 1410 begins to travel in a second direction that is opposite from the first direction, such as, for example, toward the proximal end of the case 1405.

However, because the actuator mass 1410 has a longer distance to travel due to the travel associated with the first displacement, the velocity and momentum of the actuator mass 1410 may increase. This pushing and pulling action may continue until a desired or peak displacement and/or a desired or peak velocity and/or momentum of the actuator mass 1410 is reached. For example, a third electromotive force may be exerted on the actuator mass 1410 once the desired displacement in the second direction has been met. The third electromotive force may be similar to the first electromotive force (e.g., a push) and may cause the actuator mass 1410 to reach a peak velocity, momentum and/or displacement.

Once the desired displacement and/or desired velocity and/or momentum has been reached, a directional current (e.g., a current that exerts an electromotive opposite the displacement of the haptic actuator) may be applied to slow the actuator mass 1410. For example, if the actuator mass is traveling in a direction caused by a "pull," a voltage or electrical input that causes a "push" is applied to the coil 1430. The "push" effectively acts as a brake to slow the velocity, momentum and/or displacement of the actuator mass 1410. In some embodiments, just as multiple pushes and pulls may be used to increase the velocity, momentum or displacement of the actuator mass 1410, multiple pushes and pulls may be used to slow the velocity or reduce the displacement or momentum of the actuator mass 1410.

In certain embodiments, the shaft 1440, the central magnet array 1420 and the frame of the haptic actuator may be made from non-ferritic material such as, for example, tungsten, titanium, stainless steel and the like. Using these materials helps prevent the central magnet array 1420 from being attracted to the shaft 1440 which could increase friction between magnet array 1420 and the shaft 1440 thereby increasing the force necessary to move the actuator mass 1410.

As shown in FIG. 14, the haptic actuator 1400 may also include one or more springs 1460. The one or more springs 1460 may encircle each end of the shaft 1440. The springs 1460 may act to dampen motion of the actuator mass 1410 along the shaft 1440. Additionally, the one or more springs 1460 may prevent the actuator mass from hitting or crashing into one or more sidewalls of the case 1405. The springs 1460 may also help return the actuator mass its nominal position in which the actuator mass 1410 is still (e.g., not moving) or substantially still, or to a state in which the actuator mass 1410 is at or near the center of the case 1405. In yet other embodiments, the one or more springs may cooperate with the electromotive force of the coil 1430 to help return the actuator mass 1410 to its resting (or nominal) position.

In other embodiments, the one or more springs 1460 may be used to store energy that may be later used to provide haptic output. For example, since it may be desirable to deliver a sudden impulse of kinetic energy to a wearer or user of the electronic device 1200 while still staying within a fixed power budget (e.g., using between approximately 0.5 and 1.0 watt of power) additional energy may be stored in the one or more springs 1460. In such embodiments, the actuator mass 1410 may be slowly displaced, using for example, a small amount of current, toward either a proximal end or a distal end of the haptic actuator 1400.

As the actuator mass 1410 moves, one of the one or more springs 1460 may compress. Once the actuator mass 1410 has been displaced a threshold distance, or has been held or otherwise moved for a threshold amount of time, the actuator mass 1410 may be released or another current (e.g., a current having a direction opposite the current that was applied to the haptic actuator to cause the actuator mass 1410 to be displaced toward the spring 1460) is applied to the haptic actuator 1400.

Once released, the compressed spring causes the actuator mass 1410 to accelerate (or otherwise gain momentum) and be displaced more quickly than if the actuator mass would have started in its nominal position. It should be noted, that while the actuator mass 1410 is being initially displaced, the displacement of the actuator mass 1410 may not cause any perceived haptic output. Further, the velocity and/or momentum of the actuator mass 1410 may remain at nearly zero until the second current is applied.

The haptic actuator 1400 may also include a flex 1450. The flex 1450 may extend through the case 1405 to provide electrical connections for components within the case1405. Some embodiments may omit the flex 1450 and may instead provide electrical contacts on the exterior of the case 1405, or may use a rigid connector in place of the flex 1450.

Figure 15:
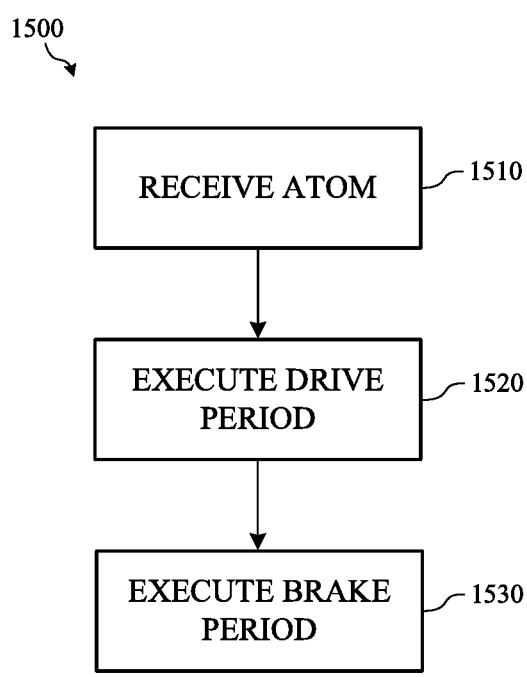
FIG. 15 illustrates a method for providing haptic output according to one or more embodiments of the present disclosure.

FIG. 15 illustrates a method 1500 for providing haptic output according to one or more embodiments of the present disclosure. The method 1500 may be used by an electronic device, such as, for example, electronic device 1200 shown and described with respect to FIGS. 12A-12C. More specifically, the method 1500 may be performed by a haptic actuator, such as, for example, haptic actuator 1400 shown and described with respect to FIG. 14.

Method 1500 begins when instructions for an atom or sequence of atoms is received 1510. In certain embodiments, the atom that is received may be a tap atom, a mini-tap atom, a micro-tap atom, a sine atom, a sine with a boost atom, a sine with a brake atom, a sine with a boost and a brake atom, a silence atom, a custom atom, or any combination thereof.

Each atom, combination of atoms and/or sequence of atoms may be associated with a particular alert event or other such notification. Accordingly, process 1510 may be based, at least in part, on what type of alert event was received by (e.g., from another device) and/or transmitted by the electronic device. For example, if a phone call was received, a first sequence of atoms may be selected and/or generated and subsequently provided to a haptic actuator. If an electronic message was received, a second sequence of atoms may be selected and/or generated and subsequently provided to the haptic actuator.

In some embodiments, multiple sequences of atoms that make up different entries in the haptic language may also be output in sequence. For example, if a first alert event and second alert event were received simultaneously or substantially simultaneously, a first sequence of atoms may be received and a second sequence of atoms may be sequenced with the first sequence of atoms.

Once the atom or pattern of atoms is received, flow proceeds to operation 1520 and the drive period of a first atom is played. In some embodiments, the drive period is provided by a synthesizer engine to a haptic actuator and is used to excite the actuator mass of the haptic actuator such as described above. More specifically, the drive period of the atom may cause various voltage values to be applied to the haptic actuator which causes an electromotive force to move an actuator mass in first direction and/or a second direction.

As discussed above, the different voltage values may be applied at various times in the drive period. Further, the voltage values may cause a displacement of the actuator mass to increase or decrease, a velocity or momentum of the actuator mass to increase or decrease, and so on. As also discussed above, the drive period may cause various forces to be applied to the actuator mass such that the haptic actuator may provide haptic output.

Flow then proceeds to operation 1530 in which the brake period of the first atom is executed. In certain embodiments, the brake period is used to quickly slow movement of the actuator mass of the haptic actuator. The brake period may be designed to cause different voltage values to be applied to the haptic actuator at various time periods such that electromotive forces may be exerted on the actuator mass to slow velocity, momentum, and/or displacement of the actuator mass until the actuator mass has stopped moving, or substantially stopped moving. Once the actuator mass has stopped moving, the actuator mass may be in its nominal position.

In some embodiments, if additional atoms are provided or otherwise presented to a haptic actuator, the haptic actuator will continue to oscillate and/or provide haptic output in accordance with the instructions represented by the additional atoms. Thus various atoms may be sequenced together or otherwise combined such as described above.

Figure 16:
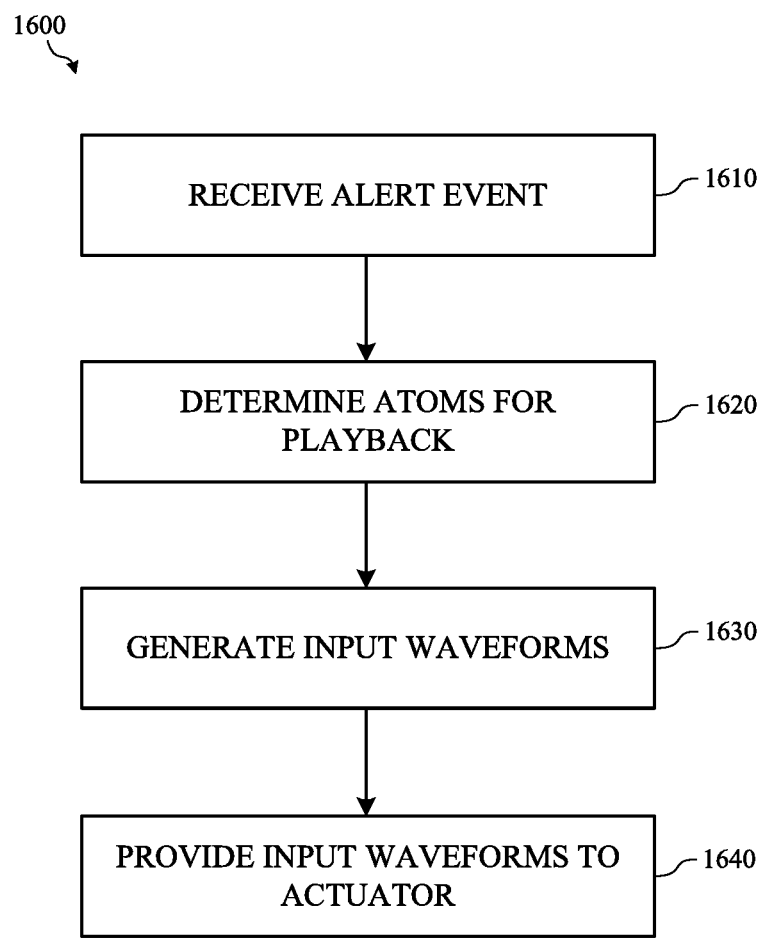
FIG. 16 illustrates a method for using atoms to provide haptic output according to one or more embodiments of the present disclosure.

FIG. 16 illustrates a method 1600 for playing back one or more atoms or a sequence of atoms and associated effectors according to one or more embodiments of the present disclosure. The method 1600 may be performed by any of the example electronic devices shown and described with respect to FIGS. 12A-13. More specifically, a synthesizer engine or processing unit of an electronic device may be configured to execute the method described below. Additionally, the synthesizer engine or processor may be used to provide various input waveforms to a haptic actuator, such as, for example, haptic actuator 1400 (FIG. 14).

Method 1600 begins when an alert event is received 1610, identified, or triggered by an electronic device. In some embodiments, the alert event may include: 1) incoming and/or outgoing text based communications such as, for example, an email, a text message and so on; 2) incoming and/or outgoing voice, image and/or video communications; 3) calendaring and/or appointment notifications; 4) device alert notifications such as, for example, a low battery notification, device or application update notifications, device pairing notifications, and so on; 5) location and/or directional based notifications; 6) application based notifications such as, for example, push notifications, alerts and so on from various applications that are executing on the electronic device or on a companion device; 7) time based notifications such as alarms, time notifications, and so on; and 8) health related notifications. The various alert events may also include user interactions with the electronic device and/or the companion device. For example, if the electronic device includes an input mechanism, such as a crown or button, the alert event may be associated with an actuation of the crown or button.

Once the alert event has been received or identified, a synthesizer engine or processor of the electronic device may identify 1620 one or more atoms that are to be generated, recreated, and/or provided to a haptic actuator such that the atoms may be played back based on the type of alert event received. In some embodiments, various alert events may have one or more atoms that are associated with it. That is, a first type of alert event may be associated with a first atom or sequence of atoms and a second type of alert event may be associated with a second atom or sequence of atoms.

In addition, each alert event may be associated with a particular type of audio output and/or a particular effector. Thus, the synthesizer engine or processor may also be configured to not only determine which atoms or sequence of atoms to generate and/or provide to a haptic actuator, but may also be configured to determine whether audio is to be output as well as whether the atoms or sequence of atoms are to be bound using one or more effectors such as described above.

For example, if the alert event that is received is an email notification event, the synthesizer engine or processor may be configured to determine that a first sequence of atoms is to be provided to a haptic actuator. However, if the alert event is a telephone call, the synthesizer engine or processor may be configured to determine that a second sequence of atoms is to be provided to a haptic actuator. In addition, the processor or synthesizer engine may also determine that the first and/or the second sequence of atoms may also have audio output and may be bound by a particular effector.

In addition to determining the type of atoms that are to be provided to the haptic actuator, the processor or synthesizer engine may be configured to determine an amount of time each atom is to be played by a haptic actuator. In some embodiments, this time period corresponds to Tspecified such as described above.

In still yet other embodiments, the synthesizer engine or the processor may also be configured to receive instructions and, based on those instructions, determine a type of atom to provide to the haptic actuator. For example, when an alert event is received or identified, the processor or the synthesizer engine identifies the type of atom or atoms that are associated with the alert event, as well as the desired length of playback for each atom (e.g., Tspecified), an intensity level during playback and/or a time at which the atom is to be played. The intensity level may be a percentage of a default intensity level. The default intensity level may be based on a maximum amplitude for each atom, a default amplitude for each atom, or a default power output, such as, for example, a given percentage or a fraction of one watt. With lower intensity, less power is used to generate the haptic output; so, in one embodiment, the intensity level may represent or correspond to a power usage by the device. Accordingly, "intensity" may include or correspond to, but is not limited to, an amplitude and/or power usage. Thus, when an alert event is received or identified, the synthesizer engine may be configured to determine and/or generate input waveforms using the above parameters and provide the generated input waveforms, or associated instructions, to the haptic actuator such as described below.

Flow then proceeds to operation 1630 in which the synthesizer engine generates the input waveforms based on the atom type, desired playback length for each atom, percentage power for each atom, time at which to initiate playback of each atom, and any effectors, and provides the input waveforms to a haptic actuator of the electronic device. In some embodiments, the synthesizer engine may be configured to receive instructions from a processor or other module in the electronic device that includes the atoms and effectors that are needed based on the received or identified alert event. Thus, the synthesizer engine need not determine what atoms are to be played back as the atoms are identified by a separate component of the electronic device 1300.

Regardless, when generating the input waveforms, the synthesizer engine may be configured to generate the input waveforms that are subsequently provided to a haptic actuator. As previously discussed, the synthesizer engine may generate input waveforms for a single atom, a sequence of atoms, an effector, audio output (or instructions for audio output) and any combinations thereof. In other embodiments, the synthesizer engine may be configured to generate one or more phrases or words of the haptic language such as described above.

The synthesizer engine may also be configured to determine and/or include the time frame allotted for each input waveform as the input waveforms are generated. That is, the synthesizer engine may be configured to determine the active time period of each atom waveform (Tactive) for the actuator based on the desired time period (Tspecified). As discussed above, the Tactive consists of N number of complete cycles that the haptic actuator may output in the time frame specified by Tspecified. For example, although the value for Tspecified may be two seconds, the value for Tactive may be 1.8 seconds as the actuator is not able to play another complete cycle in 0.2 seconds (which represents the difference between Tspecified and Tactive).

Once the synthesizer engine has generated the input waveforms, flow proceeds to operation 1640 and the input waveforms are provided to a haptic actuator of the electronic device. Once received, the haptic actuator then plays the input waveforms which subsequently provides the haptic output based on the received input waveforms. The synthesizer engine or processor may also provide instructions to a speaker or other output device to output a corresponding audio output.

The various types of electronic devices disclosed herein may be configured to use one or more Application Programming Interfaces (APIs). An API is an interface implemented by a program code component or hardware component (hereinafter "API-implementation component") that allows a different program code component or a hardware component (hereinafter "API-calling component") to access and use one or more functions (e.g., a haptic alert function), methods, procedures, data structures, classes, and/or other services provided by the API-implementation component. An API can define one or more parameters that are passed between the API-calling component and the API-implementation component.

An API allows a developer of an API-calling component (which may be a third party developer) to leverage specified features provided by an API-implementation component. There may be one API-calling component or multiple API-calling components. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

For example, in some embodiments, the API may enable a developer or other user to specify which atoms in a library of atoms are to be played, sequenced or otherwise provided to a haptic actuator in response to an alert event. That is, a developer may use the API to determine, generate or create atoms, sequences of atoms, effectors and/or audio output that is to be provided when an alert event is received or triggered.

For example, in some embodiments, the synthesizer engine or the processor may also be configured to receive instructions from the API (or a function call facilitated by the API) and, based on those instructions, determine a type of atom or atoms to provide to the haptic actuator. In some embodiments, the developer may specify in a function call or otherwise create a type of atom that is to be provided to the haptic actuator and an alert event that is to be associated with the type of atom. In addition, the developer may specify the desired length of playback for each atom (e.g., Tspecified), an intensity level during playback, and/or a time at which the atom is to be played. The intensity level may be a percentage or fraction of a default intensity level. The default intensity level may be based on a maximum amplitude for each atom or a percentage or fraction of a default amplitude of the atom which also may be represented as a percentage or fraction of a default power, such as, for example a given percentage of one watt. With lower intensity, less power is used to generate the haptic output; so, in one embodiment, the intensity level may represent or correspond to a power usage by the device.

The API may also enable a developer to generate or create new audio waveforms and new words or phrases of the haptic language. For example, a developer may be able to sequence various atoms together in order to modify, change or update haptic output that is provided with a particular alert event. Thus, a developer or user may have a unique alert for each alert event based on his or her preferences. In addition to the above, the developer, through the API, may be able to specify which effectors, if any, are used to bind the signals of the atoms or sequence of atoms created by the developer.

In some embodiments, the API-implementation component may provide more than one API, each providing a different view of or with different aspects that access different aspects of the functionality implemented by the API-implementation component. For example, one API of an API-implementation component can provide a first set of functions and can be exposed to third party developers, and another API of the API-implementation component can be hidden (not exposed) and provide a subset of the first set of functions and also provide another set of functions, such as testing or debugging functions which are not in the first set of functions.

In other embodiments the API-implementation component may call one or more other components via an underlying API and thus be both an API-calling component and an API-implementation component.

An API defines the language and parameters that the API-calling components may use when accessing and using specified features of the API-implementation component. For example, an API-calling component accesses the specified features of the API-implementation component through one or more API calls or invocations (embodied for example by function or method calls) exposed by the API and passes data and control information using parameters via the API calls or invocations. The API-implementation component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementation component.

Transferring the API calls may include issuing, initiating, invoking, calling, receiving, returning, or responding to the function calls or messages; in other words, transferring can describe actions by either of the API-calling component or the API-implementation component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementation component. Thus, the API-calling component may declare variables, use pointers to, use or instantiate constant values of such types or classes by using definitions provided in the API.

Generally, an API can be used to access a service or data provided by the API-implementation component or to initiate performance of an operation or computation provided by the API-implementation component. By way of example, the API-implementation component and the API-calling component may each be any one of an operating system, a library, a device driver, an API, an application program, or other module (it should be understood that the API-implementation component and the API-calling component may be the same or different type of module from each other). API-implementation components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API.

An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementation component) or a remote component (i.e., on a different data processing system from the API-implementation component) that communicates with the API-implementation component through the API over a network. It should be understood that an API-implementation component may also act as an API-calling component (i.e., it may make API calls to an API exposed by a different API-implementation component) and an API-calling component may also act as an API-implementation component by implementing an API that is exposed to a different API-calling component.

The API may allow multiple API-calling components written in different programming languages to communicate with the API-implementation component (thus the API may include features for translating calls and returns between the API-implementation component and the API-calling component); however the API may be implemented in terms of a specific programming language. An API-calling component can, in one embodiment, call APIs from different providers such as a set of APIs from an operating system provider and another set of APIs from a plug-in provider and another set of APIs from another provider (e.g. the provider of a software library) or creator of the another set of APIs.

Figure 17:
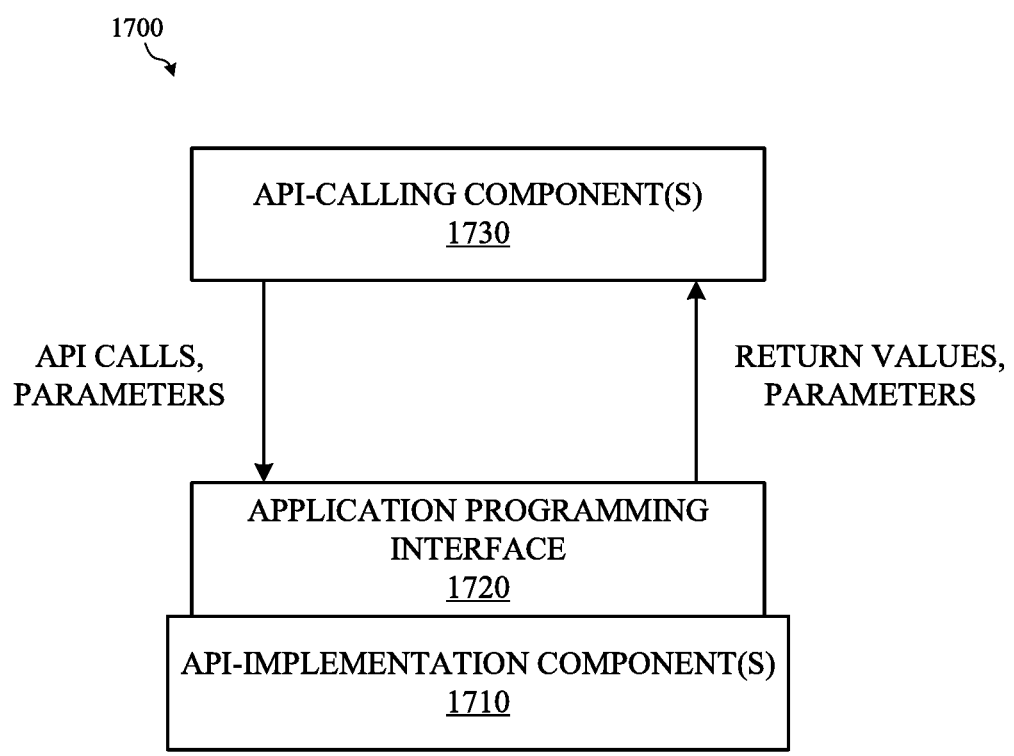
FIG. 17 illustrates a sample Application Programming Interface according to one or more embodiments of the present disclosure.

FIG. 17 is a block diagram illustrating an example API architecture, which may be used in some embodiments of the present disclosure. As shown in FIG. 17, the API architecture 1700 includes the API-implementation component 1710 (e.g., an operating system, a library, a device driver, an API, an application program, software or other module) that implements the API 1720. The API 1720 specifies one or more functions, methods, classes, objects, protocols, data structures, formats and/or other features of the API-implementation component that may be used by the API-calling component 1730. The API 1720 can specify at least one calling convention that specifies how a function in the API-implementation component receives parameters from the API-calling component and how the function returns a result to the API-calling component. The API-calling component 1730 (e.g., an operating system, a library, a device driver, an API, an application program, software or other module), makes API calls through the API 1720 to access and use the features of the API-implementation component 1710 that are specified by the API 1720. The API-implementation component 1710 may return a value through the API 1720 to the API-calling component 1730 in response to an API call.

It will be appreciated that the API-implementation component 1710 may include additional functions, methods, classes, data structures, and/or other features that are not specified through the API 1720 and are not available to the API-calling component 1730. It should be understood that the API-calling component 1730 may be on the same system as the API-implementation component 1710 or may be located remotely and accesses the API-implementation component 1710 using the API 1720 over a network. While FIG. 17 illustrates a single API-calling component 1730 interacting with the API 1720, it should be understood that other API-calling components, which may be written in different languages (or the same language) than the API-calling component 1730, may use the API 1720.

The API-implementation component 1710, the API 1720, and the API-calling component 1730 may be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, and so on.

Figure 18:
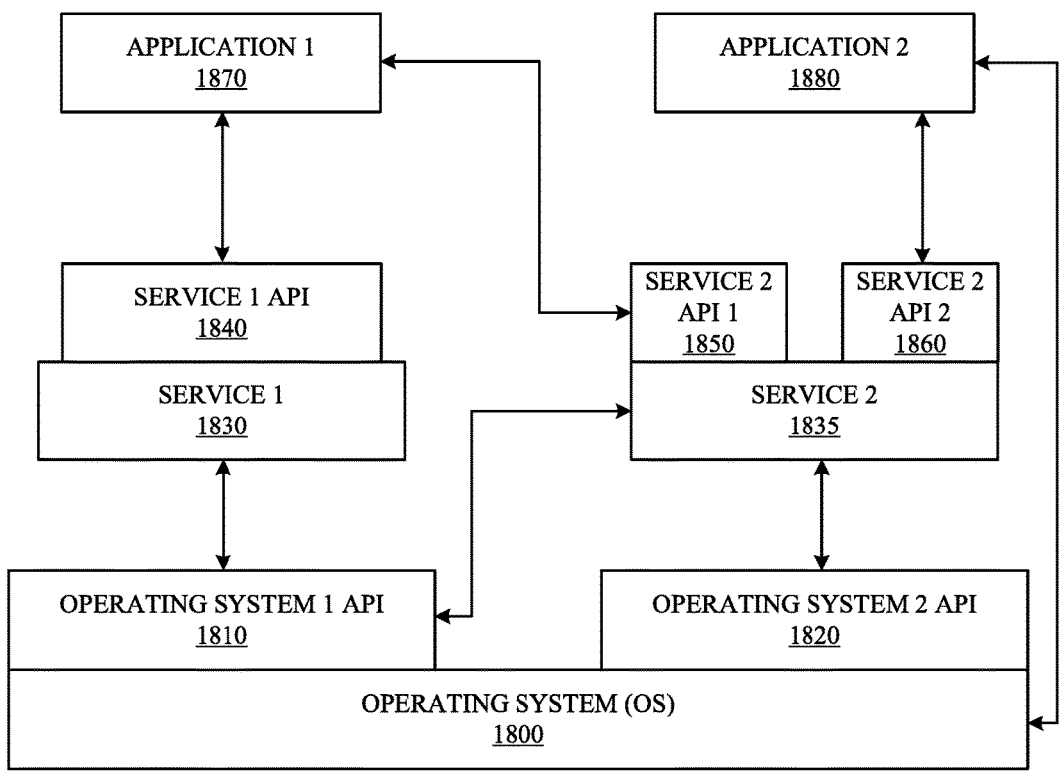
FIG. 18 illustrates a sample set of applications, services and related Application Programming Interfaces and may be used to illustrate the operation of an Application Programming Interface.

FIG. 18 shows a sample set of applications, services and related APIs and may be used to illustrate the operation of an API. As shown in FIG. 18, applications 1870, 1880 can make calls to Services A or B 1830, 1835 using several Service APIs 1840, 1850, 1860 and to Operating System (OS) 1800 using several OS APIs 1810, 1820. Services A and B 1830, 1835 can make calls to Operating System 1800 using several OS APIs 1810, 1820.

Note that the Service 2 1835 has two APIs 1850, 1860, one of which (Service 1 API 1850) receives calls from and returns values to Application 1 1870 and the other (Service 2 API 1860) receives calls from and returns values to Application 2 1880. Service 1 1830 (which can be, for example, a software library) makes calls to and receives returned values from OS API 1 1810, and Service 2 (which can be, for example, a software library) makes calls to and receives returned values from both OS API 1 and OS API 2 1820. Application 2 1880 makes calls to and receives returned values from OS 2 API 1880 either directly or through the operating system 1800.

In various implementations, embodiments described herein may be accessed by, or implemented as, an API. For example, the host may provide one or more applications access to one or more APIs to directly set or change a haptic output, for example, by accessing a library of input atoms in order to generate a particular or desired haptic output.

However, in some cases a host may not allow one or more applications to directly control the haptic actuator in such a way. In such cases, the host may retain all actual control over the haptic actuator but may provide one or more applications access to one or more APIs that enable the applications to request that the host perform one or more such operations. In this way applications may still have access to one or more APIs for performing such functions, but the host may still retain control as to whether or not such operations are actually performed.

Embodiments of the present disclosure are directed to an electronic device that is configured to provide haptic output. In some embodiments, the electronic device includes a processing unit, a memory and a haptic actuator. When an input waveform is applied to the haptic actuator, the haptic actuator moves in response to the plurality of input waveforms that are applied as input. Further, each input waveform is operative to cause the haptic actuator to move differently than the other input waveforms when applied as input. In addition to the above, the processing unit is operative to apply different combinations of the plurality of input waveforms to the haptic actuator for different alert conditions. In some embodiments, at least one set of the different sets of the plurality of input waveforms comprises two or more input waveforms.

Also disclosed is an electronic device having one or more processing units, a memory and a haptic actuator. The memory stores instructions for generating a plurality of input waveforms to drive the haptic actuator. Further, the haptic actuator is operative to move in response to the plurality of input waveforms applied as input to the haptic actuator. For example, each input waveform is operative to cause the haptic actuator to move with a displacement profile that is different than those of the other input waveforms. In addition, the processing unit is operative to select a first combination of input waveforms from the plurality of input waveforms in response to a first alert condition. The processing unit is also operative to select a second combination of input waveforms from the plurality of input waveforms in response to a second alert condition. In embodiments, the first combination of input waveforms and the second combination of input waveforms are selected from the memory by the processing unit. Further, the second combination of input waveforms is different than the first combination of input waveforms.

A method for generating a haptic output is also described. According to this method, a first alert condition is identified. In response to identifying the first alert condition, first and second input waveforms from a plurality of input waveforms stored in representative form in a non-transitory medium are identified. The method also enables application of the selected first and second input waveforms as an electrical input to a haptic actuator. As a result, the haptic actuator moves to produce a first haptic output.

Other embodiments of the present disclosure are directed to a computer-readable medium that stores a first atom corresponding to a first waveform having a first set of characteristics, a second atom corresponding to a second waveform having a second set of characteristics, and a third atom corresponding to a third waveform having a third set of characteristics. In some embodiments, each of the first, second and third atoms, when applied as an input to an actuator, cause the actuator to move. Further, the first, second and third waveforms are operable to be combined to vary the input to the haptic actuator.

An electronic device is also described herein. The electronic device includes, among other components, a haptic actuator having an actuator mass and at least one electromotive component. In some embodiments, the at least one electromotive component causes a momentum of the actuator mass to increase from approximately zero momentum to a peak intensity in an output momentum waveform in three or fewer zero crossings.

Also disclosed in an electronic device, comprising one or more processing units, a memory and a haptic actuator having an actuator mass and at least one electromotive component. In some embodiments, the haptic actuator is configured to receive an input voltage waveform. The input voltage waveform causes the electromotive component to move the actuator mass in accordance with an output velocity waveform. Further, the input voltage waveform causes a velocity of the actuator mass of the haptic actuator to change from approximately zero to a peak intensity in the output velocity waveform within two periods of a peak input voltage of the input voltage waveform.

In some embodiments, an electronic device may include one or more processing units, a memory and a haptic actuator. The memory is operative to store instructions for moving an actuator mass of the haptic actuator. In some embodiments, the instructions cause the actuator mass of the haptic actuator to move in accordance with an output displacement waveform and an output momentum waveform in response to the haptic actuator receiving an input voltage waveform. The output displacement waveform and the output momentum waveform have a peak displacement intensity or amplitude and a peak momentum intensity or amplitude respectively. Further, the peak displacement intensity or amplitude and the peak momentum intensity or amplitude are reached in three or fewer zero crossings from a time when the input voltage waveform is first applied to the haptic actuator.

Additional embodiments of the present disclosure are directed to a method for providing haptic output. The method includes initiating movement of an actuator mass of a haptic actuator by applying an input voltage waveform to the haptic actuator. The input voltage waveform is adapted to cause the actuator mass to move in accordance with an output momentum waveform. In addition, the input voltage waveform causes a momentum of the actuator mass of the haptic actuator to change from approximately zero momentum to a peak intensity or a peak amplitude in the output momentum waveform such that a change in the momentum from approximately zero momentum to the peak intensity or the peak amplitude occurs in three or fewer zero crossings.

Additional embodiments are directed to an electronic device having one or more processing units, a memory and a haptic actuator having an actuator mass and at least one electromotive component. The haptic actuator is adapted to receive an input voltage waveform that causes the at least one electromotive component to: 1) increase a momentum of the actuator mass from a first momentum of approximately zero to peak momentum intensity in an output momentum waveform during a first time period, and 2) decrease the momentum of the actuator mass from the peak momentum intensity to a second momentum intensity in the output momentum waveform in a second time period. In some embodiments, a total time of the first time period and the second time period is between approximately six milliseconds and approximately forty milliseconds.

An electronic device comprising one or more processing units, a memory and a haptic actuator having an actuator mass is also disclosed. In such embodiments, the haptic actuator is adapted to receive an input voltage waveform that causes an increase in a momentum of the actuator mass from a first momentum of approximately zero to peak intensity in an output momentum waveform and a decrease in the momentum of the actuator mass from the peak intensity to a second intensity in the output momentum waveform. In some embodiments, the increase in the momentum and the decrease in the momentum occur between two and a half and three cycles.

A method of providing haptic output is also disclosed. In some embodiments, this method comprises applying an input voltage waveform to a haptic actuator comprising an actuator mass to causes a momentum of the actuator mass to increase from substantially zero to a peak intensity. In addition, the increase in momentum from substantially zero to the peak intensity occurs during a first time period of between approximately three milliseconds and approximately twenty milliseconds. Further, the first time period begins when the input voltage is initially applied to the haptic actuator.

A method of moving an actuator mass of a haptic actuator is also disclosed. In such embodiments, an input atom is applied to the haptic actuator. The input atom is configured to cause the actuator mass of the haptic actuator to move in accordance with the atom and also causes a momentum of the actuator mass to increase from a first momentum of substantially zero in an output momentum waveform to a peak intensity of in an output momentum waveform of approximately 1500 gram millimeters per second or higher between a first time period between approximately three milliseconds and approximately twenty milliseconds.

In yet other embodiments, an electronic device is disclosed. The electronic device includes one or more processing units, a memory and a haptic actuator. The one or more processing units are adapted to receive or identify an alert event or notification and determine, based on the alert event or notification, one or more types of haptic inputs to apply to the haptic actuator. Once this determination is made, the one or more processing units generate each type of haptic input, based on one or more parameters. These parameters may include a length of playback, an intensity level during playback, and a time period at which each haptic input is to be played by the haptic actuator.

In another embodiment, an electronic device having one or more processing units, a memory and a haptic actuator may be configured to generate an input waveform based on a determined state of the electronic device. In such embodiments, the input waveform is adapted to cause a haptic actuator to move in accordance with an output waveform associated with the input waveform. Further, the input waveform may include information corresponding to a length of playback, an intensity level during playback, and a time period at which each haptic input is to be played by the haptic actuator.

A method for causing haptic output is also disclosed. According to this method, an alert event is received. Once the alert event is received, a determination is made as to a type of input atom that is to be applied to a haptic actuator. A first type of haptic input is then generated. The first type of haptic input includes information regarding a length of playback, an intensity level during playback, and a time period at which each haptic input is to be played by the haptic actuator.

Also disclosed is an electronic device comprising one or more processing units, a haptic actuator and a memory coupled to the one or more processing units. The memory stores instructions which, when executed by the one or more processing units, cause the one or more processing units to perform operations to generate an application programming interface (API) that allows an API-calling component to determine, based on an alert event or notification, one or more types of haptic input to apply to the haptic actuator. In some embodiments, each haptic input is defined based on one or more parameters including a length of playback, an intensity level during playback, and a time period at which each haptic input is to be played by the haptic actuator.

A data processing system is also disclosed. In some embodiments, the data processing system includes one or more processing units to execute instructions, a memory coupled with the processor to store instructions which, when executed by the one or more processing units, cause the one or more processing units to perform operations to generate an application programming interface (API) implementing component that implements an API that exposes one or more functions to an API-calling component. In such embodiments, the API includes a haptic alert function that defines one or more types of haptic inputs to apply to the haptic actuator based on an alert event or notification. Further, each haptic input of the one or more types of haptic inputs is defined based on one or more parameters including a length of playback, an intensity level during playback, and a time period at which each haptic input is to be played by the haptic actuator.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

Further, regardless of whether the features shown and described herein are shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternative embodiments falling within the spirit of the broader aspects of the embodiments described herein that do not depart from the broader scope of the claimed embodiments.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order. In addition, one or more procedures or enhancements that are disclosed with respect to one input or output waveform may be provided to another input or output waveform such as described.

What is claimed is:

1. A method of providing haptic output, the method comprising:
   applying an input voltage waveform to a haptic actuator comprising an actuator mass wherein:
   applying the input voltage waveform to the haptic actuator causes a momentum of the actuator mass to increase from zero to a peak intensity; and
   wherein the increase in momentum from zero to the peak intensity occurs during a first time period of between approximately three milliseconds and approximately twenty milliseconds, and wherein the first time period starts when the input voltage waveform is initially applied to the haptic actuator.

2. The method of claim 1, wherein the peak intensity is approximately 1500 gram millimeters per second or higher.

3. The method of claim 1, wherein the input voltage waveform further causes the actuator mass of the haptic actuator to change from the peak intensity to less than or equal to ten percent of the peak intensity between approximately three milliseconds and approximately twenty milliseconds.

4. A method of moving an actuator mass of a haptic actuator, the method comprising:
applying an input atom to the haptic actuator, wherein the input atom:
causes the actuator mass of the haptic actuator to move in accordance with the input atom; and
causes a momentum of the actuator mass to increase from a first momentum of substantially zero in an output momentum waveform to a peak intensity of the output momentum waveform of approximately 1500 gram millimeters per second or higher between a first time period between approximately three milliseconds and approximately twenty milliseconds.

5. The method of claim 4, wherein the input atom is represented as a substantially square input waveform.

6. The method of claim 4, wherein the input atom further causes the momentum of the actuator mass to decrease from the peak intensity in the output momentum waveform to a second momentum of substantially zero in the output momentum waveform in a second time period between approximately three milliseconds and approximately twenty milliseconds.

7. The method of claim 4, wherein the input atom causes the actuator mass of the haptic actuator to move in accordance with an output displacement waveform, wherein the output displacement waveform starts from a substantially zero displacement and reaches a peak displacement intensity during the first time period.

8. The method of claim 7, wherein the input atom further causes the actuator mass of the haptic actuator to return to a displacement of substantially zero in the output displacement waveform during a second time period of between approximately three milliseconds and approximately twenty milliseconds.

9. An electronic device comprising:
one or more processing units;
a memory comprising a library of haptic inputs; and
a haptic actuator, wherein the one or more processing units are configured to:
receive or identify an alert event or notification;
select from the library of haptic inputs, based on the alert event or notification, one or more haptic inputs to apply to the haptic actuator; and
generate each of the selected one or more haptic inputs to have one or more respective parameters, wherein:
the one or more respective parameters comprises a length of playback, an intensity level during playback, and a time period at which each of the one or more haptic inputs is to be played by the haptic actuator; and
for at least one alert or notification, there are at least two haptic inputs selected to apply to the haptic actuator.

10. The electronic device of claim 9, wherein the one or more processing units comprises a synthesizer engine.

11. The electronic device of claim 9, wherein the selected one or more haptic inputs comprise an input voltage waveform.

12. The electronic device of claim 9, wherein the intensity level can be based on a maximum amplitude, a default amplitude, or a default power output.

13. The electronic device of claim 9, wherein the alert event or notification is associated with a plurality of haptic inputs.

14. The electronic device of claim 9, wherein the one or more processing units is adapted to apply the selected one or more haptic inputs to the haptic actuator to cause the haptic actuator to move in accordance with an output waveform associated with the selected one or more haptic inputs.

15. An electronic device comprising:
one or more processing units;
a memory comprising a library of input waveforms; and
a haptic actuator, wherein the one or more processing units are configured to:
select at least one input waveform from the library of input waveforms based on a determined state of the electronic device, wherein the selected at least one input waveform is adapted to cause the haptic actuator to move in accordance with an output waveform associated with the input waveform; and
wherein:
adaptation of the input waveform comprises adapting at least one of a length of playback, an intensity level during playback, and a time period at which the input waveform is to be played by the haptic actuator; and
for at least one determined state of the electronic device, at least two input waveforms are selected from the library of input waveforms.

16. The electronic device of claim 15, wherein the intensity level can be based on a maximum amplitude, a default amplitude, or a default power output.

17. The electronic device of claim 15, wherein the determined state of the electronic device corresponds to an alert notification.

18. The electronic device of claim 15, wherein the one or more processing units comprises a synthesizer engine.

19. The electronic device of claim 15, wherein the one or more processing units is adapted to apply the selected input waveform to the haptic actuator to cause the electronic device to move in accordance with the output waveform associated with the input waveform.

20. A method for causing haptic output in an electronic device, the method comprising:
receiving an alert event at the electronic device;
selecting, based on the alert event, one or more input atoms from a library of input atoms stored in a memory of the electronic device; and
generating a haptic input comprising the selected one or more input atoms to apply to a haptic actuator of the electronic device, wherein:
the haptic input is generated based on a length of playback, an intensity level during playback, and a time period at which the one or more input atoms are to be played by the haptic actuator; and
for at least one alert event, at least two input atoms are selected to apply to the haptic actuator.

21. The method of claim 20, wherein the haptic input is generated by a synthesizer engine.

22. The method of claim 20, wherein the intensity level can be based on a maximum amplitude, a default amplitude, or a default power output.

23. The method of claim 22, wherein an input voltage waveform for at least one of the selected one or more input atoms of the haptic input is a square wave.

24. The method of claim 20, wherein the alert event is associated with a plurality of input atoms.

25. The method of claim 20, wherein the library of input atoms is a predefined library.

26. The method of claim 20, further comprising applying the haptic input to the haptic actuator to cause the haptic actuator to move in accordance with an output waveform associated with the haptic input.

27. An electronic device comprising:
one or more processing units to execute instructions;
a haptic actuator; and
a memory coupled to the one or more processing units to store instructions which, when executed by the one or more processing units, cause the one or more processing units to perform operations to generate an application programming interface (API) that allows an API-calling component to select, based on an alert event or notification, one or more haptic inputs to apply to the haptic actuator, wherein:
the one or more haptic inputs are selected from a library of haptic inputs stored in the memory;
each of the selected one or more haptic inputs is generated to have one or more parameters, wherein the one or more parameters comprises:
a length of playback,
an intensity level during playback, and
a time period at which each haptic input is to be played by the haptic actuator; and
for at least one alert event or notification, the API-calling component selects at least two or more haptic inputs to apply to the haptic actuator.

28. The electronic device of claim 27, wherein the intensity level can be based on a maximum amplitude, a default amplitude, or a default power output.

29. The electronic device of claim 27, further comprising a synthesizer engine and wherein the one or more haptic inputs are generated by the synthesizer engine.

30. The electronic device of claim 27, wherein applying the one or more haptic inputs to the haptic actuator causes the haptic actuator to move in accordance with an output waveform associated with the one or more haptic inputs.

31. A data processing system, comprising:
one or more processing units to execute instructions;
a memory coupled with the one or more processing units to store instructions which, when executed by the one or more processing units, cause the one or more processing units to perform operations to generate an application programming interface implementing component that implements an application programming interface (API), wherein the API exposes one or more functions to an API-calling component, the API comprising:
a haptic alert function to define one or more types of haptic inputs to apply to a haptic actuator of an electronic device based on an alert event or notification, wherein:
each haptic input of the one or more types of haptic inputs is defined based on one or more parameters, wherein the one or more parameters comprises:
a length of playback,
an intensity level during playback, and
a time period at which each haptic input is to be played by the haptic actuators; and
for at least one alert event or notification, the haptic alert function defines at least two or more haptic inputs to apply to the haptic actuator.

32. The data processing system of claim 31, wherein the intensity level can be based on a maximum amplitude, a default amplitude, or a default power output.

33. The data processing system of claim 31, further comprising a synthesizer engine and wherein the one or more types of haptic inputs are generated by the synthesizer engine.

34. The data processing system of claim 31, wherein the one or more types of haptic inputs comprise an input voltage waveform.

35. The data processing system of claim 31, wherein applying the one or more haptic inputs to the haptic actuator causes the haptic actuator to move in accordance with an output waveform associated with the haptic inputs.

* * * * *